United States Patent
Van Hall et al.

(10) Patent No.: US 12,534,497 B2
(45) Date of Patent: Jan. 27, 2026

(54) TEIPP PEPTIDE VARIANT AND USE AS A MEDICAMENT

(71) Applicant: Academisch Ziekenhuis Leiden (h.o.d.n. LUMC), Leiden (NL)

(72) Inventors: Thorbald Van Hall, Leiden (NL); Sjoerd Henricus Van Der Burg, Leiden (NL); Koen Marjit, Leiden (NL)

(73) Assignee: ACADEMISCH ZIEKENHUIS LEIDEN (H.O.D.N. LUMC), Leiden (NL)

( * ) Notice: Subject to any disclaimer, the term of this patent is extended or adjusted under 35 U.S.C. 154(b) by 872 days.

(21) Appl. No.: 17/780,398

(22) PCT Filed: Nov. 25, 2020

(86) PCT No.: PCT/NL2020/050741
§ 371 (c)(1),
(2) Date: May 26, 2022

(87) PCT Pub. No.: WO2021/107775
PCT Pub. Date: Jun. 3, 2021

(65) Prior Publication Data
US 2023/0035037 A1   Feb. 2, 2023

(30) Foreign Application Priority Data

Nov. 29, 2019  (EP) ..................................... 19212549

(51) Int. Cl.
| | | |
|---|---|---|
| *C07K 7/06* | (2006.01) | |
| *A61K 38/08* | (2019.01) | |
| *C12N 5/0781* | (2010.01) | |
| *C12N 5/0784* | (2010.01) | |
| *C12N 5/0786* | (2010.01) | |
| *C07K 14/47* | (2006.01) | |
| *C07K 16/28* | (2006.01) | |
| *C12N 15/63* | (2006.01) | |

(52) U.S. Cl.
CPC ................ *C07K 7/06* (2013.01); *A61K 38/08* (2013.01); *C12N 5/0635* (2013.01); *C12N 5/0639* (2013.01); *C12N 5/0645* (2013.01); *C07K 16/28* (2013.01); *C12N 15/63* (2013.01)

(58) Field of Classification Search
CPC .................................. C07K 7/06; A61K 38/08
See application file for complete search history.

(56) References Cited

U.S. PATENT DOCUMENTS

| | | |
|---|---|---|
| 2009/0220534 A1 | 9/2009 | Van Hall et al. |
| 2011/0236406 A1 | 9/2011 | Messmer et al. |
| 2013/0331546 A1 | 12/2013 | Ohlfest et al. |

FOREIGN PATENT DOCUMENTS

| | | |
|---|---|---|
| CN | 107428845 A | 12/2017 |
| CN | 108779149 A | 11/2018 |
| CN | 109963585 A | 7/2019 |
| WO | WO2007028574 A2 | 3/2007 |
| WO | 2007/105954 | 9/2007 |
| WO | 2012048190 A1 | 4/2012 |
| WO | WO2013006050 A1 | 1/2013 |
| WO | 2013120073 A1 | 8/2013 |
| WO | 2016071758 A1 | 5/2016 |
| WO | WO2017184590 A1 | 10/2017 |
| WO | WO2018055060 A1 | 3/2018 |
| WO | 2019231326 A1 | 12/2019 |

OTHER PUBLICATIONS

Record for GenBank MEB234624, dated Jan. 3, 2024, no author indicated, 2 pages as printed; printed from https://www.ncbi.nlm.nih.gov/protein/MEB2346824.*
Akira, S. et al. Pathogen recognition and innate immunity. Cell. Feb. 24, 2006: 124(4):783-801.
Altschul, S. F. et al. Basic local alignment search tool. J. Mol. Biol. (1990) 215:403-410.
Altschul, S. F. et al. Gapped BLAST and PSI-BLAST: a new generation of protein database search programs. Nucleic Acids Research, 1997, vol. 25, No. 17, pp. 3389-3402.
Anderson, K. S. et al. Intracellular transport of class I MHC molecules in antigen processing mutant cell lines. J Immunol 151, 3407-3419 (1993).
Barbalat, R. et al. Toll-like receptor 2 on inflammatory monocytes induces type I 10 interferon in response to viral but not bacterial ligands. Nat Immunol. Nov. 2009: 10(11):1200-7.
Beyranvand Nejad, E., et al. (2016). Tumor Eradication by Cisplatin Is Sustained by CD80/86-Mediated Costimulation of CD8+ T Cells. Cancer Research, 76(20), pp. 6017-6029.
Bijker, M. S. et al. CD8+ CTL priming by exact peptide epitopes in incomplete Freund's adjuvant induces a vanishing CTL response, whereas long peptides induce sustained CTL reactivity. J Immunol 179, 5033-5040 (2007).
Bijker, M. S. et al. Superior induction of anti-tumor CTL immunity by extended peptide vaccines involves prolonged, DC-focused antigen presentation. Eur J Immunol 38, 1033-1042, doi:10.1002/eji.200737995 (2008).
Bryant, C. E. et al. The molecular basis of the host response to lipopolysaccharide. Nat. Rev. Microbiol., Jan. 2010, 8(1), 8-14.
Chen, X., et al. (2016). Induction of multiple cytotoxic T lymphocyte responses in mice by a multiepitope DNA vaccine against dengue virus serotype 1. Microbiology and Immunology, 60(12), pp. 835-845.
Cohen, S. N. et al. Nonchromosomal Antibiotic Resistance in Bacteria: Genetic Transformation of *Escherichia coli* by R-Factor DNA*. Proc. Natl. Acad. Sci. USA, vol. 69, No. 8, pp. 2110-2114, Aug. 1972.

(Continued)

*Primary Examiner* — Zachary C Howard
(74) *Attorney, Agent, or Firm* — Baker, Donelson, Bearman, Caldwell, & Berkowitz, PC

(57) ABSTRACT

Novel nucleic acid sequences, vectors, cells, binding agents, peptides and pharmaceutical compositions are provided that are useful as a medicament, for example in the prevention or treatment of cancer or viral infections associated with impaired HLA class I antigen presentation. Corresponding methods and uses are also provided.

12 Claims, 20 Drawing Sheets
(17 of 20 Drawing Sheet(s) Filed in Color)
Specification includes a Sequence Listing.

(56) References Cited

OTHER PUBLICATIONS

Cresswell, P. et al. Mechanisms of MHC class I-restricted antigen processing and cross-presentation. Immunol Rev (2005), vol. 207, 145-157, doi:10.1111/j.0105-2896.2005.00316.x.

Doorduijn, E. M. et al. TAP-independent self-peptides enhance T cell recognition of immune-escaped tumors. J Clin Invest (2016), 126(2), 784-794, doi:10.1172/JCI83671.

El Hage, F. et al. Preprocalcitonin signal peptide generates a cytotoxic T lymphocyte-defined tumor epitope processed by a proteasome-independent pathway. Proc Natl Acad Sci USA 105 (29), Jul. 22, 2008, 10119-10124, doi:10.1073/pnas.0802753105.

Gay, N. et al. Structure and function of Toll receptors and their ligands. Annu. Rev. Biochem. (2007) 76, 141-165.

Guermonprez, P. et al. Antigen presentation and T cell stimulation by dendritic cells. Annu Rev Immunol 20, 621-667, doi:10.1146/annurev.immunol.20.100301.064828 (2002).

Hilf, N. et al. Actively personalized vaccination trial for newly diagnosed glioblastoma. Nature, vol. 565, Jan. 10, 2019, 240-245, doi: 10.1038/s41586-018-0810-y.

International Preliminary Report on Patentability (EPRP) for PCT/NL2020/050741 mailed May 17, 2022, 8 pages.

Johnsson, B. et al. Comparison of methods for immobilization to carboxymethyl dextran sensor surfaces by analysis of the specific activity of monoclonal antibodies. (1995) J. Mol. Recognit. 8: 125-131.

Johnsson, B. et al. Immobilization of proteins to a carboxymethyldextran-modified gold surface for biospecific interaction analysis in surface plasmon resonance sensors. (1991) Anal. Biochem. 198:268-277.

Jones, BS. et al. Improving the safety of cell therapy products by suicide gene transfer. Front Pharmacol. (Nov. 2014), vol. 5 (254), 8 pages.

Kenter, G. G. et al. Vaccination against HPV-16 oncoproteins for vulvar intraepithelial neoplasia. N Engl J Med 361, 1838-1847, doi:10.1056/NEJMoa0810097 (2009).

Korkolopoulou, P. et al. Loss of antigen-presenting molecules (MHC class I and TAP-1) in lung cancer. Br J Cancer 73, 148-153 (1996).

Kumar, H. et al. Tolllike receptors and innate immunity. Biochem Biophys Res Commun. Oct. 30, 2009; 388(4):621-5.

Linnemann, C. et al. High-throughput identification of antigen-specific TCRs by TCR gene capture. Nat Med 19 (11), Nov. 2013, 1534-1541, doi:10.1038/nm.3359.

Luchansky, J.B. et al. Application of electroporation for transfer of plasmid DNA to Lactobacillus, Lactococcus, Leuconostoc, Listeria, Pediococcus, Bacillus, *Staphylococcus*, Enterococcus and Propionibacterium. Mol. Microbiol (1988) 2(5), 637-646.

Martoglio, B. et al. Signal sequences: more than just greasy peptides. Trends Cell Biol, vol. 8, Oct. 1998, 410-415.

Massarelli, E. et al. Combining Immune Checkpoint Blockade and Tumor-Specific Vaccine for Patients With Incurable Human Papillomavirus 16-Related Cancer: A Phase 2 Clinical Trial. JAMA Oncol, Jan. 2019, 5 (1), 67-73, doi:10.1001/jamaoncol.2018.4051.

Masuko, K. et al. (2015). Artificially synthesized helper/killer-hybrid epitope long peptide (H/K-HELP): Preparation and immunological analysis of vaccine efficacy. Immunology Letters, 163(1), pp. 102-112.

Melief and van der Burg. "Immunotherapy of established (pre)malignant disease by synthetic long peptide vaccines", Nature reviews, Cancer, vol. 8, May 2008, 10 pages.

Melief, CJM. et al. Strong vaccine responses during chemotherapy are associated with prolonged cancer survival. Sci Transl Med. Mar. 18, 2020; 12(535):eaaz8235, doi: 10.1126/scitranslmed.aaz, 13 pages.

Meyers et al. Optimal alignments in linear space. (1988) CABIOS 4(1):11-17.

Monie, T. P. et al. 2009: Activating immunity: Lessons from the TLRs and NLRs. Trends Biochem. Sci. 34(11), Oct. 7, 2009, pp. 553-561.

Monjezi, R. et al. Enhanced CAR T-cell engineering using non-viral Sleeping Beauty transposition from minicircle vectors. Leukemia (2017) 31, 186-194.

Monjezi, R. et al. Enhanced Engineering of Chimeric Antigen Receptor (CAR)-Modified T Cells Using Non-Viral Sleeping Beauty Transposition from Minicircle Vectors. Molecular Therapy vol. 24, Supplement 1, May 2016, 2 pages.

Needleman et al. A general method applicable to the search for similarities in the amino acid sequence of two proteins. J. Mol. Biol. (1970) 48:444-453.

Ossendorp, F. et al. (1998). Specific T Helper Cell Requirement for Optimal Induction of Cytotoxic T Lymphocytes against Major Histocompatibility Complex Class II Negative Tumors. The Journal of Experimental Medicine, 187(5), pp. 693-702.

Ott, P. A. et al. An immunogenic personal neoantigen vaccine for patients with melanoma. Nature 547, 217-221, doi:10.1038/nature22991 (2017).

Pandha, H., et al. Loss of expression of antigen-presenting molecules in human pancreatic cancer and pancreatic cancer cell lines. Clin Exp Immunol 148, 127-135, doi:10.1111/j.1365-2249.2006.03289.x (2007).

Park, E. & Rapoport, T. A. Mechanisms of Sec61/SecY-mediated protein translocation across membranes. Annu Rev Biophys 41, 21-40, doi:10.1146/annurev-biophys050511-102312 (2012).

Rahimian, S. et al. Polymeric nanoparticles for co-delivery of synthetic long peptide antigen and poly IC as therapeutic cancer vaccine formulation. Journal of Controlled Release 203 (2015), pp. 16-22.

Ressing, ME. et al. Differential binding of viral peptides to HLA-A2 alleles. Implications for human papillomavirus type 16 E7 peptide-based vaccination against cervical carcinoma. Eur J Immunol. Apr. 1999;29(4):1292-1303.

Rosalia, R. A. et al. Dendritic cells process synthetic long peptides better than whole protein, improving antigen presentation and T-cell activation. Eur J Immunol 43, 2554-2565, doi:10.1002/eji.201343324 (2013).

Ruiter, D.J. et al. Quality Control of Immunohistochemical Evaluation of Tumour-associated Plasminogen Activators and Related Components. European Journal of Cancer, vol. 34, No. 9, pp. 1334-1340, 1998.

Seliger, B. et al. Antigen-processing machinery breakdown and tumor growth. Immunol Today 21 (9), Sep. 2000, 455-464.

Spohn, R. et al. (2004): Synthetic lipopeptide adjuvants and Toll-like receptor 2—Structure-activity relationships. Vaccine 22(19), 2494-2499.

Toes, R. E. et al. Peptide vaccination can lead to enhanced tumor growth through specific T-cell tolerance induction. Proc Natl Acad Sci USA, vol. 93, 7855-7860 (1996).

Van der Burg, SH. et al. Immunogenicity of peptides bound to MHC class I molecules depends on the MHC-peptide complex stability. J Immunol. May 1, 1996;156(9):3308-14.

Van der Burg, SH. et al. An HLA class I peptide-binding assay based on competition for binding to class I molecules on intact human B cells. Identification of conserved HIV-1 polymerase peptides binding to HLA-A*0301. Hum Immunol. (Dec. 1995), 44(4), 189-98, doi: 10.1016/0198-8859(95)00105-0.

Van der Burg, SH. et al. Vaccines for established cancer: overcoming the challenges posed by immune evasion. Nat Rev Cancer, vol. 16, Apr. 2016, 219-233, doi:10.1038/nrc.2016.16.

GenBank WP_008569256, NnrS family protein [*Stutzerimonas degradans*], accession No. WP_008569256.1, Jul. 22, 2024, 7 pages.

Van Hall and van der Burg. "Mechanisms of peptide vaccination in mouse models: Tolerance, immunity, and hyperreactivity", Chapter 3, Advances in Immunology, vol. 114, 2012, 26 pages.

Van Hall, T. et al. Selective cytotoxic T-lymphocyte targeting of tumor immune escape variants. Nat Med 12 (4), Apr. 2006, 417-424, doi:10.1038/nm1381.

Varypataki, E. et al. Cationic Liposomes Loaded with a Synthetic Long Peptide and Poly(I:C): a Defined Adjuvanted Vaccine for Induction of Antigen-Specific T Cell Cytotoxicity. The AAPS Journal, 17(1), Jan. 2015, pp. 216-226.

(56) References Cited

OTHER PUBLICATIONS

Wei, M. L. et al. HLA-A2 molecules in an antigen-processing mutant cell contain signal sequence-derived peptides. Nature 356, 443-446, doi:10.1038/356443a0 (1992).

Weinzierl, A. O. et al. Features of TAP-independent MHC class I ligands revealed by quantitative mass spectrometry. Eur J Immunol 38, 1503-1510, doi:10.1002/eji.200838136 (2008).

Wullner, D. et al. Considerations for optimization and validation of an in vitro PBMC derived T cell assay for immunogenicity prediction of biotherapeutics. Clin Immunol 137, 5-14, doi:10.1016/j.clim.2010.06.018 (2010).

Zom, GG, et al. TLR2 ligand-synthetic long peptide conjugates effectively stimulate tumor-draining lymph node T cells of cervical cancer patients. Oncotarget. Oct. 11, 2016;7(41):67087-67100, doi: 10.18632/oncotarget.11512.

Zom, GG. et al. Efficient induction of antitumor immunity by synthetic toll-like receptor ligand-peptide conjugates. Cancer Immunol Res. Aug. 2014; 2(8): 756-64, doi: 10.1158/2326-6066.

Zom, GG. et al. Novel TLR2-binding adjuvant induces enhanced T cell responses and tumor eradication. J Immunother Cancer. Dec. 12, 2018; 6(1): 146, doi: 10.1186/s40425-018-0455-2, 13 pages.

Elien M. Doorduijn et al: "T cells specific for a TAP-independent self-peptide remain naive in tumor-bearing mice and are fully exploitable for therapy", Oncoimmunology, vol. 7, No. 3, Nov. 20, 2017 (Nov. 20, 2017), p. e1382793, XP055546937, DOI: 10.1080/2162402X.2017.1382793 * the whole document*.

European Search Report for EP App. No. 19212549.0 dated May 20, 2020.

Garboczi D N et al: "HLA-A2-peptide complexes: refolding and crystallization of molecules expressed in *Escherichia coli* and complexed with single antigenic peptides", Proceedings of the National Academy of Sciences, National Academy of Sciences, vol. 89, No. 9, Apr. 15, 1992 (Apr. 15, 1992), pp. 3429-3433, XP002131059, ISSN: 0027-8424, DOI:10.1073/PNAS.89.8.3429 * the whole document*.

International Search Report and Written Opinion of the ISA for PCT/NL2020/050741 mailed Mar. 5, 2021.

Marijt Koen A et al: "Identification of non-mutated neoantigens presented by TAP-deficient tumors", Journal of Experimental Medicine, Rockefeller Univ. Press, New York, NY, USA, vol. 215, No. 9, Sep. 3, 2018 (Sep. 3, 2018), pp. 2325-2337, XP009510574, ISSN: 1540-9538, DOI: 10.1084/JEM.20180577 Retrieved from the Internet: URL:http://jem.rupress.org/content/215/9/2325 [retrieved on Aug. 16, 2018] * p. 2329, left-hand column—p. 2330, 1-4,6-15 right-hand column; figure 3; table 1 *.

Marijt Koen A et al: "TEIPP antigens for T-cell based immunotherapy of immune-edited HLA class llow cancers", Molecular Immunology, Pergamon, GB, vol. 113, Apr. 4, 2018 (Apr. 4, 2018), pp. 43-49, XP085827279, ISSN: 0161-5890, DOI:10.1016/J.MOLIMM.2018.03.029 [retrieved on Apr. 4, 2018] * p. 45 *.

Mathieu Gigoux et al: "Refusing to TAP out: 16 new human TEIPPs identified", The Journal of Experimental Medicine, vol. 215, No. 9, Aug. 21, 2018 (Aug. 21, 2018), pp. 2233-2234, XP055693763, US ISSN: 0022-1007, DOI: 10.1084/jem.20181512 * the whole document*.

Bandoh N, Ogino T, Katayama A, et al. HLA class I antigen and transporter associated with antigen processing downregulation in metastatic lesions of head and neck squamous cell carcinoma as a marker of poor prognosis. Oncol Rep. 2010;23(4):933-939. doi:10.3892/or_00000717.

Bijker, M. S., Melief, C. J., Offringa, R., & van der Burg, S. H. (2007). Design and development of synthetic peptide vaccines: past, present and future. Expert Review of Vaccines, 6(4), 591-603. https://doi.org/10.1586/14760584.6.4.591.

Cathro HP, Smolkin ME, Theodorescu D, Jo VY, Ferrone S, Frierson HF Jr. Relationship between HLA class I antigen processing machinery component expression and the clinicopathologic characteristics of bladder carcinomas. Cancer Immunol Immunother. 2010;59(3):465-472. doi:10.1007/s00262-009-0765-9.

Cresswell, A. C. et al. "Reduced expression of TAP-1 and TAP-2 in posterior uveal melanoma is associated with progression to metastatic disease", Melanoma Research 2001, 11, pp. 275-281.

Durgeau, A. et al. Different expression levels of the TAP peptide transporter lead to recognition of different antigenic peptides by tumor-specific Ctl. J Immunol. 2011;187(11):5532-5539. doi:10.4049/jimmunol.1102060.

Garrido, F. et al. The urgent need to recover MHC class I in cancers for effective immunotherapy, Current Opinion in Immunology, vol. 39, 2016, pp. 44-51, ISSN 0952-7915, https://doi.org/10.1016/j.coi.2015.12.007.

Garrido, G., Schrand, B., Rabasa, A. et al. Tumor-targeted silencing of the peptide transporter TAP induces potent antitumor immunity. Nat Commun 10, 3773 (2019). https://doi.org/10.1038/s41467-019-11728-2.

Han, L. Y. et al. HLA class I antigen processing machinery component expression and intratumoral T-Cell infiltrate as independent prognostic markers in ovarian carcinoma. Clin Cancer Res. 2008;14(11):3372-3379. doi:10.1158/1078-0432.CCR-07-4433.

Henle, A. M. et al. (2017). Downregulation of TAP1 and TAP2 in early stage breast cancer. PloS one, 12(11), e0187323, 12 pages.

Hirata T, Yamamoto H, Taniguchi H, et al. Characterization of the immune escape phenotype of human gastric cancers with and without high-frequency microsatellite instability. J Pathol. 2007;211(5):516-523. doi:10.1002/path.2142.

Kageshita, T. et al. Down-regulation of HLA class I antigen-processing molecules in malignant melanoma: association with disease progression. Am J Pathol. 1999;154(3):745-754. doi:10.1016/S0002-9440(10)65321-7.

Kasajima A, Sers C, Sasano H, et al. Down-regulation of the antigen processing machinery is linked to a loss of inflammatory response in colorectal cancer. Hum Pathol. 2010;41(12):1758-1769. doi:10.1016/j.humpath.2010.05.014.

Liu, Y. et al. (2012). Expression of antigen processing and presenting molecules in brain metastasis of breast cancer. Cancer Immunol Immunother 61, 789-801 (2012).

Mehta AM, Jordanova ES, Kenter GG, Ferrone S, Fleuren GJ. Association of antigen processing machinery and HLA class I defects with clinicopathological outcome in cervical carcinoma. Cancer Immunol Immunother. 2008;57 (2):197-206. doi:10.1007/s00262-007-0362-8.

Rabu, C. et al. (2019). Cancer vaccines: designing artificial synthetic long peptides to improve presentation of class I and class II T cell epitopes by dendritic cells. OncoImmunology, 8(4), 11 pages. https://doi.org/10.1080/2162402X.2018.1560919.

Ren, Y. X. et al. (2013). Downregulation of expression of transporters associated with antigen processing 1 and 2 and human leukocyte antigen I and its effect on immunity in nasopharyngeal carcinoma patients. Molecular and clinical oncology, 2(1), 51-58. https://doi.org/10.3892/mco.2013.194.

Ritter, C., Fan, K., Paschen, A. et al. Epigenetic priming restores the HLA class-I antigen processing machinery expression in Merkel cell carcinoma. Sci Rep 7, 2290 (2017). https://doi.org/10.1038/s41598-017-02608-0.

Romero JM, Jiménez P, Cabrera T, et al. Coordinated downregulation of the antigen presentation machinery and HLA class I/beta2-microglobulin complex is responsible for HLA-ABC loss in bladder cancer. Int J Cancer. 2005;113 (4):605-610. doi:10.1002/ijc.20499.

Seliger B, Stoehr R, Handke D, et al. Association of HLA class I antigen abnormalities with disease progression and early recurrence in prostate cancer. Cancer Immunol Immunother. 2010;59(4):529-540. doi:10.1007/s00262-009-0769-5.

Setiadi, A. F. et al. Epigenetic control of the immune escape mechanisms in malignant carcinomas. Mol Cell Biol. 2007;27(22):7886-7894. doi:10.1128/MCB.01547-07.

* cited by examiner

SEQUENCE LISTING

<160> NUMBER OF SEQ ID NOS: 39

<210> SEQ ID NO 1
<211> LENGTH: 9
<212> TYPE: PRT

```
<213> ORGANISM: Artificial Sequence
<220> FEATURE:
<223> OTHER INFORMATION: Description of Artificial Sequence:
      synthetic peptide

<400> SEQUENCE: 1

Phe Leu Gly Pro Trp Pro Ala Ala Val
1               5

<210> SEQ ID NO 2
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 2

Phe Leu Gly Pro Trp Pro Ala Ala Ser
1               5

<210> SEQ ID NO 3
<211> LENGTH: 20
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 3

Phe Leu Gly Pro Trp Pro Ala Ala Val His Gly Gly Lys Tyr Ser Arg
1               5                   10                  15

Glu Lys Asn Gln
            20

<210> SEQ ID NO 4
<211> LENGTH: 18
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 4

Leu Pro Ala Leu Leu Leu Leu Leu Phe Leu Gly Pro Trp Pro Ala
1               5                   10                  15

Ala Val

<210> SEQ ID NO 5
<211> LENGTH: 21
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 5

Leu Arg Gly Leu Pro Ala Leu Leu Leu Leu Leu Phe Leu Gly Pro
1               5                   10                  15

Trp Pro Ala Ala Val
            20

<210> SEQ ID NO 6
<211> LENGTH: 24
<212> TYPE: PRT
<213> ORGANISM: Artificial Sequence
```

```
<220> FEATURE:
<223> OTHER INFORMATION: Description of Artificial Sequence:
      synthetic peptide

<400> SEQUENCE: 6

Arg Ser Phe Leu Arg Gly Leu Pro Ala Leu Leu Leu Leu Leu Phe
1               5                   10                  15

Leu Gly Pro Trp Pro Ala Ala Val
            20

<210> SEQ ID NO 7
<211> LENGTH: 27
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 7

Arg Arg Val Arg Ser Phe Leu Arg Gly Leu Pro Ala Leu Leu Leu
1               5                   10                  15

Leu Leu Phe Leu Gly Pro Trp Pro Ala Ala Val
            20                  25

<210> SEQ ID NO 8
<211> LENGTH: 19
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 8

Arg Gly Leu Pro Ala Leu Leu Leu Leu Leu Phe Leu Gly Pro Trp Pro
1               5                   10                  15

Ala Ala Val

<210> SEQ ID NO 9
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 9

Phe Leu Gly Pro Trp Pro Ala Ala Ala
1               5

<210> SEQ ID NO 10
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 10

Phe Leu Gly Pro Trp Pro Ala Ala Cys
1               5

<210> SEQ ID NO 11
<211> LENGTH: 9
<212> TYPE: PRT
<213> ORGANISM: Artificial Sequence
<220> FEATURE:
```

```
<223> OTHER INFORMATION: Description of Artificial Sequence:
      synthetic peptide

<400> SEQUENCE: 11

Phe Leu Gly Pro Trp Pro Ala Ala Asp
1               5

<210> SEQ ID NO 12
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 12

Phe Leu Gly Pro Trp Pro Ala Ala Glu
1               5

<210> SEQ ID NO 13
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 13

Phe Leu Gly Pro Trp Pro Ala Ala Phe
1               5

<210> SEQ ID NO 14
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 14

Phe Leu Gly Pro Trp Pro Ala Ala Gly
1               5

<210> SEQ ID NO 15
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 15

Phe Leu Gly Pro Trp Pro Ala Ala His
1               5

<210> SEQ ID NO 16
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 16

Phe Leu Gly Pro Trp Pro Ala Ala Ile
1               5
```

```
<210> SEQ ID NO 17
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 17

Phe Leu Gly Pro Trp Pro Ala Ala Lys
1               5

<210> SEQ ID NO 18
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 18

Phe Leu Gly Pro Trp Pro Ala Ala Leu
1               5

<210> SEQ ID NO 19
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 19

Phe Leu Gly Pro Trp Pro Ala Ala Met
1               5

<210> SEQ ID NO 20
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 20

Phe Leu Gly Pro Trp Pro Ala Ala Asn
1               5

<210> SEQ ID NO 21
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 21

Phe Leu Gly Pro Trp Pro Ala Ala Pro
1               5

<210> SEQ ID NO 22
<211> LENGTH: 9
<212> TYPE: PRT
<213> ORGANISM: Artificial Sequence
<220> FEATURE:
<223> OTHER INFORMATION: Description of Artificial Sequence:
      synthetic peptide
```

```
<400> SEQUENCE: 22

Phe Leu Gly Pro Trp Pro Ala Ala Gln
1               5

<210> SEQ ID NO 23
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 23

Phe Leu Gly Pro Trp Pro Ala Ala Arg
1               5

<210> SEQ ID NO 24
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 24

Phe Leu Gly Pro Trp Pro Ala Ala Thr
1               5

<210> SEQ ID NO 25
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 25

Phe Leu Gly Pro Trp Pro Ala Ala Trp
1               5

<210> SEQ ID NO 26
<211> LENGTH: 9
<212> TYPE: PRT
<213> ORGANISM: Artificial Sequence
<220> FEATURE:
<223> OTHER INFORMATION: Description of Artificial Sequence:
      synthetic peptide

<400> SEQUENCE: 26

Phe Leu Gly Pro Trp Pro Ala Ala Tyr
1               5

<210> SEQ ID NO 27
<211> LENGTH: 357
<212> TYPE: PRT
<213> ORGANISM: Artificial Sequence
<220> FEATURE:
<223> OTHER INFORMATION: Description of Artificial Sequence:
      synthetic polypeptide
<220> FEATURE:
<223> OTHER INFORMATION: the full length LRPAP1 sequence

<400> SEQUENCE: 27

Met Ala Pro Arg Arg Val Arg Ser Phe Leu Arg Gly Leu Pro Ala Leu
1               5                   10                  15
```

Leu Leu Leu Leu Leu Phe Leu Gly Pro Trp Pro Ala Ala Ser His Gly
        20              25              30

Gly Lys Tyr Ser Arg Glu Lys Asn Gln Pro Lys Pro Ser Pro Lys Arg
            35              40              45

Glu Ser Gly Glu Glu Phe Arg Met Glu Lys Leu Asn Gln Leu Trp Glu
50              55              60

Lys Ala Gln Arg Leu His Leu Pro Pro Val Arg Leu Ala Glu Leu His
65              70              75              80

Ala Asp Leu Lys Ile Gln Glu Arg Asp Glu Leu Ala Trp Lys Lys Leu
            85              90              95

Lys Leu Asp Gly Leu Asp Glu Asp Gly Glu Lys Glu Ala Arg Leu Ile
            100             105             110

Arg Asn Leu Asn Val Ile Leu Ala Lys Tyr Gly Leu Asp Gly Lys Lys
            115             120             125

Asp Ala Arg Gln Val Thr Ser Asn Ser Leu Ser Gly Thr Gln Glu Asp
130             135             140

Gly Leu Asp Asp Pro Arg Leu Glu Lys Leu Trp His Lys Ala Lys Thr
145             150             155             160

Ser Gly Lys Phe Ser Gly Glu Glu Leu Asp Lys Leu Trp Arg Glu Phe
            165             170             175

Leu His His Lys Glu Lys Val His Glu Tyr Asn Val Leu Leu Glu Thr
            180             185             190

Leu Ser Arg Thr Glu Glu Ile His Glu Asn Val Ile Ser Pro Ser Asp
            195             200             205

Leu Ser Asp Ile Lys Gly Ser Val Leu His Ser Arg His Thr Glu Leu
210             215             220

Lys Glu Lys Leu Arg Ser Ile Asn Gln Gly Leu Asp Arg Leu Arg Arg
225             230             235             240

Val Ser His Gln Gly Tyr Ser Thr Glu Ala Glu Phe Glu Glu Pro Arg
            245             250             255

Val Ile Asp Leu Trp Asp Leu Ala Gln Ser Ala Asn Leu Thr Asp Lys
            260             265             270

Glu Leu Glu Ala Phe Arg Glu Glu Leu Lys His Phe Glu Ala Lys Ile
            275             280             285

Glu Lys His Asn His Tyr Gln Lys Gln Leu Glu Ile Ala His Glu Lys
            290             295             300

Leu Arg His Ala Glu Ser Val Gly Asp Gly Glu Arg Val Ser Arg Ser
305             310             315             320

Arg Glu Lys His Ala Leu Leu Glu Gly Arg Thr Lys Glu Leu Gly Tyr
            325             330             335

Thr Val Lys Lys His Leu Gln Asp Leu Ser Gly Arg Ile Ser Arg Ala
            340             345             350

Arg His Asn Glu Leu
        355

<210> SEQ ID NO 28
<211> LENGTH: 36
<212> TYPE: DNA
<213> ORGANISM: Artificial Sequence
<220> FEATURE:
<223> OTHER INFORMATION: Description of Artificial Sequence:
      synthetic oligonucleotide
<220> FEATURE:
<223> OTHER INFORMATION: CDR3 region TCRa chain

<400> SEQUENCE: 28
tgtgtggtga tgggctatgg tcagaatttt gtcttt					36

<210> SEQ ID NO 29
<211> LENGTH: 42
<212> TYPE: DNA
<213> ORGANISM: Artificial Sequence
<220> FEATURE:
<223> OTHER INFORMATION: Description of Artificial Sequence:
      synthetic oligonucleotide
<220> FEATURE:
<223> OTHER INFORMATION: CDR3 region TCRb chain

<400> SEQUENCE: 29
tgcagtgcta tggggagaca gagcacagat acgcagtatt tt					42

<210> SEQ ID NO 30
<211> LENGTH: 12
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: CDR3 region TCRa chain

<400> SEQUENCE: 30

Cys Val Val Met Gly Tyr Gly Gln Asn Phe Val Phe
1               5                   10

<210> SEQ ID NO 31
<211> LENGTH: 14
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: CDR3 region TCRb chain

<400> SEQUENCE: 31

Cys Ser Ala Met Gly Arg Gln Ser Thr Asp Thr Gln Tyr Phe
1               5                   10

<210> SEQ ID NO 32
<211> LENGTH: 328
<212> TYPE: DNA
<213> ORGANISM: Artificial Sequence
<220> FEATURE:
<223> OTHER INFORMATION: Description of Artificial Sequence:
      synthetic polynucleotide
<220> FEATURE:
<223> OTHER INFORMATION: V(D)J region sequence - TCRa chain

<400> SEQUENCE: 32
cggaaggagg tggagcagga tcctggaccc ttcaatgttc cagagggagc cactgtcgct					60 ttcaactgta cttacagcaa cagtgcttct cagtctttct tctggtacag acaggattgc					120 aggaaagaac ctaagttgct gatgtccgta tactccagtg gtaatgaaga tggaaggttt					180 acagcacagc tcaatagagc cagccagtat atttccctgc tcatcagaga ctccaagctc					240 agtgattcag ccacctacct ctgtgtggtg atgggctatg gtcagaattt tgtctttggt					300 cccggaacca gattgtccgt gctgccct					328

<210> SEQ ID NO 33

```
<211> LENGTH: 420
<212> TYPE: DNA
<213> ORGANISM: Artificial Sequence
<220> FEATURE:
<223> OTHER INFORMATION: Description of Artificial Sequence:
      synthetic polynucleotide
<220> FEATURE:
<223> OTHER INFORMATION: V(D)J region sequence - TCRb chain

<400> SEQUENCE: 33
cggaagatgc tgctgcttct gctgcttctg gggccaggct ccgggcttgg tgctgtcgtc    60
tctcaacatc cgagctgggt tatctgtaag agtggaacct ctgtgaagat cgagtgccgt   120
tccctggact ttcaggccac aactatgttt tggtatcgtc agttcccgaa acagagtctc   180
atgctgatgg caacttccaa tgagggctcc aaggccacat acgagcaagg cgtcgagaag   240
gacaagtttc tcatcaacca tgcaagcctg accttgtcca ctctgacagt gaccagtgcc   300
catcctgaag acagcagctt ctacatctgc agtgctatgg ggagacagag cacagatacg   360
cagtattttg gcccaggcac ccggctgaca gtgctcgagg acctgaaaaa cgtgttccca   420

<210> SEQ ID NO 34
<211> LENGTH: 20
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: sequence in Fig. 1A

<400> SEQUENCE: 34

Phe Leu Gly Pro Trp Pro Ala Ala Ser His Gly Gly Lys Tyr Ser Arg
1               5                   10                  15

Glu Lys Asn Gln
            20

<210> SEQ ID NO 35
<211> LENGTH: 20
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: sequence in Fig. 1A

<400> SEQUENCE: 35

Leu Leu Leu Leu Leu Phe Leu Gly Pro Trp Pro Ala Ala Ser His Gly
1               5                   10                  15

Gly Lys Tyr Ser
            20

<210> SEQ ID NO 36
<211> LENGTH: 19
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: sequence in Fig. 1A
```

```
-continued

<400> SEQUENCE: 36

Arg Gly Leu Pro Ala Leu Leu Leu Leu Phe Leu Gly Pro Trp Pro
1               5                   10                  15

Ala Ala Ser

<210> SEQ ID NO 37
<211> LENGTH: 20
<212> TYPE: PRT
<213> ORGANISM: Artificial Sequence
<220> FEATURE:
<223> OTHER INFORMATION: Description of Artificial Sequence:
      synthetic peptide
<220> FEATURE:
<223> OTHER INFORMATION: sequence in Fig. 1F

<400> SEQUENCE: 37

Leu Leu Leu Leu Leu Phe Leu Gly Pro Trp Pro Ala Ala Val His Gly
1               5                   10                  15

Gly Lys Tyr Ser
            20

<210> SEQ ID NO 38
<211> LENGTH: 9
<212> TYPE: PRT
<213> ORGANISM: Artificial Sequence
<220> FEATURE:
<223> OTHER INFORMATION: 9-mer HPV CTL epitope

<400> SEQUENCE: 38

Arg Ala His Tyr Asn Ile Val Thr Phe
1               5

<210> SEQ ID NO 39
<211> LENGTH: 8
<212> TYPE: PRT
<213> ORGANISM: Artificial Sequence
<220> FEATURE:
<223> OTHER INFORMATION: OVA antigen epitope

<400> SEQUENCE: 39

Ser Ile Ile Asn Phe Glu Lys Leu
1               5
```

TEIPP PEPTIDE VARIANT AND USE AS A MEDICAMENT

This application is a 35 U.S.C. § 371 national phase application of PCT Application No. PCT/NL2020/050741, filed on Nov. 25, 2020, which claims priority to European Application No. EP 19212549.0, filed on Nov. 29, 2019, the entire contents of each of which are incorporated by reference herein.

REFERENCE TO A SEQUENCE LISTING

This application contains a Sequence Listing in computer readable form. The computer readable form is incorporated herein by reference. Said ASCII copy, created on Aug. 11, 2025 Jul. 14, 2022, is named 2970877-000001-US1 SL.txt and is 14,485 bytes in size.

Novel peptides, nucleic acid sequences, vectors, modified cells, binding agents and pharmaceutical compositions are provided that are useful as a medicament, for example in the prevention or treatment of cancer or viral infections associated with impaired HLA class I antigen presentation. Corresponding methods and uses are also provided.

BACKGROUND

The success of T cell targeted immunotherapy relies on the presentation of tumor antigens on the cell surface of cancer cells. However, cancer cells often downregulate components of the antigen processing machinery to prevent the presentation of tumor-associated and tumor-specific antigens by HLA class I molecules[1-3]. One critical step in this intracellular process is the transport of liberated peptides over the ER membrane by the dedicated pump TAP, which functions as a bottleneck and delivers peptides for all HLA class I molecules[2-4]. TAP specific processing defects allow the tumor to escape from CD8 T cell immunity and are frequently observed in human cancers.

Although interest in cancer vaccines waned long ago due to a sheer lack of objective clinical responses in hundreds of trials, they recently regained attention since novel platforms demonstrated efficacy to induce broad CD4 and CD8 anti-tumor T cell immunity, increase immune infiltration of human cancers and eradicate pre-malignant lesions[8-10]. Moreover, vaccination therapy seems to combine very well with immune checkpoint blockade in that relapsed vaccinated patients responded extremely well to PD-1 therapy and, importantly, the addition of a long peptide vaccine to a standardized PD-1 treatment schedule improved the overall response rate and median overall survival (OS)[11,12].

All T cell-geared vaccination platforms depend on delivery of tumor antigens to the host and on the exceptional capability of antigen presenting cells to cross-present these tumor antigens in HLA class I and II molecules for subsequent T cell activation. Many parameters are important for successful development of a therapeutic cancer vaccine, including delivery systems, route of administration and adjuvants, which are supposed to activate the innate immune system and induce T cell co-stimulatory molecules.

Novel pharmaceutical compositions for preventing and/or treating cancer are needed.

BRIEF SUMMARY OF THE DISCLOSURE

The inventors have previously developed a synthetic long peptide (SLP) vaccination platform and have shown that peptides of between 10-35 amino acids (preferably between 20 and 35 amino acids) possess the capacity to trigger CD4 and CD8 T cell responses and result in eradication of premalignant lesions[9,13,14] as well as improve overall survival of patients with cancer when vaccinated during chemotherapy (Melief et al., 2019). Cross-presentation of such peptides by host dendritic cells involves multiple sequential steps, including uptake via endocytosis, cytosolic cleavage of the SLP into short peptides by the proteasome, the dominant proteolytic enzyme, transport over the ER membrane by TAP and loading onto MHC-I molecules[15].

A novel subset of tumor antigens (TEIPP; Tumor Epitopes associated with Impaired Peptide Processing) are selectively presented by cancers with down modulated TAP expression[5-7]. One such TEIPP antigen (FLGPWPAAS; SEQ ID NO:2) is derived from the signal peptide of the ubiquitously expressed LRPAP1 protein and is presented on multiple HLA-A*0201 positive TAP-deficient cancers, including renal cell carcinoma, lymphoma, melanoma, and colon carcinoma. It is the most immunogenic and prominent human TEIPP antigen identified thus far.

FLGPWPAAS is present within the signal peptide (also referred to as 'leader sequence') of LRPAP1, which functions to dock protein translational products to the sec61 translocation channel in the ER membrane[22]. These signal peptides are usually cleaved from nascent proteins by the protease Signal Peptidase (SPase), resulting in a small protein transmembrane remnant. These signal peptide stubs are liberated from the ER membrane by the protease Signal Peptide Peptidase (SPPase) which cleaves within the lipid bilayer[19]. A part of the signal peptide thus enters the ER in a TAP-independent fashion and this is the reason why signal peptides are overrepresented in the HLA class I binding repertoires of TAP-deficient cells[23-25]. Although not formally demonstrated, the liberation of the LRPAP$_{21-30}$ peptide is most likely not mediated by the proteasome, which is involved in proteolytic cleavage of the majority of HLA class I presented peptides[4].

Although TEIPP antigens are overrepresented in the HLA class I binding repertoires of TAP-deficient cells, the inventors have found that TAP-deficient tumors fail to prime TEIPP specific T cells (Doorduijn et al, 2017).

The data presented herein shows that dendritic cells are unable to cross-present a long version of the HLA-A*0201 presented natural LRPAP$_{21-30}$ epitope (FLGPWPAAS) when elongated with its natural flanking sequence. Remarkably, amino acid exchange of the C-terminal anchor residue from a serine (S) to a valine (V) results in enhanced T cell stimulation. LRPAP$_{21-30}$-specific CD8+ T cells isolated with multimers presenting either the S- or V-variant could be co-stained with the other multimer to the same extent, thus recognized the other peptide as well as TAP-deficient tumor cells. Similar findings were obtained when CD8+ T cells were transfected with an isolated LRPAP$_{21-30}$-specific TCR. Importantly, in vitro vaccination with the V-variant SLP resulted in cross-presentation of the peptide vaccine and in polyclonal LRPAP1-specific CD8 T cell cultures isolated from the normal T cell repertoire. Expanded CD8 T cell clones from these cultures not only recognized the natural S-containing peptide but also displayed a highly selective capacity to recognize TAP-deficient melanoma cells.

The data presented herein shows that small alterations to signal peptide-epitopes retains immunogenicity of TEIPP antigens and render them suitable candidates for the SLP vaccine format. Such vaccines may represent a salvage therapy for immune-escaped cancer by activating LRPAP1-specific T cells that are found in all tested healthy donors.

Of the several single amino acid peptide variants tested herein FLGPWPAAV was found to be most effective. The invention is therefore based on the surprising finding that a single specific amino acid change in the sequence of the FLGPWPAAS peptide (to FLGPWPAAV; SEQ ID NO:1) results in a higher binding affinity of the peptide to HLA-A*02 and more efficient cross-presentation by monocyte-derived dendritic cells. Surprisingly, this specific amino acid change allows the peptide to be used as a more effective peptide vaccine.

Accordingly, in one aspect, the invention provides an isolated peptide comprising the amino acid sequence FLGPWPAAV (SEQ ID NO: 1).

Suitably, the peptide may have no more than 35 amino acids.

Suitably, the peptide may consist of the amino acid sequence FLGPWPAAV (SEQ ID NO: 1).

Suitably, the peptide may comprise the amino acid sequence FLGPWPAAV (SEQ ID NO: 1) and consist of from 10 to 35 amino acids.

Suitably, the peptide may be conjugated to a TLR ligand.

In another aspect, the invention provides an isolated nucleic acid sequence encoding the peptide of the invention.

Suitably, the nucleic acid sequence may be mRNA or DNA.

In another aspect, the invention provides a binding agent that specifically binds to a peptide comprising the amino acid sequence FLGPWPAAV (SEQ ID NO: 1).

Suitably, the binding agent may be an HLA-A2*02 molecule.

In another aspect, the invention provides a vector comprising a nucleic acid sequence of the invention.

Suitably, the vector may be a plasmid or a viral vector. Optionally the vector may be selected from the group consisting of a retrovirus, lentivirus, adeno-associated virus, adenovirus, vaccinia virus, canary poxvirus, herpes virus, minicircle vector and synthetic DNA or RNA.

In another aspect, the invention provides a modified cell transformed, transfected or transduced with a nucleic acid sequence of the invention, or a vector of the invention.

Suitably, the modified cell may be a human cell.

In another aspect, the invention provides a method of preparing a peptide of the invention, comprising cultivating a modified cell of the invention in a culture medium and separating the peptide from the culture medium or from the modified cell lysate after cell lysis.

In another aspect, the invention provides a cell loaded with a peptide of the invention.

Suitably, the cell may be an antigen presenting cell. The antigen presenting cell may be selected from a macrophage, dendritic cell, a monocyte, a B-cell or a synthetic form of antigen presenting cell.

In another aspect, the invention provides a pharmaceutical composition comprising an isolated peptide, a nucleic acid sequence, a vector, a binding agent or a cell according to the invention, and a pharmaceutically acceptable excipient, adjuvant, diluent and/or carrier.

Suitably, the composition may be formulated as a vaccine.

In another aspect, the invention provides a pharmaceutical composition according to invention for use as a medicament.

Suitably, the pharmaceutical composition may be for use in the prevention or treatment of a cancer or a viral infection associated with impaired HLA class I antigen presentation in a human subject.

In another aspect, the invention provides a method of treating a condition in a human subject in need thereof, the method comprising administering to the subject a therapeutically effective amount of a pharmaceutical composition of the invention.

Suitably, the method may be for the prevention or treatment of a cancer or a viral infection associated with impaired HLA class I antigen presentation.

Suitably, in any aspects of the invention, the cancer may be a cancer with impaired peptide processing machinery.

Suitably, in any aspects of the invention, the cancer may be lung carcinoma, melanoma, renal cell cancer, merkel cell carcinoma, head and neck cancer, cervical cancer, lymphoma, urothelial carcinoma, mismatch-repair deficient tumors, cutaneous squamous cell carcinoma.

Alternatively or additionally, the cancer may be pancreatic cancer, breast cancer, bladder cancer, prostate cancer, stomach cancer or cancer of the esophagus.

In another aspect, the invention provides a method of treating a cancer or viral infection associated with impaired HLA class I antigen presentation in a human subject, the method comprising:
(i) determining the presence of a peptide in a sample isolated from the subject, wherein the peptide is FLGPWPAAS (SEQ ID NO: 2); and
(ii) administering to the subject a therapeutically effective amount of a pharmaceutical composition of the invention.

In another aspect, the invention provides a pharmaceutical composition according to the invention for use in treating or preventing a cancer or viral infection associated with impaired HLA class I antigen presentation in a human subject, wherein the subject has been identified as having a cancer or viral infection associated with impaired HLA class I antigen presentation by the presence of a peptide in a sample isolated from the subject, wherein the peptide is FLGPWPAAS (SEQ ID NO: 2).

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Various aspects of the invention are described in further detail below.

BRIEF DESCRIPTION OF THE FIGURES

Embodiments of the invention are further described hereinafter with reference to the accompanying drawings, in which.

The patent or application file contains at least one drawing executed in color. Copies of this patent or patent application publication with color drawing(s) will be provided by the Office upon request and payment of the necessary fee.

Figure 1:
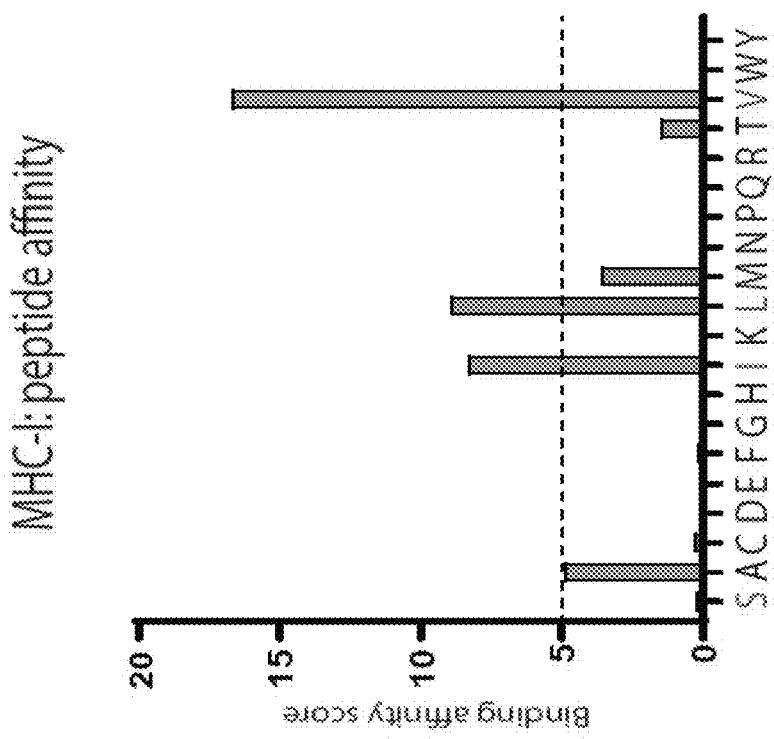
FIG. 1 shows that substitution of the C-terminal amino acid of the signal peptide of LRPAP1 allows for cross-presentation by dendritic cells. (A) Monocyte-derived dendritic cells were incubated with indicated long peptides comprising the LRPAP1 epitope and co-cultured with a TEIPP-specific CD8 T cell clone 1A8. Non-natural flanking amino acids at the amino-terminus, or natural flanking amino acids at the carboxy-terminus or natural flanking amino acids at both ends were used to elongate the minimal epitope. GM-CSF secretion by the TEIPP-specific T cell clone was used to determine cross-presentation efficiency and pulsing with short peptide (FLGPWPAAS) was used as positive control. (B) Predicted HLA-A2*01 binding affinity scores of LRPAP1 peptides with substituted amino acids at the C-terminal p9 (MHCnet 4.0 algorithm). Binding affinity score was calculated on basis of the IC50 values and ranking percentage (see Table 2 for exact values). (C) Predicted proteasome cleavage activity for four different LRPAP1 peptides using NetCHop 3.1 algorithm. A score of 1 is maximal and predicts cleavage by the proteasome after the indicated amino acid. Arrow indicates the C-terminus of the LRPAP1 epitope. (D) Functional T cell avidity was measured as GM-CSF secretion by TEIPP-specific T cell clone stimulated with short peptide—pulsed EBV-JY cells in serial dilutions of the peptides. Mean and SD are plotted from one out of three experiments with similar outcome. (E) EC50 values were calculated from values obtained in D (wherein EC values represent the dose of peptide resulting in half of the maximal response to that particular peptide variant). (F) Monocyte-derived dendritic cells were cultured with the indicated different long S- and V-peptides of the LRPAP1 sequence. Cross-presentation of the indicated long peptides was determined by T cell clone. The respective short peptides (9 amino acid long) served as positive controls. (G) Overview of cross-presentation experiments using dendritic cells from eight different donors.
Figure 1:
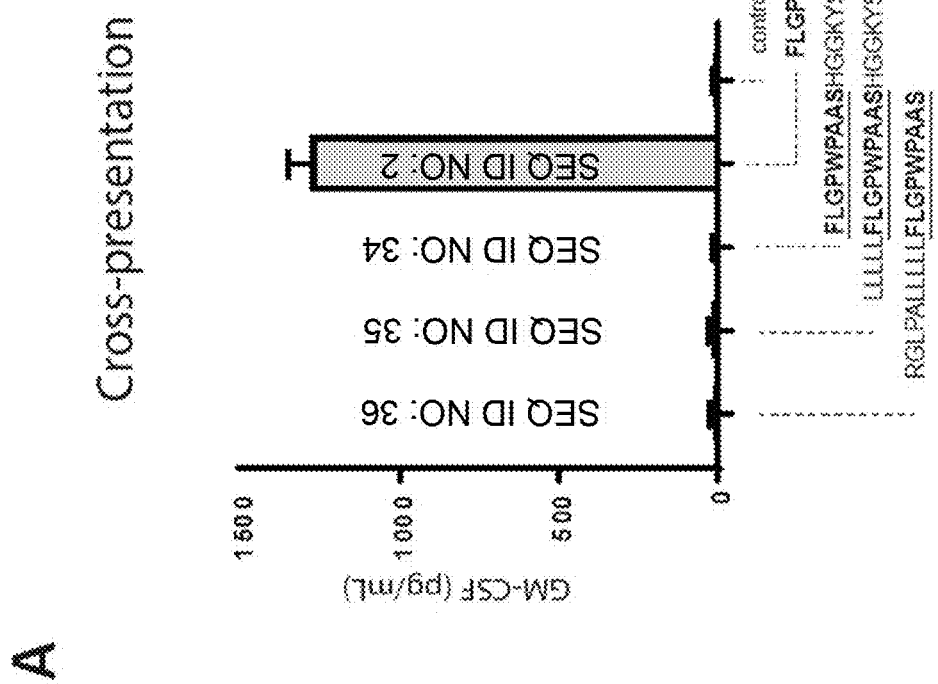
Figure 1:
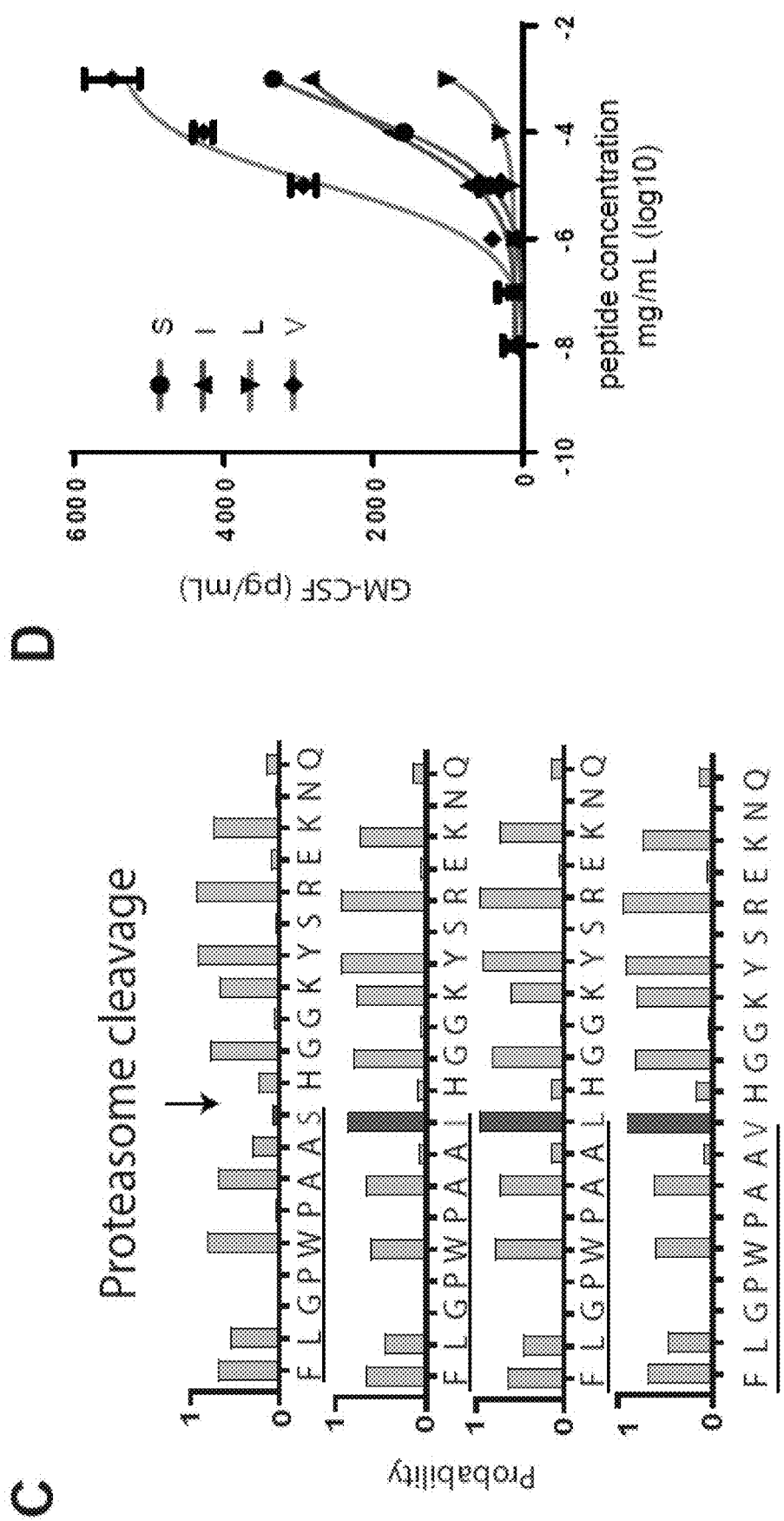
Figure 1:
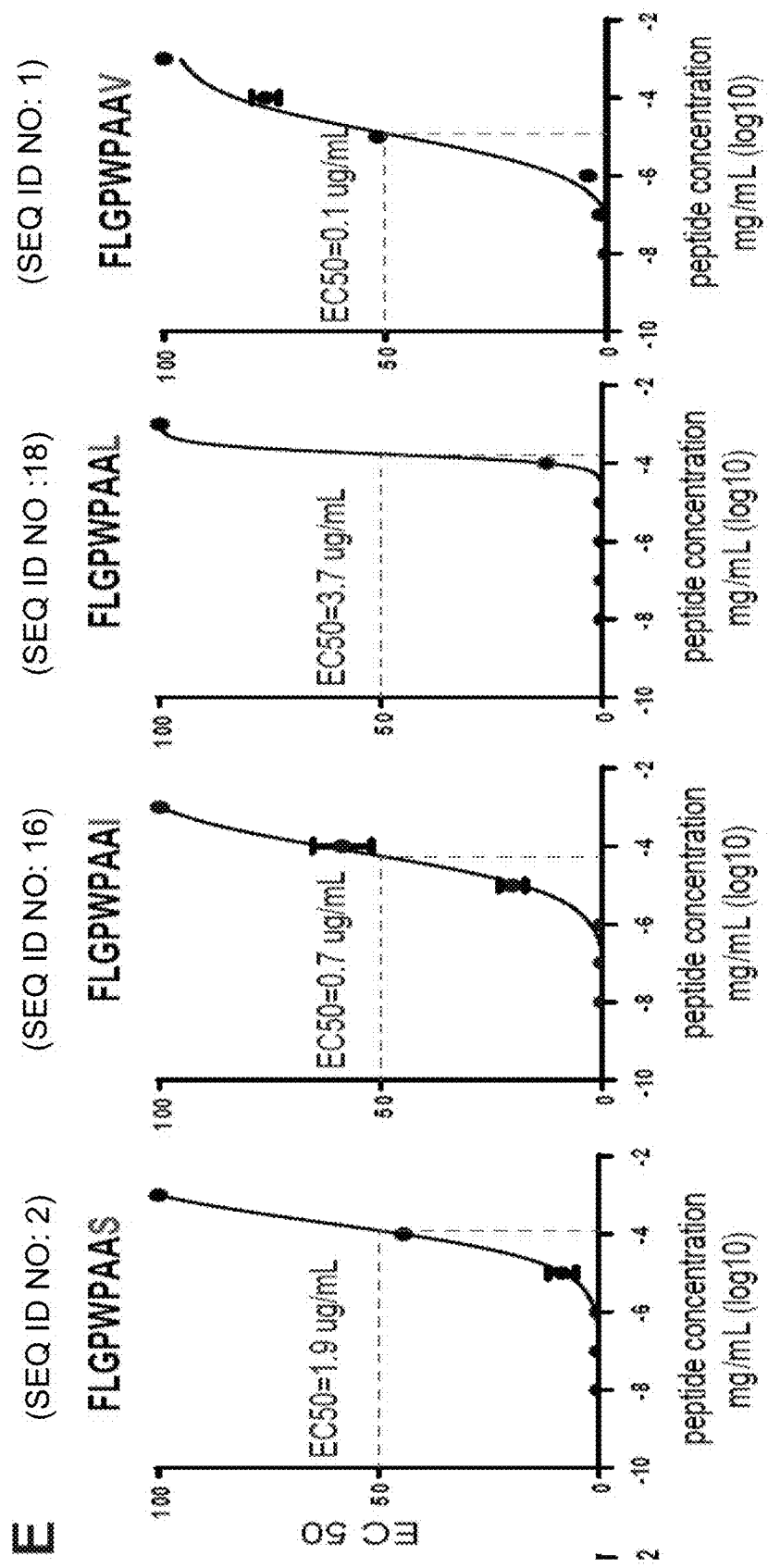
Figure 1:
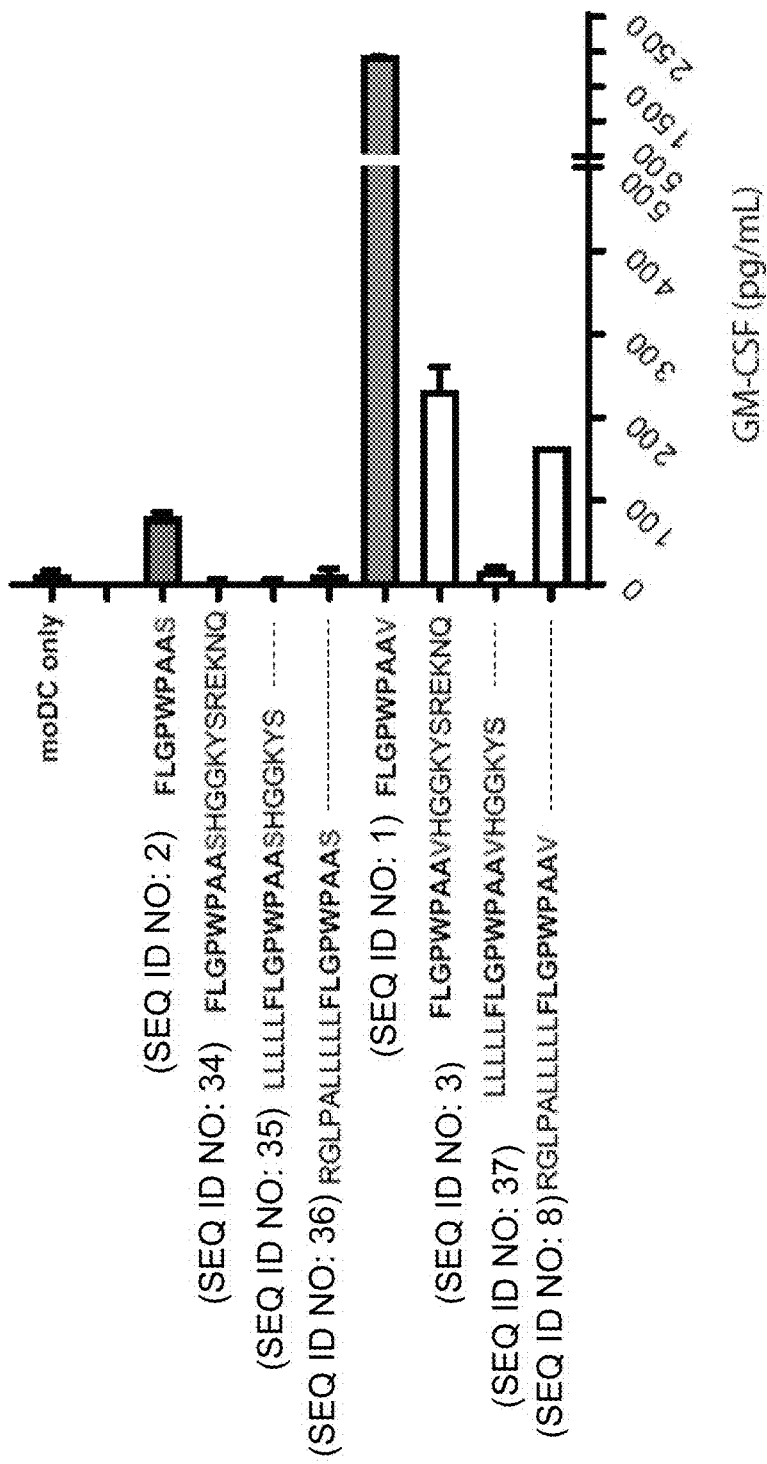
Figure 1:
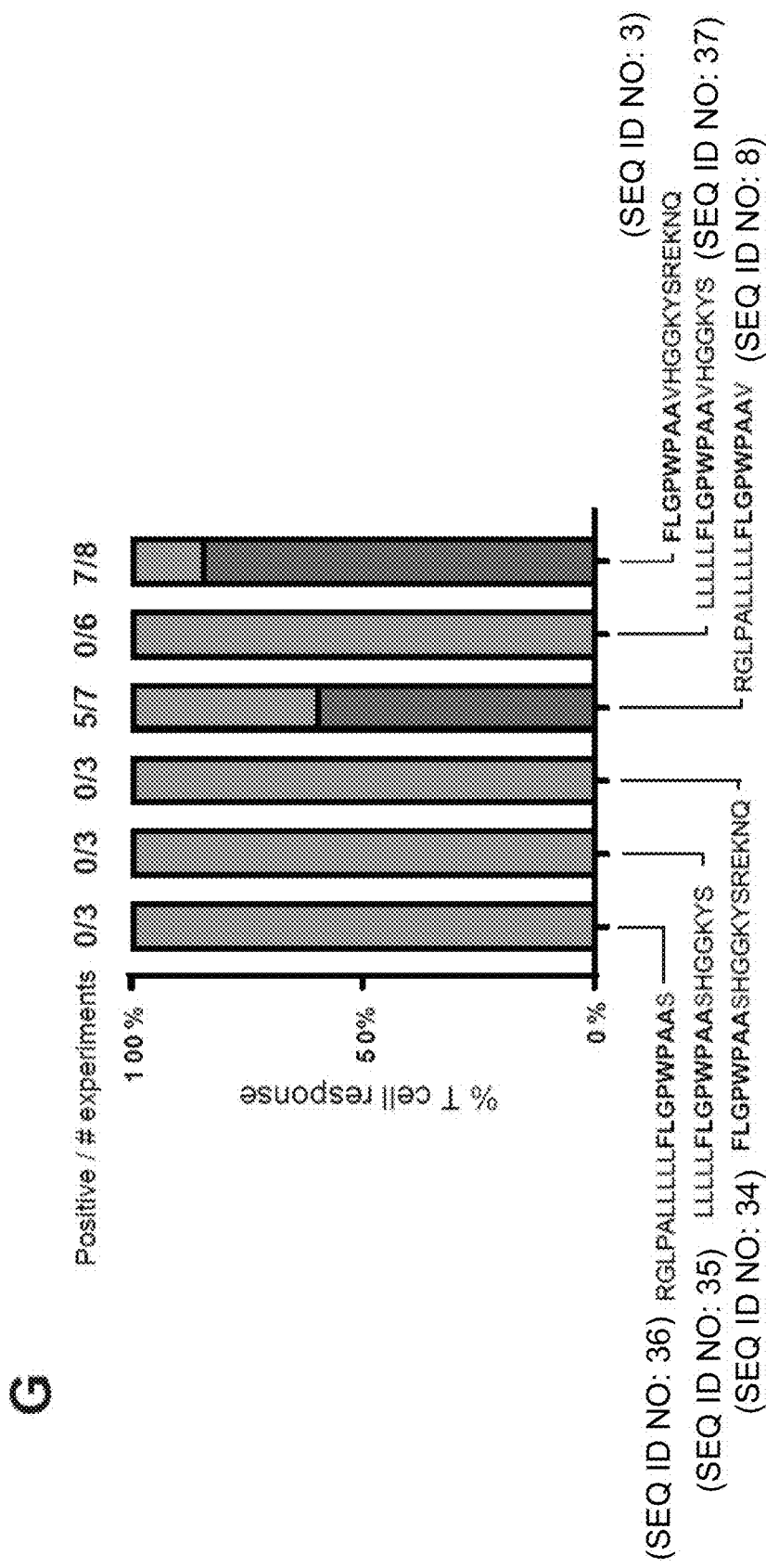

Different lengths of peptide have been shown to be particularly effective as peptide vaccines. For example, Ossendorp et al., (1998) describe that 9-19 amino acid long peptides are able to induce a CD4+ helper T cell response. Accordingly, the isolated peptide of the invention may be from 9 to 19 amino acids long.

Peptides that are longer than the conventional 9mer sequence presented by HLA may be more efficient in inducing an immune response. Accordingly, in line with the teaching of Ossendorp et al., (1998), the isolated peptides described herein may be from 10 to 19 amino acids long. Bijker et al., (2007) demonstrate that a 9-mer HPV CTL epitope can induce a CD8+ response to RAHYNIVTF (SEQ ID NO: 38) but that a 35-mer peptide comprising this epitope is more efficient. This is further supported by Beyranvand-Nejad et al., (2016), showing that a 35 mer HPV peptide works well to induce RAHYNIVTF-specific CD8+ T cells. Furthermore, Rahimian et al., (2015) show that a 27-mer HPV peptide works well to induce a response to RAHYNIVTF (SEQ ID NO: 38). Accordingly, in line with these teachings, the isolated peptides described herein may be from 10 to 35 amino acids long. For the avoidance of doubt, in this context, the isolated peptides have a total of 10 to 35 amino acids, which includes the FLGPWPAAV sequence. In other words, the isolated peptides have the FLGPWPAAV sequence and 1 to 26 additional amino acids. The 1 to 26 additional amino acids of the isolated peptide may be located N-terminal or C-terminal to the FLGPWPAAV sequence. Alternatively, when there are 2 to 26 additional amino acids, the additional amino acids may flank the FLGPWPAAV sequence (i.e. such that there are additional amino acid(s) N-terminal and C-terminal of the FLGPWPAAV sequence). Additional amino acids located N-terminal, C-terminal or flanking the FLGPWPAAV are referred to collectively as "additional amino acids" herein.

In another example, the isolated peptides described herein may be from 15 to 30 amino acids long. In other words, the isolated peptides have the FLGPWPAAV sequence and 6 to 21 additional amino acids. The 6 to 21 additional amino acids of the isolated peptide may be located N-terminal or C-terminal to the FLGPWPAAV sequence. Alternatively, when there are 6 to 21 additional amino acids, the additional amino acids may flank the FLGPWPAAV sequence (i.e. such that there are additional amino acid(s) N-terminal and C-terminal of the FLGPWPAAV sequence).

In another example, the isolated peptides described herein may be from 18 to 27 amino acids long. In other words, the isolated peptides have the FLGPWPAAV sequence and 9 to 18 additional amino acids. The 9 to 18 additional amino acids of the isolated peptide may be located N-terminal or C-terminal to the FLGPWPAAV sequence. Alternatively, when there are 9 to 18 additional amino acids, the additional amino acids may flank the FLGPWPAAV sequence (i.e. such that there are additional amino acid(s) N-terminal and C-terminal of the FLGPWPAAV sequence).

In a further example, the isolated peptides described herein may be from 21 to 24 amino acids long. In other words, the isolated peptides have the FLGPWPAAV sequence and 12 to 15 additional amino acids. The 12 to 15 additional amino acids of the isolated peptide may be located N-terminal or C-terminal to the FLGPWPAAV sequence. Alternatively, when there are 12 to 15 additional amino acids, the additional amino acids may flank the FLGPWPAAV sequence (i.e. such that there are additional amino acid(s) N-terminal and C-terminal of the FLGPWPAAV sequence).

In another example, the isolated peptides described herein may be 27 amino acids long. In a further example, the isolated peptides described herein may be 24 amino acids long. In another example, the isolated peptides described herein may be 21 amino acids long. In a particular example, the isolated peptides described herein may be 18 amino acids long. Preferably, the isolated peptides described herein are 24 amino acids long. For the avoidance of doubt, in this context, the isolated peptides have a total of e.g. 27, 24, 21 or 18 amino acids, which includes the FLGPWPAAV sequence. In other words, the isolated peptides have the FLGPWPAAV sequence and a suitable number of additional amino acids (i.e. to generate a peptide that is 27, 24, 21 or 18 amino acids long). The additional amino acids (e.g. the 18 additional amino acids required to generate a peptide that is 27 amino acids long, the 15 additional amino acids required to generate a peptide that is 24 amino acids long, the 12 additional amino acids required to generate a peptide that is 21 amino acids long or the 9 additional amino acids required to generate a peptide that is 18 amino acids long) may be located N-terminal or C-terminal to the FLGPWPAAV sequence. Alternatively, the additional amino acids may flank the FLGPWPAAV sequence (i.e. such that there are additional amino acid(s) N-terminal and C-terminal of the FLGPWPAAV sequence).

The N-terminus of a peptide (also known as the amino-terminus, $NH_2$-terminus, N-terminal end or amine-terminus) is the start of a peptide terminated by an amino acid with a free amine group ($-NH_2$). By convention, peptide sequences are written N-terminus to C-terminus (from left to right). The C-terminus (also known as the carboxyl-terminus, carboxy-terminus, C-terminal tail, C-terminal end, or COOH-terminus) is the end of an amino acid chain (protein or polypeptide), terminated by a free carboxyl group ($-COOH$).

As used herein, the terms "N-terminal" and "C-terminal" are used to describe the relative position of e.g. a sequence within a peptide. Accordingly, a sequence that is "N-terminal" is positioned closer (in relative terms) to the N-terminus than to the C-terminus of the peptide. Conversely, a domain that is "C-terminal" is positioned (in relative terms) closer to the C-terminus than to the N-terminus of the peptide. As used herein, the term "positioned" refers to the location of the sequence within the linear amino acid sequence of the peptide.

Peptides comprising an N-terminal amino acid sequence (A) and a C-terminal amino acid sequence (B) are conventionally written as A-B i.e. N-terminal to C-terminal (left to right).

Where the isolated peptides described herein include additional amino acids located N-terminal, C-terminal or flanking the FLGPWPAAV, any appropriate additional amino acid sequences may be included. For example, the additional amino acids may be amino acid sequences that are naturally located N-terminal, C-terminal or flanking the FLGPWPAAS sequence in LRPAP1. In a particular example, the additional amino acids are located at N-terminal to the FLGPWPAAV sequence and may be the natural sequence that is found N-terminal to the FLGPWPAAS sequence in LRPAP1. In another example, the additional amino acids may be all be located C-terminal to the FLGPWPAAV sequence and may be the natural sequence that is found C-terminal to the FLGPWPAAS sequence in LRPAP1. Alternatively, the additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1.

Isolated peptides that comprise the amino acid sequence FLGPWPAAV (SEQ ID NO: 1) and consist of from 10 to 35 amino acids may include any appropriate additional amino acid sequences. For example, the additional amino acids may be amino acid sequences that are naturally located N-terminal, C-terminal or flanking the FLGPWPAAS sequence in LRPAP1. For example, the additional 1 to 26 amino acids may all be located N-terminal to the FLGPWPAAV sequence and may be the natural sequence that is found N-terminal to the FLGPWPAAS sequence in LRPAP1. In another example, the additional 1 to 26 amino acids may be all be located C-terminal to the FLGPWPAAV sequence and may be the natural sequence that is found C-terminal to the FLGPWPAAS sequence in LRPAP1. Alternatively, when there are 2 to 26 additional amino acids, the additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1.

In a particular example, isolated peptides that comprise the amino acid sequence FLGPWPAAV (SEQ ID NO: 1) and consist of from 15 to 30 amino acids may include any appropriate additional amino acid sequences. For example, the additional amino acids may be amino acid sequences that are naturally located N-terminal, C-terminal or flanking the FLGPWPAAS sequence in LRPAP1. For example, the additional 6 to 21 amino acids may all be located N-terminal to the FLGPWPAAV sequence and may be the natural sequence that is found N-terminal to the FLGPWPAAS sequence in LRPAP1. In another example, the additional 6 to 21 amino acids may be all be located C-terminal to the FLGPWPAAV sequence and may be the natural sequence that is found C-terminal to the FLGPWPAAS sequence in LRPAP1. Alternatively, when there are 6 to 21 additional amino acids, the additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1.

In another example, isolated peptides that comprise the amino acid sequence FLGPWPAAV (SEQ ID NO: 1) and consist of from 18 to 27 amino acids may include any appropriate additional amino acid sequences. For example, the additional amino acids may be amino acid sequences that are naturally located N-terminal, C-terminal or flanking the FLGPWPAAS sequence in LRPAP1. For example, the additional 9 to 18 amino acids may all be located N-terminal to the FLGPWPAAV sequence and may be the natural sequence that is found N-terminal to the FLGPWPAAS sequence in LRPAP1. In another example, the additional 9 to 18 amino acids may be all be located C-terminal to the FLGPWPAAV sequence and may be the natural sequence that is found C-terminal to the FLGPWPAAS sequence in LRPAP1. Alternatively, when there are 9 to 18 additional amino acids, the additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1.

In a further example, isolated peptides that comprise the amino acid sequence FLGPWPAAV (SEQ ID NO: 1) and consist of from 21 to 24 amino acids may include any appropriate additional amino acid sequences. For example, the additional amino acids may be amino acid sequences that are naturally located N-terminal, C-terminal or flanking the FLGPWPAAS sequence in LRPAP1. For example, the additional 12 to 15 amino acids may all be located N-terminal to the FLGPWPAAV sequence and may be the natural sequence that is found N-terminal to the FLGPWPAAS sequence in LRPAP1. In another example, the additional 12 to 15 amino acids may be all be located C-terminal to the FLGPWPAAV sequence and may be the natural sequence that is found C-terminal to the FLGPWPAAS sequence in LRPAP1. Alternatively, when there are 12 to 15 additional amino acids, the additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1.

As would be clear to a skilled person, the examples described for the ranges provided above are equally applicable to isolated peptides of a particular length (e.g. peptides described herein that are 27, 24, 21 or 18 amino acids long). For example, isolated peptides that comprise the amino acid sequence FLGPWPAAV (SEQ ID NO: 1) and consist of 24 amino acids may include any appropriate additional amino acid sequences. For example, the additional amino acids may be amino acid sequences that are naturally located N-terminal, C-terminal or flanking the FLGPWPAAS sequence in LRPAP1. For example, the additional 15 amino acids may all be located N-terminal to the FLGPWPAAV sequence and may be the natural sequence that is found N-terminal to the FLGPWPAAS sequence in LRPAP1. In another example, the additional 15 amino acids may be all be located C-terminal to the FLGPWPAAV sequence and may be the natural sequence that is found C-terminal to the FLGPWPAAS sequence in LRPAP1. Alternatively, the 15 additional amino acids may flank the FLGPWPAAV sequence (i.e. such that there are additional amino acid(s) N-terminal and C-terminal of the FLGPWPAAV sequence) and may be the natural sequence that flank the FLGPWPAAS sequence in LRPAP1. Suitable natural sequences from LRPAP1 are provided in the Examples section below.

For example, the peptide may comprise C-terminal additional amino acids, for example it may comprise the sequence FLGPWPAAVHGGKYSREKNQ (SEQ ID NO:3). This is an example of a 20mer with C-terminal additional amino acids, although other lengths may also be acceptable e.g. 18 mer, 21 mer, 24 mer, 27 mer etc.

In another example the peptide may comprise N-terminal additional amino acids, for example it may comprise one of the following sequences: LPALLLLLLFLGPWPAAV (SEQ ID NO:4), LRGLPALLLLLLFLGPWPAAV (SEQ ID NO:5), RSFLRGLPALLLLLLFLGPWPAAV (SEQ ID NO:6), or RRVRSFLRGLPALLLLLLFLGPWPAAV (SEQ ID NO:7). These are examples of an 18mer, 21mer, 24mer and 27mer with N-terminal additional amino acids, although other lengths may also be acceptable.

In an example, the isolated peptide may comprise the amino acid sequence of SEQ ID NO: 4. In another example, the isolated peptide may consist of the amino acid sequence of SEQ ID NO: 4.

In an example, the isolated peptide may comprise the amino acid sequence of SEQ ID NO: 5. In another example, the isolated peptide may consist of the amino acid sequence of SEQ ID NO: 5.

In another example, the isolated peptide may comprise the amino acid sequence of SEQ ID NO: 6. In yet another example, the isolated peptide may consist of the amino acid sequence of SEQ ID NO: 6.

In a further example, the isolated peptide may comprise the amino acid sequence of SEQ ID NO: 7. In another example, the isolated peptide may consist of the amino acid sequence of SEQ ID NO: 7.

Alternative appropriate natural sequences from LRPAP1 may also be identified by a person of skill in the art. For example, they may be identified using the full length LRPAP1 sequence found in SEQ ID N0:27.

In an alternative example, the additional amino acids may be amino acid sequences that are not naturally located N-terminal, C-terminal or flanking the FLGPWPAAS sequence in LRPAP1. Both natural and non-natural flanking sequences have been shown to be useful in isolated peptide vaccines and therefore either may be used in the peptides described herein. For example, the SIINFEKL (SEQ ID NO: 39) epitope of the OVA antigen has been successfully used as a peptide vaccine when flanked by its natural sequence (Bijker et al., (2007), a non-natural C-terminal flanking sequence (Varypataki et al., (2015) or without an N-terminal flanking sequence but with a glycine linker attached to a helper epitope at the C-terminal position, so completely outside the context of its own natural flanking sequences (Masuko et al., (2015). Furthermore, Chen et al., (2016) describe fifteen CTL epitope vaccines with small non-natural linkers to the next epitope resulting in priming to the epitopes. Accordingly, N-terminal and/or C-terminal non-natural additional amino acid sequences may be acceptable in a peptide vaccine format. Variations on these sequences e.g. RGLPALLLLLFLGPWPAAV (SEQ ID NO: 8) (19mer) etc may also be used as long as the SEQ ID NO:2 and/or SEQ ID NO: 1 peptide sequence is present in these peptides.

The peptide may be a "natural peptide" i.e. a peptide composed of natural amino acids. Such peptides are composed of conventional amino acids defined by the genetic code, linked to each other by a normal peptide bond. Natural peptides may, for example, be produced by a cell (via protein expression, e.g. using a nucleic acid or vector described herein), or they may be made synthetically (i.e. outside of a cell, using chemical synthesis).

Alternatively, the peptide may be a "synthetic peptide". A synthetic peptide may comprise a mix of natural amino acids and amino acids other than conventional amino acids defined by the genetic code ("synthetic amino acids"). Alternatively, it may be composed of synthetic amino acids only. Examples of synthetic amino acids are well known in the literature.

Natural peptides and synthetic peptides may be modified. In other words, the peptide may comprise amino acids modified by natural processes, such as post-translational maturation processes or by chemical processes, which are well known to a person skilled in the art. Such modifications are fully detailed in the literature. These modifications can appear anywhere in the peptide: in the peptide skeleton, in the amino acid chain or at the carboxy- or amino-terminal ends. Non-limiting examples of peptide modifications include acetylation, acylation, ADP-ribosylation, amidation, covalent fixation of a nucleotide or of a nucleotide derivative, covalent fixation of a lipid or of a lipidic derivative, the covalent fixation of a phosphatidylinositol, covalent or non-covalent cross-linking, cyclization, disulfide bond formation, demethylation, glycosylation including pegylation, hydroxylation, iodization, methylation, myristoylation, oxidation, proteolytic processes, phosphorylation, prenylation, racemization, seneloylation, sulfatation, amino acid addition such as arginylation or ubiquitination. Such modifications are fully detailed in the literature. Accordingly, the terms "peptide", "polypeptide", "protein" may include for example lipopeptides, lipoproteins, glycopeptides, glycoproteins and the like. As a further non-limiting example, the peptide can be branched following ubiquitination or be cyclic with or without branching. This type of modification can be the result of natural or synthetic post-translational processes that are well known to a person skilled in the art.

The peptides described herein may be conjugated directly, or via a linker, to a therapeutic moiety, a polymer, a polypeptide, a ligand and/or any other moiety e.g. a detectable moiety. Such peptides are referred to herein as "peptide conjugates".

The peptide conjugate may comprise a peptide covalently attached to a Toll Like Receptor ligand. TLR ligands may also be referred to as TLR agonists. As used herein a "TLR agonist" is an agonist of a Toll-like receptor (TLR), i.e. it binds to a TLR and activates the TLR, in particular to produce a biological response. A "TLR peptide agonist" as used herein in a TLR agonist that is a peptide.

Peptide conjugates comprising TLR agonists covalently bound to peptides, in particular TLR agonists that are covalently bound to synthetic peptides, are well known in the art. For example, Zom et al., (2018) described a conjugate of the TLR2-ligand Pam3CSK4 to synthetic long peptides (SLPs). Furthermore, Zom et al., (2016) described the conjugation of human papillomavirus type 16 (HPV16)-encoded synthetic long peptides to a Pam3CSK4-based TLR2 agonist.

Toll like receptors (TLRs) are transmembrane proteins that are characterized by extracellular, transmembrane, and cytosolic domains. The extracellular domains containing leucine-rich repeats (LRRs) with horseshoe-like shapes are involved in recognition of common molecular patterns derived from diverse microbes. Toll like receptors include TLRs1-10. Compounds capable of activating TLR receptors and modifications and derivatives thereof are well documented in the art. TLR1 may be activated by bacterial lipoproteins and acetylated forms thereof, TLR2 may in addition be activated by Gram positive bacterial glycolipids, LPS, LPA, LTA, fimbriae, outer membrane proteins, heat shock proteins from bacteria or from the host, and Mycobacterial lipoarabinomannans. TLR3 may be activated by dsRNA, in particular of viral origin, or by the chemical compound poly(I.C). TLR4 may be activated by Gram negative LPS, LTA, Heat shock proteins from the host or from bacterial origin, viral coat or envelope proteins, taxol or derivatives thereof, hyaluronan containing oligosaccharides and fibronectins. TLR5 may be activated with bacterial flagellae or flagellin. TLR6 may be activated by mycobacterial lipoproteins and group B streptococcus heat labile soluble factor (GBS-F) or staphylococcus modulins. TLR7 may be activated by imidazoquinolines. TLR9 may be activated by unmethylated CpG DNA or chromatin—IgG complexes.

TLRs are expressed either on the cell surface (TLR1, 2, 4, 5, 6, and 10) or on membranes of intracellular organelles, such as endosomes (TLR3, 4, 7, 8, and 9). The natural ligands for the endosomal receptors are nucleic acid-based molecules (except for TLR4). The cell surface-expressed TLR1, 2, 4, 5, 6, and 10 recognize molecular patterns of extracellular microbes (Monie, T. P., Bryant, C. E., et al. 2009: Activating immunity: Lessons from the TLRs and NLRs. Trends Biochem. Sci. 34(11), 553-561). TLRs are expressed on several cell types but virtually all TLRs are expressed on DCs allowing these specialized cells to sense all possible pathogens and danger signals.

TLR2, 4, and 5 are constitutively expressed at the surface of DCs.

TLR2 can detect a wide variety of ligands derived from bacteria, viruses, parasites, and fungi. The ligand specificity is often determined by the interaction of TLR2 with other TLRs, such as TLR1, 6, or 10, or non-TLR molecules, such as dectin-1, CD14, or CD36. The formation of a heterodimer with TLR1 enables TLR2 to identify triacyl lipoproteins or lipopeptides from (myco)bacterial origin, such as Pam3CSK4 and peptidoglycan (PGA; Gay, N.), and Gangloff, M. (2007): Structure and function of Toll receptors and their ligands. Annu. Rev. Biochem. 76, 141-165; Spohn, R., Buwitt-Beckmann, U., et al. (2004): Synthetic lipopeptide adjuvants and Toll-like receptor 2—Structure-activity relationships. Vaccine 22(19), 2494-2499). Heterodimerization of TLR2 and 6 enables the detection of diacyl lipopeptides and zymosan. Lipopolysaccharide (LPS) and its derivatives are ligands for TLR4 and flagellin for TLR5 (Bryant, C. E., Spring, D. R., et al. (2010). The molecular basis of the host response to lipopolysaccharide. Nat. Rev. Microbiol. 8(1), 8-14).

TLR2 interacts with a broad and structurally diverse range of ligands, including molecules expressed by microbes and fungi. Multiple TLR2 agonists have been identified, including natural and synthetic lipopeptides (e.g. *Mycoplasma fermentas* macrophage-activating lipopeptide (MALP-2)), peptidoglycans (PG such as those from *S. aureus*), lipopolysaccharides from various bacterial strains (LPS), polysaccharides (e.g. zymosan), glycosylphosphatidyl-inositol-anchored structures from gram positive bacteria (e.g. lipoteichoic acid (LTA) and lipo-arabinomannan from mycobacteria and lipomannans from *M. tuberculosis*). Certain viral determinants may also trigger via TLR2 (Barbalat R, Lau L, Locksley R M, Barton G M. Toll-like receptor 2 on inflammatory monocytes induces type I interferon in response to viral but not bacterial ligands. Nat Immunol. 2009: 10(11):1200-7). Bacterial lipopeptides are structural components of cell walls. They consist of an acylated s-glycerylcysteine moiety to which a peptide can be conjugated via the cysteine residue. Examples of TLR2 agonists, which are bacterial lipopeptides, include MALP-2 and it's synthetic analogue di-palmitoyl-S-glyceryl cysteine (Pam2Cys) or tri-palmitoyl-S-glyceryl cysteine (Pam3Cys).

A diversity of ligands interact with TLR4, including Monophosphoryl Lipid A from Salmonella minnesota R595 (MPLA), lipopolysaccharides (LPS), mannans (Candida albicans), glycoinositolphospholipids (Trypanosoma), viral envelope proteins (RSV and MMTV) and endogenous antigens including fibrinogen and heat-shock proteins. Such agonists of TLR4 are for example described in Akira S, Uematsu S, Takeuchi O. Pathogen recognition and innate immunity. Cell. Feb. 24; 2006: 124(4):783-801 or in Kumar H, Kawai T, Akira S. Toll-like receptors and innate immunity. Biochem Biophys Res Commun. Oct. 30; 2009 388 (4):621-5. LPS, which is found in the outer membrane of gram negative bacteria, is the most widely studied of the TLR4 ligands. Suitable LPS-derived TLR4 agonist peptides are described for example in WO 2013/120073 (A1).

TLR5 is triggered by a region of the flagellin molecule expressed by nearly all motile bacteria. Thus, flagellin, or peptides or proteins derived from flagellin and/or variants or fragments of flagellin are also suitable as TLR peptide agonists comprised by the peptide conjugate of the present invention.

Non-limiting examples of TLR peptide agonists thus include the TLR2 lipopeptide agonists MALP-2, Pam2Cys and Pam3Cys or modifications thereof, different forms of the TLR4 agonist LPS, e.g. N. meningitidis wild-type L3-LPS and mutant penta-acylated LpxL1-LPS, and the TLR5 agonist flagellin.

A further non-limiting example of a TLR2 peptide agonist is annexin II or an immunomodulatory fragment thereof, which is described in detail in WO 2012/048190 A1 and U.S. patent application Ser. No. 13/033,1546.

In a further non-limiting example, high-mobility group box 1 protein (HMGB1) and peptide fragments thereof are assumed to be TLR4 agonists. Such HMGB1-derived peptides are for example disclosed in US 2011/0236406 A1.

The peptide conjugate according to the present invention may comprise at least one TLR agonist, preferably the peptide conjugate may comprise more than one TLR agonist, in particular 2, 3, 4, 5, 6, 7, 8, 9, 10 or more TLR agonists.

The at least one TLR agonist comprised by the peptide conjugate according to the present invention may be the same or different. Preferably, the various TLR agonists comprised by the peptide conjugate of the present invention are different from each other.

It is understood that a number of different TLR agonists activating the same or different TLR receptors may be advantageously comprised by a single peptide conjugate according to the present invention.

The isolated peptide may be administered to a human subject in order to treat or prevent a cancer or viral infection associated with impaired HLA class I antigen presentation. For example, the isolated peptide may be administered to the subject in order to induce or enhance their immune response. The peptide may therefore be administered to the subject to induce T cell activation (e.g. in vivo T cell activation) in the subject, wherein the activated T cells are specific for the peptide (and thus will specifically target the cancerous or virally infected cells).

The isolated peptide may be administered as a peptide vaccine for treating or preventing a cancer or viral infection associated with impaired HLA class I antigen presentation. The isolated peptide may be administered to induce or enhance activation of T cells specific for cancerous or virally infected cells.

Similarly, nucleic acid sequences and vectors encoding the peptides described herein may be administered as a nucleic acid vaccine for treating or preventing a cancer or viral infection associated with impaired HLA class I antigen presentation. The isolated nucleic acid sequences and vectors may be administered to induce or enhance activation of T cells specific for cancerous or virally infected cells.

The peptides described herein (and corresponding nucleic acid sequences or vectors encoding the same) may be particularly useful as an immunotherapy for human subjects that are positive for HLA-A*02.

HLA-A*02 is a globally common human leukocyte antigen serotype within the HLA-A serotype group. Several subtypes exist within the HLA-A*02 group, including HLA-A*0201, HLA-A*0202, HLA-A*0203, HLA-A*0204, HLA-A*0205, HLA-A*0206, HLA-A*0209, HLA-A*0211, HLA-A*0212, HLA-A*0216, HLA-A*0219, HLA-A*0250. The data presented herein focuses on HLA-A*0201, however, as would be clear to a person of skill in the art, other subtypes within the HLA-A*02 group (including but not limited to those listed herein) may also bind to SEQ ID NO:2, the natural short epitope from LRPAP1 (see for example Ressing et al., 1999, particularly Tables 3 and 2). All HLA-A*02 subtypes are therefore encompassed herein, although HLA-A*0201 is preferred (see Table 1 below).

TABLE 1

| A | | | B | | |
|---|---|---|---|---|---|
| Peptide: FLGPWPAAV Allele: | | | Peptide: FLGPWPAAS Allele: | | |
| | Affinity (nM) | Rank (%) | | Affinity (nM) | Rank (%) |
| HLA-A0201 | 6 | 0.05 | HLA-A0201 | 364.8 | 2.5 |
| HLA-A0202 | 4.4 | 0.05 | HLA-A0202 | 136.1 | 2.5 |
| HLA-A0203 | 2.2 | 0.01 | HLA-A0203 | 29.9 | 0.8 |
| HLA-A0205 | 30.6 | 0.01 | HLA-A0205 | 5180.8 | 1.1 |
| HLA-A0206 | 22.1 | 0.5 | HLA-A0206 | 1946.6 | 7.5 |
| HLA-A0207 | 5453.1 | 0.125 | HLA-A0207 | 28769.8 | 5.5 |
| HLA-A0211 | 1.6 | 0.01 | HLA-A0211 | 3.4 | 0.1 |
| HLA-A0212 | 2.1 | 0.01 | HLA-A0212 | 50.8 | 0.5 |
| HLA-A0216 | 2.6 | 0.01 | HLA-A0216 | 17.5 | 0.2 |
| HLA-A0217 | 30 | 0.03 | HLA-A0217 | 3480.7 | 2.5 |
| HLA-A0219 | 3.6 | 0.015 | HLA-A0219 | 315.1 | 0.7 |
| HLA-A0250 | 2.4 | 0.01 | HLA-A0250 | 8.7 | 0.15 |

Predicted binding affinity of FLGPWPAAV and FLGPWPAAS into different HLA-A2 alleles;
Predicted binding affinity of FLGPWPAAV (A) and FLGPWPAAS (B) with HLA-A2 alleles is determined using the MHCnet 4.0 algorithm.
The value under affinity (in nanomolar, nM) measures the predicted binding affinity with the corresponding HLA-A2 allele.
The rank (in %) is determined by comparing the predicted binding affinity to a set of 400.000 random natural peptides.
Strong binders are defined as rank lower than 0.5%, and weak binders with rank below 2%.

Nucleic Acid Sequences

Isolated nucleic acid sequences that encode peptides comprising an amino acid sequence of SEQ ID NO:1 are described herein, as well as nucleic acid sequences encoding binding agents described herein.

As used herein "nucleic acid sequence", "polynucleotide", "nucleic acid" and "nucleic acid molecule" are used interchangeably to refer to an oligonucleotide sequence or polynucleotide sequence. The nucleotide sequence may be of genomic, synthetic or recombinant origin, and may be double-stranded or single-stranded (representing the sense or antisense strand). The term "nucleotide sequence" includes genomic DNA, cDNA, synthetic DNA, and RNA (e.g. mRNA) and analogs of the DNA or RNA generated, e.g., by the use of nucleotide analogs.

As used herein, "isolated nucleic acid sequence" refers to a nucleic acid sequence that is not in its natural environment when it is linked to its naturally associated sequence(s) that is/are also in its/their natural environment. In other words, an isolated nucleic acid sequence is not a native nucleotide sequence, wherein "native nucleotide sequence" means an entire nucleotide sequence that is in its native environment and when operatively linked to an entire promoter with which it is naturally associated, which promoter is also in its native environment.

Vectors and Modified Cells

In one aspect, the invention provides a vector that comprises a nucleic acid sequence described herein (e.g. a nucleic acid sequence that encodes a peptide comprising an amino acid sequence of SEQ ID NO:1).

Any appropriate vector can be used. By way of example only, the vector may be a plasmid or a viral vector, such as a retroviral vector or a lentiviral vector. Adenovirus, adeno-associated virus, vaccinia virus, canary poxvirus, herpes virus, minicircle vectors and naked (synthetic) DNA/RNA may also be used (for details on minicircle vectors, see for example non-viral Sleeping Beauty transposition from minicircle vectors as published by R Monjezi, C Miskey, T Gogishvili, M Schleef, M Schmeer, H Einsele, Z Ivics and M Hudecek in Leukemia 2016).

Optionally, the vector comprises the nucleic acid sequence operably linked to a promoter.

As used herein, the term "vector" refers to a nucleic acid sequence capable of transporting another nucleic acid sequence to which it has been operably linked. The vector can be capable of autonomous replication or it can integrate into a host DNA. The vector may include restriction enzyme sites for insertion of recombinant DNA and may include one or more selectable markers or suicide genes. The vector can be a nucleic acid sequence in the form of a plasmid, a bacteriophage or a cosmid. Preferably the vector is suitable for expression in a cell (i.e. the vector is an "expression vector"). Preferably, the vector is suitable for expression in a human antigen presenting cell. In certain aspects, the vector is a viral vector, such as a retroviral vector, a lentiviral vector or an adeno-associated vector. Optionally, the vector is selected from the group consisting of an adenovirus, vaccinia virus, canary poxvirus, herpes virus, minicircle vector and synthetic DNA or synthetic RNA.

Preferably the (expression) vector is capable of propagation in a host cell and is stably transmitted to future generations.

"Operably linked" as used herein, refers to a single or a combination of the below-described control elements together with a coding sequence in a functional relationship with one another, for example, in a linked relationship so as to direct expression of the coding sequence.

The vector may comprise regulatory sequences. "Regulatory sequences" as used herein, refers to, DNA or RNA elements that are capable of controlling gene expression. Examples of expression control sequences include promoters, enhancers, silencers, TATA-boxes, internal ribosomal entry sites (IRES), attachment sites for transcription factors, transcriptional terminators, polyadenylation sites etc. Optionally, the vector includes one or more regulatory sequences operatively linked to the nucleic acid sequence to be expressed. Regulatory sequences include those which direct constitutive expression, as well as tissue-specific regulatory and/or inducible sequences.

The vector may comprise a promoter. "Promoter", as used herein, refers to the nucleotide sequences in DNA to which RNA polymerase binds to start transcription. The promoter may be inducible or constitutively expressed. Alternatively, the promoter is under the control of a repressor or stimulatory protein. The promoter may be one that is not naturally found in the host cell (e.g. it may be an exogenous promoter). The skilled person in the art is well aware of appropriate promoters for use in the expression of target proteins, wherein the selected promoter will depend on the host cell.

The vector may comprise a transcriptional terminator. "Transcriptional terminator" as used herein, refers to a DNA element, which terminates the function of RNA polymerases responsible for transcribing DNA into RNA. Preferred transcriptional terminators are characterized by a run of T residues preceded by a GC rich dyad symmetrical region.

The vector may comprise a translational control element. "Translational control element", as used herein, refers to DNA or RNA elements that control the translation of mRNA. Preferred translational control elements are ribosome binding sites. Preferably, the translational control element is from a homologous system as the promoter, for example a promoter and its associated ribozyme binding site. Preferred ribosome binding sites are known, and will depend on the chosen host cell.

The vector may comprise restriction enzyme recognition sites. "Restriction enzyme recognition site" as used herein, refers to a motif on the DNA recognized by a restriction enzyme.

The vector may comprise a selectable marker. "Selectable marker" as used herein, refers to proteins that, when expressed in a host cell, confer a phenotype onto the cell which allows a selection of the cell expressing said selectable marker gene. Generally, this may be a protein that confers a new beneficial property onto the host cell (e.g. antibiotic resistance) or a protein that is expressed on the cell surface and thus accessible for antibody binding. Appropriate selectable markers are well known in the art.

Optionally, the vector may also comprise a suicide gene. "Suicide gene" as used herein, refers to proteins that induce death of the modified cell upon treatment with specific drugs. By way of example, suicide can be induced of cells modified by the herpes simplex virus thymidine kinase gene upon treatment with specific nucleoside analogs including ganciclovir, cells modified by human CD20 upon treatment with anti-CD20 monoclonal antibody and cells modified with inducible Caspase9 (iCasp9) upon treatment with AP1903 (reviewed by BS Jones, L S Lamb, F Goldman, A Di Stasi; Improving the safety of cell therapy products by suicide gene transfer. Front Pharmacol. (2014) 5:254. Appropriate suicide genes are well known in the art.

Preferably the vector comprises those genetic elements which are necessary for expression of the polypeptides described herein by a host cell. The elements required for transcription and translation in the host cell include a promoter, a coding region for the protein(s) of interest, and a transcriptional terminator.

A person of skill in the art will be well aware of the molecular techniques available for the preparation of (expression) vectors and how the (expression) vectors may be transduced or transfected into an appropriate host cell (thereby generating a modified cell as described herein). The (expression) vector of the present invention can be introduced into cells by conventional techniques such as transformation, transfection or transduction.

"Transformation", "transfection" and "transduction" refer generally to techniques for introducing foreign (exogenous) nucleic acid sequences into a host cell, and therefore encompass methods such as electroporation, microinjection, gene gun delivery, transduction with retroviral, lentiviral or adeno-associated vectors, lipofection, superfection etc. The specific method used typically depends on both the type of vector and the cell. Appropriate methods for introducing nucleic acid sequences and vectors into host cells such as human cells are well known in the art; see for example Sambrook et al (1989) Molecular Cloning, A Laboratory Manual, Cold Spring Harbor Laboratory, Cold Spring Harbor, NY; Ausubel et al (1987) Current Protocols in Molecular Biology, John Wiley and Sons, Inc., NY; Cohen et al (1972) Proc. Natl. Acad. Sci. USA 69, 2110; Luchansky et al (1988) Mol. Microbiol. 2, 637-646. Further conventional methods that are suitable for preparing expression vectors and introducing them into appropriate host cells are described in detail in WO2016/071758 for example.

It is understood that it some embodiments, the host cell is contacted with the vector (e.g. viral vector) in vitro, ex vivo, and in some embodiments, the host cell is contacted with the vector (e.g. viral vector) in vivo.

The term "host cell" includes any cell into which the nucleic acid sequences or vectors described herein may be introduced (e.g. transduced). Once a nucleic acid molecule or vector has been introduced into the cell, it may be referred to as a "modified cell" herein. Once the nucleic acid molecule or vector is introduced into the host cell, the resultant modified cell should be capable of expressing the encoded polypeptide.

The term "modified cell" refers to a genetically altered (e.g. transformed, transduced or transfected) cell. The term refers to the particular subject cell and also to the progeny or potential progeny of such a cell. Because certain modifications may occur in succeeding generations due to either mutation or environmental influences, such progeny may not, in fact, be identical to the parent cell, but are still included within the scope of the term as used herein.

Although the host cell (and thus the modified cell) may be a bacterial cell, it is typically a eukaryotic cell, and particularly a human cell which can overexpress the antigen for uptake by antigen presenting cells (APCs), more particularly an antigen presenting cell, such as dendritic cells (DCs), B cells, monocytes, macrophages. The host cell (and thus the modified cell) may be an autologous cell, which refers to a cell derived from the same individual to which it is later administered. In other words, the host cell (and thus the modified cell) may be a cell from a subject to be treated. Suitably, the host cell (and thus the modified cell) may be isolated from a blood sample e.g. by leukaphoresis.

The modified cell is typically a human cell.

Advantageously, the modified cell is capable of expressing the polypeptide encoded by the nucleic acid sequence or vector described herein such that the modified cell provides an immunotherapy that specifically targets cancerous cells or virally infected cells associated with impaired HLA class I antigen presentation and this can be used to treat or prevent cancer or viral infections associated with impaired HLA class I antigen presentation. More details on this use are given below.

Methods for Preparing Peptides

As described above, the peptide according to the present invention may be a natural peptide or a synthetic peptide. In another aspect, the peptide of the present invention may be modified. Methods of preparing a peptide of the invention are also provided herein. In one aspect, the methods of preparing a peptide of the invention provided herein may be natural methods. In another aspect, the method of preparing a peptide of the invention may be synthetic methods. Alternatively, the method of preparing a peptide of the invention may comprise natural and synthetic methods.

The methods of preparing a peptide of the invention provided herein may be natural methods. Such methods comprise cultivating a modified cell that has been transformed, transfected or transduced with a nucleic acid (e.g. vector) encoding the peptide of interest in a culture medium and separating the peptide from the culture medium or from the modified cell lysate after cell lysis.

In this context, the modified cell is used to express the peptide of interest. Examples of such cells include, but are not limited to, bacterial cells, e.g. E. coli, and eukaryotic cells, e.g., yeast cells, animal cells or plant cells. In one example the cells are mammalian, e.g., human, CHO, HEK293T, PER.C6, NS0, myeloma or hybridoma cells. Dendritic cells and dendritic cell lines are particularly preferred.

Typically, as described above, the nucleic acid encoding the peptide of interest is present within a vector, such as an expression vector. In some examples, an appropriate secretion signal can be integrated in the vector, so that the peptide encoded by the nucleic acid will be directed, for example towards the lumen of the endoplasmic reticulum, towards the periplasmic space, on the membrane or towards the extracellular environment. The choice of appropriate secretion signal may facilitate subsequent protein purification. Selection of appropriate secretion signals are well within the capabilities of a person with average skill in the art.

Typically, the choice of a culture medium depends in particular on the choice of the cell type and/or the cell line that is used to express the peptide of interest. A person of skill in the art is well aware of suitable culture media, which are appropriate for a selected cell type and/or cell line.

The cells are cultivated in the appropriate culture medium for a period that is sufficient to induce expression of the encoded peptide. Suitable time periods and conditions for culturing cells are well known in the art and depend on the specific cell type and/or cell line that is used.

Once the peptide is expressed by the cells, it may be purified using standard methods. For example, commercially available kits and/or reagents for protein extraction may be used, for example BugBuster™ from Novagen. Alternative standard methods such as affinity chromatography, ion-exchange chromatography, hydrophobic interaction chromatography, and immunoaffinity methods may also be used.

Alternatively, the peptides of the invention may be prepared by synthetic methods. Such methods are well described in the literature. Non-limiting examples include liquid phase peptide synthesis methods or solid peptide synthesis methods, e.g. solid peptide synthesis methods according to Merrifield, t-Boc solid-phase peptide synthesis, Fmoc solid-phase peptide synthesis, BOP (Benzotriazole-1-yl-oxy-tris-(dimethylamino)-phosphonium hexafluorophosphate) based solid-phase peptide synthesis, etc.

Peptide-Loaded Cells

A cell loaded with a peptide described herein is also provided. These cells may advantageously be used in the therapeutic methods described below.

As used herein a cell "loaded" with peptide refers to a cell wherein the peptide is in association with an MHC (major histocompatibility complex) on the surface of the cell. Typically, cells loaded with peptide do not express the peptide themselves, but present exogenous peptides in the context of MHC. Cells may be pulsed with exogenous peptide in order to "load" them with peptide. Cells loaded with peptides may therefore also be referred to as cells comprising the peptide of interest (e.g. exogenous peptide), wherein the peptide of interest is part of an MHC complex on the surface of the cell. In other words, such cells comprise extracellular (or cell surface) MHC complexed with the peptide of interest. The presence of the peptide within the MHC of an antigen presenting cell is referred to as "antigen presentation" herein. Antigen presentation is the expression of antigen molecules on the surface of a macrophage or other antigen-presenting cell in association with MHC class II molecules when the antigen is being presented to a CD4+ helper T cell or in association with MHC class I molecules when presentation is to CD8+ cytotoxic T cells.

Cells loaded with the peptide as defined herein may be cells from a subject to be treated. In particular, they may be cells that have been isolated from a subject to be treated. Alternatively, cell lines, e.g. antigen presenting cell lines, may also be used.

Preferably, the cell loaded with the peptide as defined herein is an antigen-presenting cell (APC). Preferably, the antigen presenting cell is selected from the group consisting of a dendritic cell (DC), a macrophage, a monocyte, a B-cell and a synthetic form of antigen presenting cell. Dendritic cells, in particular dendritic cells (conventional and/or plasmacytoid) isolated from a subject to be treated, are most preferred.

Methods to isolate antigen-presenting cells, in particular dendritic cells, from a subject are known to the skilled person. They include harvesting monocytes or hematopoietic stem cells from bone marrow, cord blood, or peripheral blood. They also include the use of embryonic stem (ES) cells and induced pluripotent stem cells (iPS). Antigen presenting cells, in particular dendritic cells or their precursors, can be enriched by methods including elutriation and magnetic bead based separation, which may involve enrichment for CD14+ precursor cells.

Methods to load the complex as defined herein into the cells, preferably into the above-mentioned antigen presenting cells, more preferably into dendritic cells, and further to prepare such cells before administration to a subject are known to one skilled in the art. For example, preparation of dendritic cells can include their culture or differentiation using cytokines that may include for example GM-CSF and IL-4. Dendritic cell lines may also be employed.

Loading of the peptide into the cells, preferably into APC, more preferably into the dendritic cells, can involve co-incubation of the peptide with the cells in culture. Further culture of the cells, e.g. the dendritic cells, thus loaded to induce efficient maturation can include addition of cytokines including IL-1β, IL-6, TNFα, PGE2, IFNα, and adjuvants. Appropriate methods and reagents are well known to a person of skill in the art.

Pharmaceutical Compositions

A pharmaceutical composition is provided comprising an a) isolated peptide, b) nucleic acid sequence, c) vector, d) binding agent or e) cell described herein, and a pharmaceutically acceptable excipient, adjuvant, diluent and/or carrier.

For the avoidance of doubt, any one of a), b), c) or d) may be present in the pharmaceutical composition by virtue of them being encoded or expressed (as appropriate) by a cell that is present within the pharmaceutical composition. As an example, any one of b) or c) may be encoded by a cell that is combined with a pharmaceutically acceptable excipient, adjuvant, diluent and/or carrier to generate the pharmaceutical composition; or any of a) or d) may be expressed by a cell that is combined with a pharmaceutically acceptable excipient, adjuvant, diluent and/or carrier to generate the pharmaceutical composition. More details on this are provided below.

A nucleic acid sequence, vector, cell, binding agent, isolated protein or peptide as described herein may therefore be provided as part of a pharmaceutical composition. Advantageously, such compositions may be administered to a human subject in order to treat or prevent a cancer or viral infection associated with impaired HLA class I antigen presentation (e.g. by inducing or enhancing a specific immune response to such cancerous or virally infected cells).

The terms "pharmaceutical composition" and "composition" are used interchangeably herein, unless the context specifically requires otherwise.

A pharmaceutical composition may comprise a nucleic acid sequence, vector, cell, binding agent or isolated protein or peptide described herein along with a pharmaceutically acceptable excipient, adjuvant, diluent and/or carrier.

For the avoidance of doubt, the nucleic acid sequence, vector, binding agent or isolated peptide may be present in the pharmaceutical composition as part of a cell. In other words, the nucleic acid sequence or vector may be incorporated into a cell; or the binding agent or peptide may be expressed by a cell. The cell may be any suitable cell, for example a bacterial cell, or a eukaryotic cell such as a mammalian cell e.g. a dendritic cell (DC)—(in such cases, the mammalian cell is typically an ex vivo cell). A pharmaceutical composition comprising a nucleic acid sequence, vector, binding agent or isolated protein or peptide described herein therefore encompasses a pharmaceutical composition comprising a cell (e.g. a bacterial cell, DC, etc) that encodes the nucleic acid sequence or vector, or is capable of expressing the peptide or binding agent.

Suitably, the cell (e.g. bacterial cell, DC, etc) may be a cell that has been modified to introduce into the cell the appropriate nucleic acid sequence/vector (e.g. by transduction, transfection or transformation) such that the modified cell encodes the nucleic acid sequence/vector and becomes capable of expressing the nucleic acid sequence, vector, peptide or binding agent of interest. Such cells may be combined with a pharmaceutically acceptable excipient, adjuvant, diluent and/or carrier to generate a pharmaceutical composition of the invention. The cell may modified ex vivo. For example, it may be an autologous cell that has been derived from the subject that is to be treated with the pharmaceutical composition described herein (e.g. for treating or preventing a cancer or viral infection associated with impaired HLA class I antigen presentation). The cells may be modified ex vivo to introduce e.g. the nucleic acid sequence, or vector into the cell such that the modified cell encodes the nucleic acid sequence/vector and becomes capable of expressing the nucleic acid sequence or vector to generate the peptide or binding agent of interest. The modified cells may then be administered to the subject as a pharmaceutical composition.

Compositions may routinely contain pharmaceutically acceptable concentrations of salt, buffering agents, preservatives, compatible carriers, supplementary immune potentiating agents such as adjuvants and cytokines and optionally other therapeutic agents or compounds.

As used herein, "pharmaceutically acceptable" refers to a material that is not biologically or otherwise undesirable, i.e., the material may be administered to an individual along with the selected nucleic acid sequence, vector, cell, binding agent or isolated peptide without causing any undesirable biological effects or interacting in a deleterious manner with any of the other components of the pharmaceutical composition in which it is contained.

Excipients are natural or synthetic substances formulated alongside an active ingredient (e.g. a nucleic acid sequence, vector, cell, binding agent or isolated peptide as provided herein), included for the purpose of bulking-up the formulation or to confer a therapeutic enhancement on the active ingredient in the final dosage form, such as facilitating drug absorption or solubility. Excipients can also be useful in the manufacturing process, to aid in the handling of the active substance concerned such as by facilitating powder flowability or non-stick properties, in addition to aiding in vitro stability such as prevention of denaturation over the expected shelf life. Pharmaceutically acceptable excipients are well known in the art. A suitable excipient is therefore easily identifiable by one of ordinary skill in the art. By way of example, suitable pharmaceutically acceptable excipients include water, saline, aqueous dextrose, glycerol, ethanol, and the like.

Adjuvants are pharmacological and/or immunological agents that modify the effect of other agents in a formulation. Pharmaceutically acceptable adjuvants are well known in the art. A suitable adjuvant is therefore easily identifiable by one of ordinary skill in the art.

Diluents are diluting agents. Pharmaceutically acceptable diluents are well known in the art. A suitable diluent is therefore easily identifiable by one of ordinary skill in the art.

Carriers are non-toxic to recipients at the dosages and concentrations employed and are compatible with other ingredients of the formulation. The term "carrier" denotes an organic or inorganic ingredient, natural or synthetic, with which the active ingredient is combined to facilitate the application. Pharmaceutically acceptable carriers are well known in the art. A suitable carrier is therefore easily identifiable by one of ordinary skill in the art.

The pharmaceutical compositions described herein may be administered to a subject as a monotherapy or as part of a combination therapy. For example, combinations of the vaccines described herein with an immune checkpoint inhibitor or other immunomodulatory compounds may also be particularly useful for targeting immune-escaped TAP-deficient cancers, as has been shown for the combination of cancer-virus vaccination with PD-1 blockade[11].

Accordingly, the pharmaceutical compositions provided herein may be used in combination with an immune checkpoint inhibitor blocks PD-1, CTLA-4, PD-L1, TIM3, TIGIT, VISTA, NKG2A or LAG-3.

In a particular example, the pharmaceutical compositions provided herein may be used in combination with an immune check point inhibitor that is selected from an antibody that blocks CTLA-1 OR PD-1/PD-L1 OR NKG2A. Such antibodies are showing real promise in the clinic in the treatment of patients with a variety of malignancies.

As a specific example, the immune checkpoint inhibitor may be an inhibitor of PD-1 and/or PD-L1 activity. In other words, the immune checkpoint inhibitor may result in PD-1 or PD-L1 blockade. The inhibitor of PD-1 and/or PD-L1 activity may be e.g. an antibody that blocks PD-L1 binding to PD1 (or vice versa).

Administration of the pharmaceutical composition and the immune checkpoint inhibitor may be in any order. Preferably, the pharmaceutical composition is administered at the same time or after the immune checkpoint inhibitor. Alternatively, the pharmaceutical composition is administered at the same time or before the immune checkpoint inhibitor.

Treatment of a Subject

Pharmaceutical compositions described herein may advantageously be used as a medicament. The compositions may be used to treat or prevent a cancer or a viral infection associated with impaired HLA class I antigen presentation in a human subject. Preferably, the human subject is positive for HLA-A*02, such as HLA-A*0201.

The pharmaceutical compositions for use as a medicament (e.g. in the prevention or treatment of a cancer or a viral infection associated with impaired HLA class I antigen presentation in a human subject) may comprise a nucleic acid sequence, vector, cell, binding agent or isolated protein or peptide described herein along with a pharmaceutically acceptable excipient, adjuvant, diluent and/or carrier. As discussed in detail elsewhere herein, this encompasses pharmaceutical compositions comprising cells that encode or express the appropriate nucleic acid sequence, vector, peptide or binding agent.

The method of treatment or prevention of a cancer or a viral infection associated with impaired HLA class I antigen presentation described herein results in an induced or enhanced immune response (e.g. a cell mediated response)

in the subject (e.g. a targeted immune response to cancerous or virally infected cells that present the HLA-A restricted peptide).

The phrase "induced or enhanced immune response" refers to an increase in the immune response (e.g. a cell mediated immune response such as a T cell mediated immune response) of the subject during or after treatment compared to their immune response prior to treatment. An "induced or enhanced" immune response therefore encompasses any measurable increase in the immune response that is directly or indirectly targeted to the cancer or viral infection being treated.

Compositions of the invention may be used to treat or prevent a cancer associated with impaired HLA class I antigen presentation. A person of skill in the art will be fully aware of cancers that are associated with impaired HLA class I antigen presentation and thus may be treated in accordance with the invention.

Suitably, the cancer is cancer with impaired peptide processing machinery. In one example, the cancer is lung carcinoma.

Compositions of the invention may also be used to treat or prevent a viral infection associated with impaired HLA class I antigen presentation. A person of skill in the art will be fully aware of viral infections that are associated with impaired HLA class I antigen presentation and thus may be treated in accordance with the invention.

As used herein, a cancer or viral infection "associated with impaired HLA class I antigen presentation" refers to a cancer or viral infection that results in a change in the HLA class I antigen presentation pathway in the cancerous or virally infected cell, which results in a reduction in HLA class I antigen presentation in these cells. In this context, a reduction encompasses a decrease of at least 10%, at least 20%, at least 30%, at least 40%, at least 50%, at least 60% etc in the presentation of non-TEIPP HLA class I-restricted antigens at the cell surface of these cells (at a given time) compared to control cells (e.g. derived from the same subject that are not cancerous and are not virally infected).

There are several molecular pathways that may be altered in the cancerous or virally infected cell to impair HLA class I antigen presentation. By way of example, it is known that 1-2% of melanomas have deleterious mutations in TAP1 or TAP2, and that a high frequency of metastatic melanomas display low TAP1 expression due to epigenetic silencing[5,7].

A cancer or viral infection associated with impaired HLA class I antigen presentation may therefore be a cancer or viral infection wherein the tumor cells or infected cells have a mutated TAP1 or TAP2 gene. In one example, the mutation reduces TAP1 or TAP2 expression (such that the tumor cell or virally infected cell has low TAP1 or TAP2 expression). In another example, the mutation reduces TAP1 or TAP2 activity in the cell (such that the tumor cell or virally infected cell has reduced/low TAP1 or TAP2 activity). In other example, the mutation reduces TAP1 or TAP2 protein levels in the cell (e.g. the tumor cell or virally infected cell has reduced/low TAP1 or TAP2 protein expression and/or reduced/low TAP1 or TAP2 protein stability).

TAP1 or TAP2 expression may also be reduced/low in a cancerous cell or virally infected cell due to epigenetic silencing. Methods for detecting TAP1 or TAP2 epigenetic silencing are well known in the art.

TAP1 or TAP2 expression, activity, protein level and/or protein stability may also be reduced/low in a cancerous cell or virally infected cell for other reasons than mutation of the TAP1 or TAP2 genes (e.g. due to the cancer/virus altering the molecular machinery and pathways of the cell).

The cancer or viral infection may therefore be a cancer or viral infection associated with reduced (or low) TAP1 or TAP2 protein expression, activity, level, or stability.

Methods for determining the presence of mutations in TAP1 or TAP2 are well known in the art. Furthermore, methods for determining TAP1 or TAP2 expression levels, TAP1 or TAP2 activity levels, TAP1 or TAP2 protein levels, and TAP1 or TAP2 protein stability are well known in the art.

For example, the expression level may be detected by measuring mRNA e.g. using Northern blot analysis or rtPCR). The level of protein may be detected using TAP1 or TAP2 specific antibodies (e.g. with a detectable label) and methods such as enzyme linked immunosorbent assays (ELISAs), immunoprecipitation, immunofluorescence, enzyme immunoassay (EIA), radioimmunoassay (RIA), and Western blot analysis may be used. Other standard methods for determining these parameters are well known in the art.

As stated above, the cancer or viral infection may be a cancer or viral infection associated with reduced (or low) TAP1 or TAP2 protein expression, activity, level, or stability.

As used herein, "reduced (or low) TAP1 or TAP2 protein expression, activity, level, or stability" refers to a decrease in the protein expression activity, level, or stability compared to a control or a reference level (e.g. at least a 5%, 10%, 15%, 20%, 30%, 40%, 50%, 60%, 70%, 80%, 90%, 100% decrease). As used herein "reference level" or "control", refers to a cell sample having a normal level of TAP1 or TAP2 protein expression, activity, level, or stability, for example a sample from a healthy subject not having or suspected of having cancer or a viral infection or alternatively a cell sample from the same subject being tested, where the control or reference level cell sample is not (and is not suspected of being) cancerous or virally infected. Alternatively, the reference level may be a TAP1 or TAP2 protein expression, activity, level, or stability value from a reference database, which may be used to generate a pre-determined cut off value, i.e. a diagnostic score that is statistically predictive of a symptom or disease or lack thereof or may be a pre-determined reference level based on a standard population sample, or alternatively, a pre-determined reference level based on a subject's base line level of expression, i.e. prior to developing or being suspected of having cancer or a viral infection. For example, reduced or low protein expression may be determined using immunohistochemistry, using anti-TAP1 or anti-TAP2 antibodies, such as the anti-TAP1 Antibody, clone mAb 148.3 (MABF125 EMD Millipore). In one example, evaluation of TAP1 or TAP2 normal level protein expression in a sample as compared to reduced or low level of expression is determined by the 'De Ruiter' evaluation method. For example, in such a method the sample is a cancer or tumour sample. Alternatively, where the sample is a viral sample, the presence of immune modulatory viral gene products, for example CMV, HSV or BVS, reduces the expression and/or activity of TAP function and the presence of such gene products can be used as a marker of reduced or low TAP1 or TAP2 expression and/or activity.

Other molecular pathways that may be altered in the cancerous or virally infected cell to impair HLA class I antigen presentation include for example a deficiency in tapasin (a chaperone protein involved in TAP-mediated peptide loading of MHC class I molecules) and inhibition of proteasome-mediated degradation of proteins into peptides for MHC class I presentation (see for example US2009/0220534 for more details).

As used herein, the terms "treat", "treating" and "treatment" are taken to include an intervention performed with the intention of preventing the development or altering the pathology of a condition, disorder or symptom (i.e. in this case a cancer or viral infection associated with impaired HLA class I antigen presentation). Accordingly, "treatment" refers to both therapeutic treatment and prophylactic or preventative measures, wherein the object is to prevent or slow down (lessen) the targeted condition, disorder or symptom. "Treatment" therefore encompasses a reduction, slowing or inhibition of the amount or concentration of malignant or virally infected cells, for example as measured in a sample obtained from the subject, of at least 5%, 10%, 20%, 30%, 40%, 50%, 60%, 70%, 80%, 90% or 100% when compared to the amount or concentration of malignant cells (or virally infected cells) before treatment. Methods of measuring the amount or concentration of malignant cells (or virally infected cells) include, for example, qRT-PCR, and quantification of specific biomarkers, such as peptides comprising the amino acid sequence of one of SEQ ID NO: 2, in a sample obtained from the subject.

As used here in the term "subject" refers to an individual, e.g., a human, having or at risk of having a specified condition, disorder or symptom. The subject may be a patient i.e. a subject in need of treatment in accordance with the invention. The subject may have received treatment for the condition, disorder or symptom. Alternatively, the subject has not been treated prior to treatment in accordance with the present invention. Preferably, the subject is a human subject, preferably a HLA*0201 positive human subject The compositions described herein can be administered to the subject by any conventional route, including injection or by gradual infusion over time. The administration may, for example, be by infusion or by intramuscular, intravascular, intracavity, intracerebral, intralesional, rectal, subcutaneous, intradermal, epidural, intrathecal, percutaneous administration.

The compositions described herein may be in any form suitable for the above modes of administration. For example, compositions comprising cells may in any form suitable for infusion. As further examples, suitable forms for parenteral injection (including, subcutaneous, intramuscular, intravascular or infusion) include a sterile solution, suspension or emulsion; suitable forms for topical administration include an ointment or cream; and suitable forms for rectal administration include a suppository. Alternatively, the route of administration may be by direct injection into the target area, or by regional delivery or by local delivery. The identification of suitable dosages of the compositions of the invention is well within the routine capabilities of a person of skill in the art.

Advantageously, the compositions of the invention may be formulated for use as a vaccine (e.g. a composition comprising a peptide, wherein the peptide comprises the amino acid sequence of SEQ ID NO: 1 (or the corresponding nucleic acid sequence or vector) may be formulated as a pharmaceutical composition that is suitable for use as a peptide vaccine). Alternatively, compositions comprising cells may also be formulated as pharmaceutical compositions that are suitable for use as a vaccine. Suitable cell, binding agent (e.g. antibody), peptide and nucleic acid vaccine formulations are well known in the art.

The pharmaceutical composition is preferably for, and therefore formulated to be suitable for, administration to a subject, preferably a human or animal subject. Preferably, the administration is parenteral, e.g. intravenous, subcutaneous, intramuscular, intradermal intracutaneous and/or intratumoral administration, i.e. by injection.

Preferably, the pharmaceutical composition comprises or consists of an amount of active ingredient (e.g. nucleic acid sequence, peptide, vector, binding agent, or cell) that constitutes a pharmaceutical dosage unit. A pharmaceutical dosage unit is defined herein as the amount of active ingredients (i.e. the total amount of peptide in a peptide-based vaccine for example) that is applied to a subject at a given time point. A pharmaceutical dosage unit may be applied to a subject in a single volume, i.e. a single shot, or may be applied in 2, 3, 4, 5 or more separate volumes or shots that are applied preferably at different locations of the body, for instance in the right and the left limb. It is to be understood herein that the separate volumes of a pharmaceutical dosage may differ in composition, i.e. may comprise different kinds or composition of active ingredients and/or adjuvants.

A single injection volume or shot (i.e. volume applied on one location at a certain time point), comprising a total pharmaceutical dosage, or part thereof in case multiple shots applied at substantially the same time point, may between 100 and 2 mL, or between 100 and 1 mL. The single injection volume may be 100 µl, 200 µl, 300 µl, 400 µl, 500 µl, 600 µl, 700 µl, 800 µl, 900 µl, 1 mL, 1.1 mL, 1.2 mL, 1.3 mL, 1.4 mL, 1.5 mL, 1.6 mL, 1.7 mL, 1.8 mL, 1.9 mL, 2 mL, 3 mL or any value in between.

The pharmaceutical dosage unit, or total amount of active ingredient applied to a subject at a given time point will depend on the type of vaccine (e.g. peptide, cell, nucleic acid etc). As an example, the pharmaceutical dosage unit, or total amount of peptide applied to a subject at a given time point, either in a single or in multiple injections at a certain time point, comprises an amount of peptide in the range from 0.1 µg to 20 mg, such as about 0.1 µg, 0.5 µg, 1 µg, 5 µg, 10 µg, 15 µg, 20 µg, 30 µg, 40 µg, 50 µg, 60 µg, 70 µg, 80 µg, 90 µg, 100 µg, 150 µg, 200 µg, 250 µg, 300 µg, 350 µg, 400 µg, 450 µg, 500 µg, 650 µg, 700 µg, 750 µg, 800 µg, 850 µg, 900 µg, 1 mg, 1.5 mg, 2 mg, 2.5 mg, 3 mg, 3.5 mg, 4 mg, 4.5 mg, 5 mg, 5.5 mg, 6 mg, 6.5 mg, 7 mg, 7.5 mg, 8 mg, 8.5 mg, 9 mg, 9.5 mg, 10 mg, 15 mg or about 20 mg or any value in between. Preferred ranges of pharmaceutical dosage units are from 0.1 µg to 20 mg, 1 µg to 10 mg, 10 µg to 5 mg, 0.5 mg to 2 mg, 0.5 mg to 10 mg or 1 mg to 5 mg or 2 to 4 mg.

The compositions described herein are for administration in an effective amount. An "effective amount" is an amount that alone, or together with further doses, produces the desired (therapeutic or non-therapeutic) response. The effective amount to be used will depend, for example, upon the therapeutic (or non-therapeutic) objectives, the route of administration, and the condition of the patient/subject. For example, the suitable dosage of the composition of the invention for a given patient/subject will be determined by the attending physician (or person administering the composition), taking into consideration various factors known to modify the action of the composition of the invention for example severity and type of haematological malignancy, body weight, sex, diet, time and route of administration, other medications and other relevant clinical factors. The dosages and schedules may be varied according to the particular condition, disorder or symptom the overall condition of the patient/subject. Effective dosages may be determined by either in vitro or in vivo methods.

The compositions of the present invention are advantageously presented in unit dosage form.

Binding Agents

Binding agents are described herein that specifically bind to a peptide comprising (or consisting of) the amino acid sequence of SEQ ID NO: 1. The binding agent is useful in the prevention or treatment of a cancer or viral infection associated with impaired HLA class I antigen presentation in a human subject.

The binding agent may specifically bind to an epitope within the amino acid sequence provided by SEQ ID NO: 1. As used herein the term "epitope" refers to a site on a target molecule (in this case the recited peptide) to which a binding agent binds. Epitopes are groupings of molecules such as amino acids or sugar side chains and usually have specific structural characteristics, as well as specific charge characteristics. A single peptide (antigen) may have more than one epitope. Epitopes can be formed both from contiguous or adjacent noncontiguous residues (e.g., amino acid residues) of the target molecule. Epitopes formed from contiguous residues (e.g., amino acid residues) typically are also called linear epitopes. An epitope typically includes at least 5 and up to about 12 residues, mostly between 6 and 10 residues (e.g. amino acid residues). Epitopes may also be conformational (i.e. non-linear).

In one example, the binding agent specifically binds to an epitope generated by the peptide itself. In another example, the binding agent (e.g. antibody) binds to an epitope generated by the combination of the peptide and the HLA molecule that presents it (i.e. an epitope that is generated when the peptide is presented on the cell surface by HLA class I, e.g. HLA*0201).

The binding agent of the invention may be any appropriate binding agent that specifically binds to a peptide comprising (or consisting of) the amino acid sequence of SEQ ID NO: 1.

An example of a suitable binding agent of the invention includes an HLA-A*02 molecule that specifically binds to the peptide comprising (or consisting of) the amino acid sequence of SEQ ID NO:1. Such HLA-A*02 molecules may be useful, for example, as part of a multimeric structure for use in administration to a subject for stimulating T cells in the subject (for example in the form of a synthetic DC).

Accordingly, in one example the binding agent that specifically binds to a peptide comprising (or consisting of) the amino acid sequence of SEQ ID NO: 1 comprises an HLA-A*02 molecule. Typically, in this context, the HLA-A*02 molecule specifically binds to a peptide comprising (or consisting of) the amino acid sequence of SEQ ID NO: 1. Such binding agents may be useful as pharmaceutical compositions, as described elsewhere herein.

In one example, the binding agent is an isolated binding agent. As used herein, an "isolated binding agent" refers to a binding agent that is not in its natural environment. The binding agent may therefore be a recombinant binding agent, or the binding agent may be of synthetic origin (or alternatively, of natural original, but isolated from its natural environment). In the context of this disclosure, the natural environment of binding agents such as HLA-A2*02 molecules is within the human body. Accordingly, when the binding agent (e.g. HLA-A2*02 molecules) are present e.g. in a pharmaceutical composition (comprising adjuvants etc) they are considered to be in isolated form, as they are not in their natural environment.

As used herein the terms "specific binding" and "binding specifically" (or other equivalent terms) are used interchangeably to indicate that other biomolecules do not significantly bind to the region (that is specifically binding to the peptide of interest (i.e. the recited peptide comprising the amino acid sequence of SEQ ID NO:1). In some embodiments, the level of binding to a biomolecule other than the peptide of interest results in a negligible (e.g., not determinable) binding affinity by means of ELISA or an affinity determination.

By "negligible binding" a binding is meant, which is at least about 85%, particularly at least about 90%, more particularly at least about 95%, even more particularly at least about 98%, but especially at least about 99% and up to 100% less than the binding to the peptide of interest (i.e. the recited peptide comprising the amino acid sequence of SEQ ID NO:1).

The binding affinity of the binding agent to the peptide of interest (i.e. the recited peptide comprising the amino acid sequence of one of SEQ ID NO:1) may be determined using a standard binding assay, such as surface plasmon resonance technique (BIAcore®, GE-Healthcare Uppsala, Sweden). The term "surface plasmon resonance," as used herein, refers to an optical phenomenon that allows for the analysis of real-time biospecific interactions by detection of alterations in protein concentrations within a biosensor matrix, for example using the BIAcore system (Pharmacia Biosensor AB, Uppsala, Sweden and Piscataway, N.J.). For further descriptions, see Jonsson, U., et al. (1993) Ann. Biol. Clin. 51: 19-26; Jonsson, U., et al. (1991) Biotechniques 11:620-627; Johnsson, B., et al. (1995) J. Mol. Recognit. 8: 125-131; and Johnnson, B., et al. (1991) Anal. Biochem. 198: 268-277.

General Definitions

As used herein, "specifically binds to FLGPWPAAV" refers to selective binding of the FLGPWPAAV peptide only. Under certain conditions, for example in an immunoassay as described herein, a polypeptide that "specifically binds to FLGPWPAAV" will selectively bind to this peptide and will not bind in a significant amount to other peptides (including FLGPWPAAS). Thus the polypeptide may bind to FLGPWPAAV with at least 10, 20, 30, 40, 50, or 100 fold more affinity than it binds to a control antigenic peptide. Selective binding may also be determined indirectly in the context of a modified cell that expresses a nucleic acid or vector of the invention (i.e. a CAR T cell or T cell expressing a TCR specific for FLGPWPAAV).

In assays such as, for example, an assay discussed herein, the modified cell is specifically reactive against a cell presenting FLGPWPAAV in the context of HLA-A*02 Thus, the modified cell may bind to a cell presenting FLGPWPAAV in the context of HLA-A*02 with at least 10, 20, 30, 40, 50, or 100 fold more reactivity when compared to its reactivity against a control cell line that does not present FLGPWPAAV in the context of HLA-A*02. The selective binding may be in the context of FLGPWPAAV presentation by HLA-A*02. In other words, in certain embodiments, a polypeptide that "specifically binds to FLGPWPAAV" may only do so when the peptide is being presented (i.e. it is bound by) HLA-A*02, or is in an equivalent structural formation as when it is being presented by HLA-A*02.

A "non-essential" (or "non-critical") amino acid residue is a residue that can be altered from the wild-type sequence of (e.g., the sequence identified by SEQ ID NO herein) without abolishing or, more preferably, without substantially altering a biological activity, whereas an "essential" (or "critical") amino acid residue results in such a change. For example, amino acid residues that are conserved are predicted to be particularly non-amenable to alteration, except that amino acid residues within the hydrophobic core of domains can generally be replaced by other residues having approximately equivalent hydrophobicity without significantly altering activity.

A "conservative amino acid substitution" is one in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), non-polar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine).

Thus, a nonessential (or non-critical) amino acid residue in a protein is preferably replaced with another amino acid residue from the same side chain family. Alternatively, in another embodiment, mutations can be introduced randomly, and the resultant mutants can be screened for activity to identify mutants that retain activity.

Calculations of sequence homology or identity (the terms are used interchangeably herein) between sequences are performed as follows.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In a preferred embodiment, the length of a reference sequence aligned for comparison purposes is at least 30%, preferably at least 40%, more preferably at least 50%, even more preferably at least 60%, and even more preferably at least 70%, 75%, 80%, 82%, 84%, 85%, 86%, 87%, 88%, 89%, 90%, 91%, 92%, 93%, 94%, 95%, 96%, 97%, 98%, 99%, or 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

The comparison of sequences and determination of percent identity between two sequences can be accomplished using a mathematical algorithm. In a preferred embodiment, the percent identity between two amino acid sequences is determined using the Needleman et al. (1970) *J. Mol. Biol.* 48:444-453) algorithm which has been incorporated into the GAP program in the GCG software package (available at http://www.gcg.com), using either a BLOSUM 62 matrix or a PAM250 matrix, and a gap weight of 16, 14, 12, 10, 8, 6, or 4 and a length weight of 1, 2, 3, 4, 5, or 6. In yet another preferred embodiment, the percent identity between two nucleotide sequences is determined using the GAP program in the GCG software package (available at http://www.gcg.com), using a NWSgapdna.CMP matrix and a gap weight of 40, 50, 60, 70, or 80 and a length weight of 1, 2, 3, 4, 5, or 6. A particularly preferred set of parameters (and the one that should be used if the practitioner is uncertain about what parameters should be applied to determine if a molecule is within a sequence identity or homology limitation of the invention) are a BLOSUM 62 scoring matrix with a gap penalty of 12, a gap extend penalty of 4, and a frameshift gap penalty of 5.

Alternatively, the percent identity between two amino acid or nucleotide sequences can be determined using the algorithm of Meyers et al. (1989) CAB/OS 4:11-17) which has been incorporated into the ALIGN program (version 2.0), using a PAM120 weight residue table, a gap length penalty of 12 and a gap penalty of 4.

The nucleic acid and protein sequences described herein can be used as a "query sequence" to perform a search against public databases to, for example, identify other family members or related sequences. Such searches can be performed using the NBLAST and XBLAST programs (version 2.0) of Altschul, et al. (1990) *J. Mol. Biol.* 215: 403-410). BLAST nucleotide searches can be performed with the NBLAST program, score=100, wordlength=12 to obtain nucleotide sequences homologous to nucleic acid molecules of the invention. BLAST protein searches can be performed with the XBLAST program, score=50, wordlength=3 to obtain amino acid sequences homologous to protein molecules of the invention. To obtain gapped alignments for comparison purposes, gapped BLAST can be utilized as described in Altschul et al. (1997, *Nucl. Acids Res.* 25:3389-3402). When using BLAST and gapped BLAST programs, the default parameters of the respective programs (e.g., XBLAST and NBLAST) can be used. See www.ncbi.nlm.nih.gov.

The polypeptides and nucleic acid molecules described herein can have amino acid sequences or nucleic acid sequences sufficiently or substantially identical to the sequences identified by SEQ ID NO. The terms "sufficiently identical" or "substantially identical" are used herein to refer to a first amino acid or nucleotide sequence that contains a sufficient or minimum number of identical or equivalent (e.g. with a similar side chain) amino acid residues or nucleotides to a second amino acid or nucleotide sequence such that the first and second amino acid or nucleotide sequences have a common structural domain or common functional activity. For example, amino acid or nucleotide sequences that contain a common structural domain having at least about 60%, or 65% identity, likely 75% identity, more likely 85%, 90%, 91%, 92%, 93%, 94%, 95%, 96%, 97%, 98% or 99% identity are defined herein as sufficiently or substantially identical.

Unless defined otherwise herein, all technical and scientific terms used herein have the same meaning as commonly understood by one of ordinary skill in the art to which this invention pertains. For example, Singleton and Sainsbury, Dictionary of Microbiology and Molecular Biology, 2d Ed., John Wiley and Sons, N Y (1994); and Hale and Marham, The Harper Collins Dictionary of Biology, Harper Perennial, NY (1991) provide those of skill in the art with a general dictionary of many of the terms used in the invention. Although any methods and materials similar or equivalent to those described herein find use in the practice of the present invention, the preferred methods and materials are described herein. Accordingly, the terms defined immediately below are more fully described by reference to the Specification as a whole. Also, as used herein, the singular terms "a", "an," and "the" include the plural reference unless the context clearly indicates otherwise. Unless otherwise indicated, nucleic acids are written left to right in 5' to 3' orientation; amino acid sequences are written left to right in amino to carboxy orientation, respectively. It is to be understood that this invention is not limited to the particular methodology, protocols, and reagents described, as these may vary, depending upon the context they are used by those of skill in the art.

The invention may be better understood by reference to the following non-limiting Examples, which are provided as exemplary of the invention. The following examples are presented in order to more fully illustrate the preferred embodiments of the invention and should in no way be construed, however, as limiting the broad scope of the invention.

EXAMPLES

Example 1: Design of a Long Peptide Vaccine Based on a Signal Peptide Associated with Cancer Immune Escape Material and Methods
Cell Culture Tumor cells were cultured in DMEM medium (Gibco) supplemented with 100 ug/mL streptomycin, 100 U/mL penicillin, 2 mM L-glutamine (Invitrogen) and 10% FCS (Gibco). Genetic disruption of the TAP1 gene in human tumor cell lines was performed with CRISPR/CAS9 and described before[7]. T cells were cultured in IMDM medium (Gibco) supplemented with 2 mM L-glutamine, 10% human serum (Sanquin), and 50 U/mL IL-2 (proleukine, Novartis). T cells were stimulated every 10-14 days using synthetic short peptide (in house synthesis) or 800 ng/ml PHA (Phytohaemagglutinin) (Murex Biotech), supplemented with 100 U/ml IL-2 and IL-7 (5 ng/mL), and a feeder mix containing irradiated PBMCs (lx $10^6$ cells, 80 Gy), and EBV-JY cells ($1\times10^5$ cells, 100 Gy). All cell types were maintained in humidified air incubator at 37° C. and 5% $CO_2$.
In Vitro Vaccination Protocol HLA-A*02:01 positive PBMCs were isolated from buffycoats from consented donors (Sanquin bloodbank, Amsterdam), using a gradient ficoll layer. PBMCs were incubated with anti-CD14 magnetic beads for 20 min at 4° C. and the CD14 positive monocytes were isolated using magnetic separation columns (miltenyi). CD14+ monocyte were cultured in RPMI medium supplemented with 10% FCS, GM-CSF (800 units/ml), and IL-4 (500 units/ml) for 6 days to generate immature monocyte-derived dendritic cells. On day 6, the immature moDCs were incubated with synthetic long peptide (20 μg/ml, in house synthesized) for 24 h, and matured with LPS (20 ng/ml) stimulation on day 7. Differentiation of monocytes to matured moDCs was verified by flow cytometry analysis. Matured moDCs were co-cultured with tetramer enriched T cell bulks in complete T cell medium. T cell bulks were stimulated a second time after 14 days. T cell specificity and reactivity were analyzed by flow cytometry.
T Cell Clone Isolation from Expanded T Cell Bulks Expanded CD8 T cells were single cell sorted on tetramer positive cells in 96-well plates, using an Aria III machine (BD). Following FACS sorting, single T cells were non-specifically stimulated using PHA (800 ng/mL), a feeder mix containing irradiated PBMCs ($1\times10^6$ cells, 80 Gy), and EBV-JY cells ($1\times10^5$ cells, 100 Gy), supplemented with IL-2 (100 units/mL) and IL-7 (5 ng/mL) every 10-14 days. Expanded T cell clones were analyzed on tetramer specificity and further expanded in T25 culture flasks using the non-specific (PHA) T cell expansion protocol.

T Cell Receptor Sequencing Monoclonal T cells ($2\times10^6$) were washed in cold PBS/BSA and pelleted by centrifugation. mRNA from T cell clones was isolated using the Dynabeads mRNA purification kit (Thermofisher). Full-length cDNA from the TCRα and TCRβ was generated using SMARTscribe reverse transcriptase with oligo's binding the constant domain of the TCRs[28]. Amplification of the cDNA transcript was done by standard PCR reaction using nested primers and high fidelity Taq polymerase. The PCR reaction mix was purified over a DNA purification column and nucleotide sequence analysis was done using Sanger sequencing (in house sequence facility). TCR sequencing results were analyzed using the T cell receptor sequence alignment software (V-quest) from IMGT (www.imgt.org/). Full-length codon optimized cDNA transcripts for murinized TCRs for both TCR-alpha and TCR-beta chains were cloned into a retroviral pMP71 flex expression vector[28]
Retrovirus Production and T Cell Transductions Platinum-Amphotropic retrovirus production (Plat-A) retroviral packing cells (Cell Biolabs) were used for retrovirus production. Plat-A cells were seeded in 6-well plates and incubated overnight until fully attached. Next, the cells were transfected with 2 μg pMP71_1A8 TCR vector using lipofectamine 2000. Retrovirus supernatant was collected on 24 h and 48 h after transfection, spun down to remove cells, and stored in −80° C. CD8 T cells were purified from PBMC using magnetic bead isolation (Miltenyi), and a-specifically activated by aCD3/aCD28 beads (Thermofisher). After 48 h, $1\times10^6$ activated CD8 T cells were plated in a retronectin (Takara) coated 24-well together with 0.5 mL retrovirus supernatant. Subsequently, CD8 T cells and retrovirus containing supernatant was spun down for 120 min at 1300 g to increase the efficiency of transduction. 48 h after transduction, the T cells were placed in a cell culture incubator for another 48 h.
Flow Cytometry Analysis Tetramer staining on CD8 T cells was performed by 15 min incubation at 4° C. and washed three times with cold PBS/BSA prior to cell surface staining. T cells were stained with anti-CD3 (clone SK-7, BD), anti-CD4 (clone SK-3, BD), anti-CD8 (clone SK-1, BD) antibodies for 30 min at 4° C. and washed three times with cold PBS/BSA. T cell activation was measured by intracellular IFNγ staining (XMF1.2, Biolegend) using an ICS kit (BioLegend) according to manufactures protocol. moDCs were stained with anti-CD1a (clone HI149, BD), anti-CD14 (clone M5E2, BD), anti-CD80 (clone L307.4, BD), anti-CD83 (clone HB15e, BD), anti-CD86 (clone IT2.2, biolegend), and anti HLA-DR (clone G46-6, BD) antibodies for 30 min at 4° C. and washed three times with cold PBS/BSA. Samples were acquired using a BD LSRFortessa™ flow cytometry system and analyzed using FlowJo software (Tree Star). Single cell sorting was done using a BD Aria III™ FACS.
Statistics Statistical analysis was calculated using the T-test (paired, two-tailed) with welch correction to determine the statistical significance of the differences. A minimum of two technical replicates was used in all experiments. All experiments were at least performed two times. Differences were considered statistically significant at $p<0.05$. (*$p<0.05$, $p<0.01$, *$p<0.001$).
Results
the Signal Peptide of LRPAP1 is not Cross-Presented by Dendritic Cells when Provided as a Long Peptide The inventors have previously shown that the TEIPP antigen derived from the signal peptide of the ubiquitously expressed LRPAP1 protein is presented in HLA-A*0201 on a wide variety of TAP-deficient cancer types[7]. The inventors set to exploit the TEIPP concept for vaccination strategies, in particular the synthetic long peptide (SLP) platform that was previously developed by them for viral-induced cancers. To this end, the efficiency of cross-presentation of a long version of this signal peptide $LRPAP_{21-30}$ in dendritic cells was assessed. Three different SLP variants were synthesized with non-natural flanking amino acids at the amino-terminus, and natural flanking amino acids at the carboxy-terminus or natural flanking amino acids at both ends (FIG. 1a). These SLPs were incubated together with monocyte-derived dendritic cells (moDC), and a LRPAP1-specific CD8 T cell clone was used to assess correct processing and presentation of the minimal TEIPP epitope. Cytokine release was measured and showed that none of the three SLPs were cross-presented to T cells, whereas exogenous pulsing of the short $LRPAP_{21-30}$ peptide did stimulate the T cells (FIG. 1a). These results suggested that cross-presentation of the $LRPAP_{21-30}$ epitope from its longer peptide stretch is not efficient and had to be optimized for vaccine applications.
Serine to Valine Substitution of the C-Terminal Anchor Allows Efficient Binding and Cross-Presentation Cross-presentation of long peptides by dendritic cells involves multiple sequential steps, including uptake via endocytosis, cytosolic cleavage of the SLP into short peptides by the proteasome, transport over the ER membrane by TAP and loading onto MHC-I molecules[15]. Previous studies have shown that the $LRPAP_{21-30}$ epitope has a moderate binding affinity onto HLA-A*0201[7]. The inventors investigated if replacement of the C-terminal serine of $LRPAP_{21-30}$ would result in a more efficiently processed epitope. First, the binding affinity to HLA-A*0201 of all possible peptide sequences with varying amino acids at position 9 was estimated using an in silico algorithm (table 2, FIG. 1b). The C-terminal serine had indeed a low predicted binding score and ranking (affinity=364 nM, % rank=2.50, respectively). However, substitution of serine (S) into, isoleucine (I), leucine (L), or valine (V) resulted in strongly enhanced predicted binding affinities. Replacement with a valine resulted in an affinity of 6 nM and rank percentage of 0.05%. Additionally, proteasome cleavage probability analysis using netCHOP, revealed a probability score close to the maximum of 1, for isoleucine (I), leucine (L), and valine (V), whereas the natural serine (S) at the C-terminus had a cleavage probability score of almost 0 (FIG. 1c). These in silico analyses indicated that these two important parameters might be strongly improved by substitution of the serine (S) by an isoleucine (I), leucine (L), or valine (V) at the C-terminus.

TABLE 2

HLA-A*0201 peptide binding scores of the LRPAP1 epitope. Overview of predicted binding affinity of p14 peptide variants where the anchor residue at position 9 is substituted with all other known amino acids using NetMHC 4.0. Peptide variants highlighted in bold are predicted as strong binders in HLA-A*0201. As used herein, "p14" refers to FLGPWPAAS (SEQ ID NO: 2).

| Peptide sequence | NetMHC Affinity (nM) | % Rank | [1] |
|---|---|---|---|
| FLGPWPAAS (SEQ ID NO: 2) | 364.80 | 2.50 | WB |
| FLGPWPAAA (SEQ ID NO: 9) | 20.23 | 0.30 | SB |
| FLGPWPAAC (SEQ ID NO: 10) | 303.14 | 2.50 | WB |

TABLE 2-continued

HLA-A*0201 peptide binding scores of the LRPAP1 epitope. Overview of predicted binding affinity of p14 peptide variants where the anchor residue at position 9 is substituted with all other known amino acids using NetMHC 4.0. Peptide variants highlighted in bold are predicted as strong binders in HLA-A*0201. As used herein, "p14" refers to FLGPWPAAS (SEQ ID NO: 2).

| Peptide sequence | NetMHC Affinity (nM) | % Rank | [1] |
|---|---|---|---|
| FLGPWPAAD (SEQ ID NO: 11) | 6719.97 | 12.00 | NB |
| FLGPWPAAE (SEQ ID NO: 12) | 4516.70 | 9.00 | NB |
| FLGPWPAAF (SEQ ID NO: 13) | 521.16 | 3.00 | NB |
| FLGPWPAAG (SEQ ID NO: 14) | 984.43 | 4.00 | NB |
| FLGPWPAAH (SEQ ID NO: 15) | 7052.81 | 12.00 | NB |
| FLGPWPAAI (SEQ ID NO: 16) | 11.98 | 0.15 | SB |
| FLGPWPAAK (SEQ ID NO: 17) | 4183.99 | 8.50 | NB |
| FLGPWPAAL (SEQ ID NO: 18) | 11.14 | 0.15 | SB |
| FLGPWPAAM (SEQ ID NO: 19) | 27.46 | 0.40 | WB |
| FLGPWPAAN (SEQ ID NO: 20) | 4995.00 | 9.50 | NB |
| FLGPWPAAP (SEQ ID NO: 21) | 1762.34 | 5.50 | NB |
| FLGPWPAAQ (SEQ ID NO: 22) | 3029.38 | 7.50 | NB |
| FLGPWPAAR (SEQ ID NO: 23) | 3690.59 | 8.00 | NB |
| FLGPWPAAT (SEQ ID NO: 24) | 66.98 | 0.80 | WB |
| FLGPWPAAV (SEQ ID NO: 1) | 5.98 | 0.05 | SB |
| FLGPWPAAW (SEQ ID NO: 25) | 2198.56 | 6.00 | NB |
| FLGPWPAAY (SEQ ID NO: 26) | 3105.78 | 7.50 | NB |

[1]SB, strong binder; WB, weak binder; ND, non-binder

To examine whether these substitutions would interfere with LRPAP1-specific T cell recognition, the inventors exogenously pulsed short peptide variants of the exact epitope in titrated concentrations on HLA-A*0201 positive T2 cells and measured T cell activation (FIG. 1d). Unexpectedly, the I- and L-variant peptides induced similar or worse cytokine responses when compared to the S-peptide, while the V-peptide induced a more potent IFNγ response (FIG. 1d). Calculation of the EC50 values confirmed that the V-peptide variant elicited the strongest T cells response at limiting peptide concentrations (EC50 in ug/mL=V: 0.1, S: 1.9, I: 0.7, L: 3.7) (FIG. 1e). It was concluded that substitution of serine (S) to valine (V) at the C-terminus of the $LRPAP_{21-30}$ peptide resulted in better MHC-I binding affinity and a 19-fold better T cell activation. The cross-presentation of the V-peptide variant as SLP was subsequently evaluated. moDCs were incubated with SLPs containing the S (S-SLP) or the V (V-SLP) variant of the TEIPP epitope. After uptake and processing of the SLPs, the moDCs were co-cultured with a LRPAP1-specific T cell clone and cytokine production was measured (FIG. 1f). While the three S-SLP variants again failed to activate T cells, the C- and the N-terminal extended peptide of V-SLP, but not the variant with elongations at both ends, were efficiently processed and presented by the moDCs (FIG. 1f). These results were reproducible in nearly all of the independent experiments with different moDC donors and revealed that the C-terminal extension was most efficiently processed (7/8 donors) (FIG. 1g). To summarize, these data showed that the substitution of serine (S) to valine (V) at the C-terminus of the LRPAP1-derived TEIPP antigens allows for use in an SLP vaccination platform.

Figure 2:
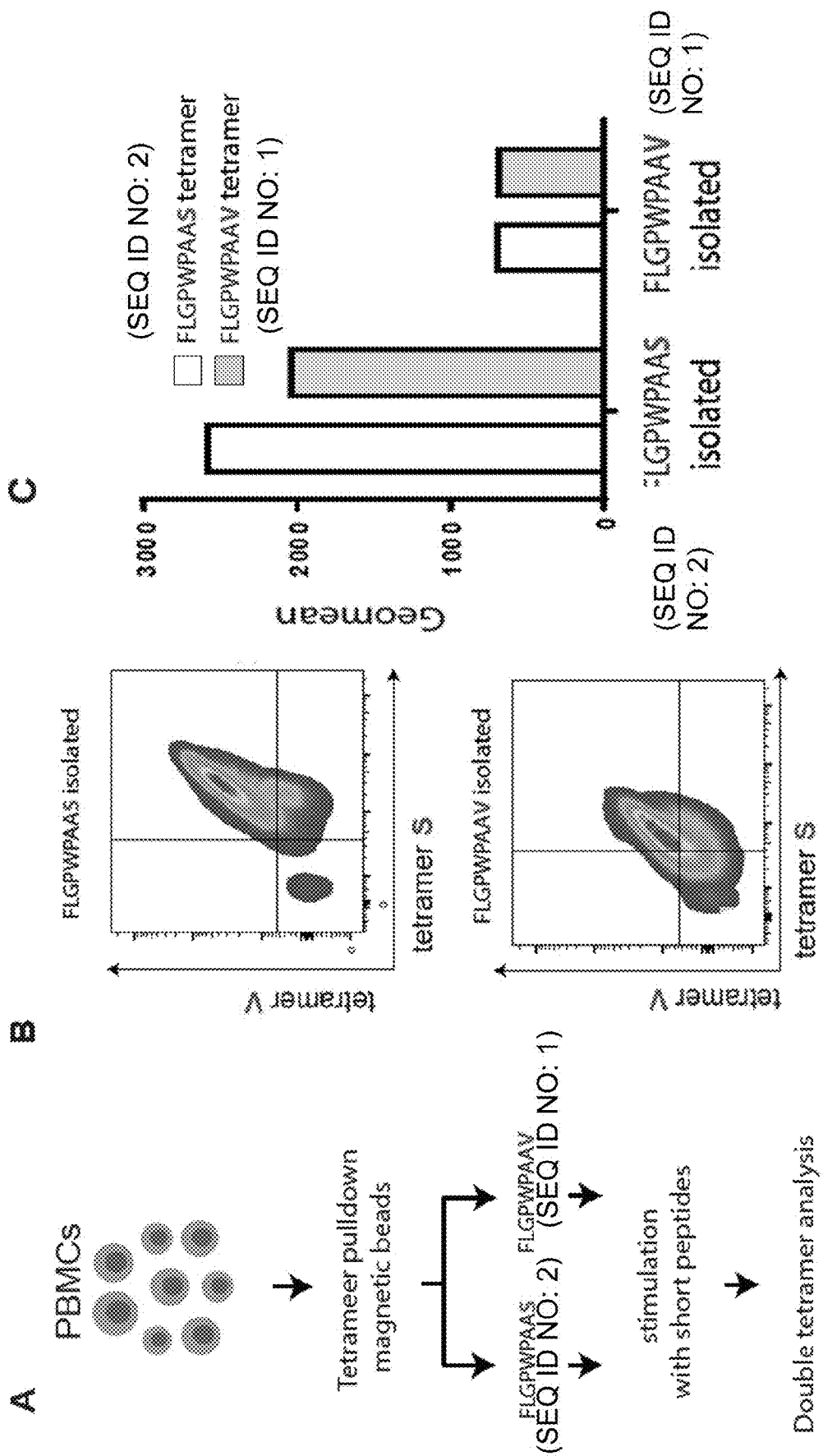
FIG. 2 shows the isolation of LRPAP1-specific T cells with HLA-A2*01 tetramers containing either the short peptide with the natural sequence or the V-substituted peptide. (A) Schematic overview of the tetramer pull-down approach and subsequent stimulation with short peptides. (B) Specificity of polyclonal FLGPWPAAS peptide isolated T cells (upper panel) or FLGPWPAAV peptide isolated T cells (bottom panel) as measured by staining of the T cells with two fluorescently labeled tetramers comprising the short natural sequence (horizontal axis) or the V-substituted peptide (vertical axis) by flow cytometry. (C) Geomeans for double tetramer positive cells on FLGPWPAAS or FLGPWPAAV peptide isolated T cells. (D) IFNy and GM-CSF production of polyclonal T cell bulks when stimulated with peptide pulsed EBV-JY cells as measured by ELISA. Means and SD are plotted of one out of three independent experiments. (E) Reactivity of these polyclonal T cell bulks when stimulated with wild-type and TAP knock out 518A2 melanoma cells (rendered TAP-deficient by CRISPR/CAS9 technology) or no tumor cells (control) as measured by indicated cytokine production using ELISA.
Figure 2:
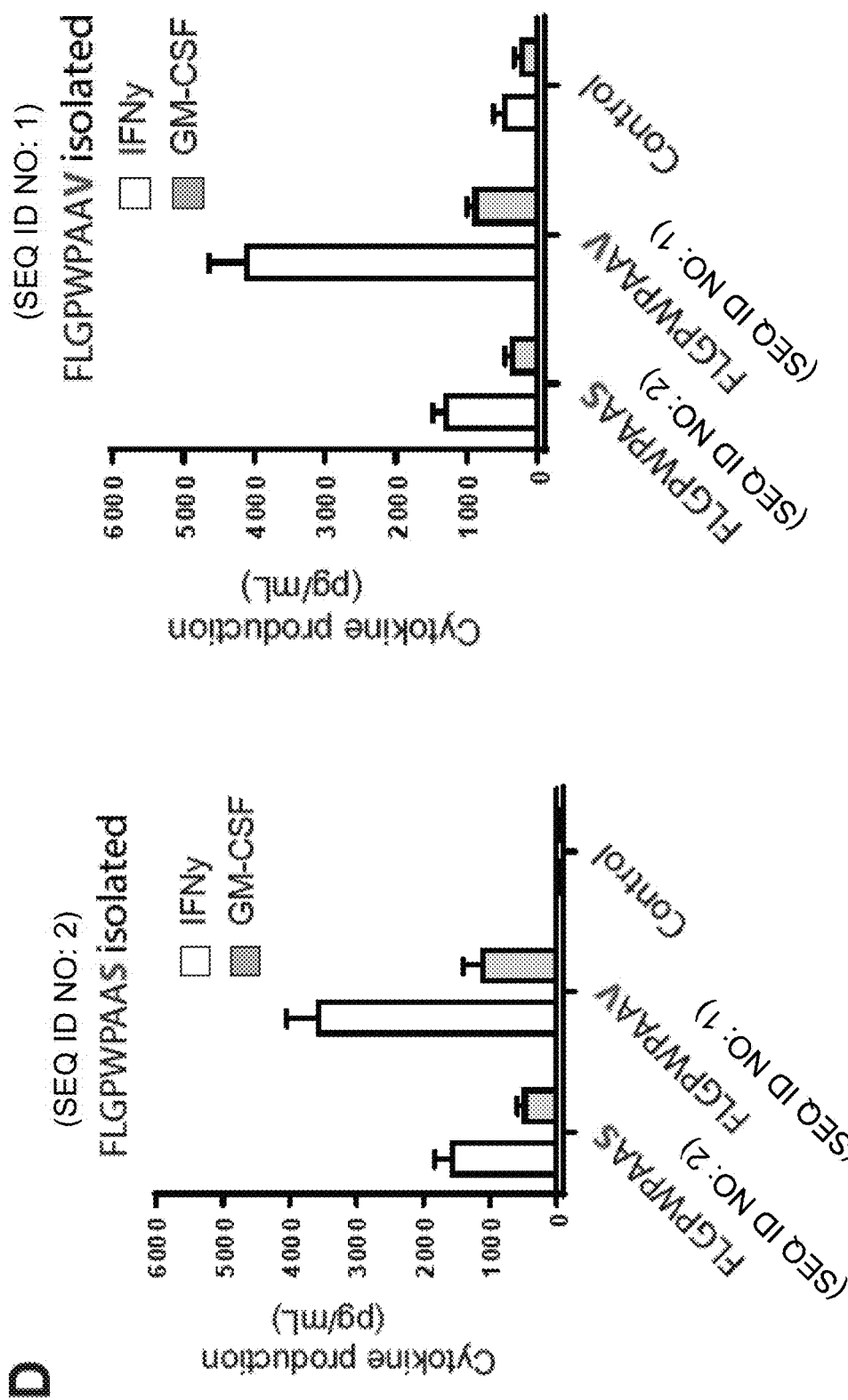
Figure 2:
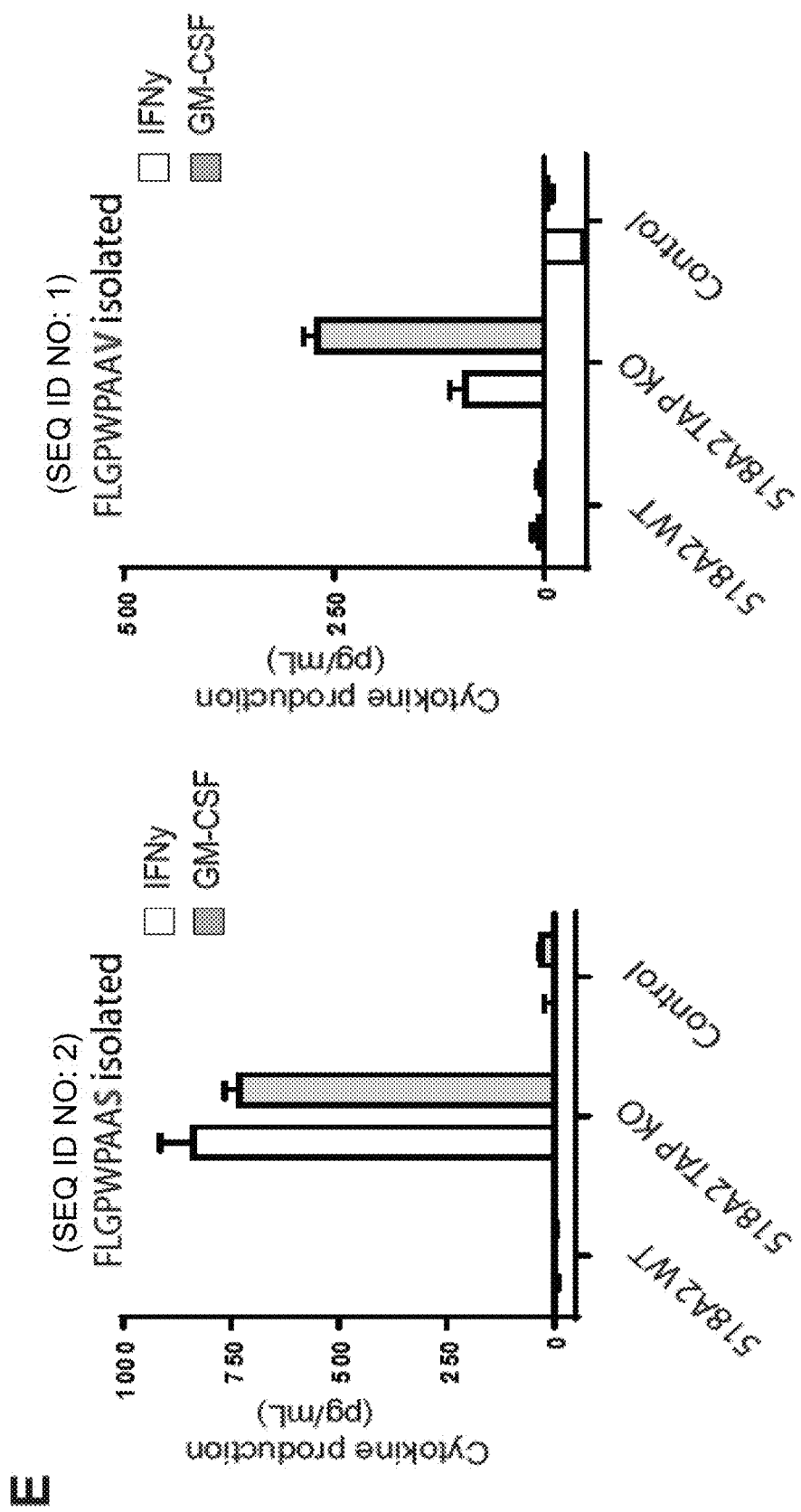

Characterization of CD8 T Cell Repertoire Isolated with the Optimized TEIPP Epitope The inventors evaluated the cross-reactivity of the CD8 T cell repertoire, isolated and expanded with the V-peptide, to the wild type $LRPAP_{21-30}$ peptide, as an SLP vaccine should ultimately generate T cell reactivity towards the natural (S-variant) peptide sequence as presented by TAP-deficient tumors. Therefore, CD8 T cell cultures were generated using a previously described approach with HLA-A*0201 tetramer pull-down and subsequent expansion by peptide stimulations[7]. This protocol resulted in the generation of polyclonal, LRPAP1-specific CD8 T cell cultures stimulated by the V-variant or the natural S-variant (FIG. 2a). Combined tetramer staining revealed that both T cell cultures bound tetramers with the S-variant as well as the V-variant, indicating that these T cell repertoires were indistinguishable in specificity (FIG. 2b). The CD8 T cell repertoire isolated and stimulated with V-peptide variant seemed to bind the tetramers with somewhat lower affinity, as mean fluorescence intensities were lower (FIG. 2b, c). This might reflect the weaker binding capacity of the S-peptide whereby only high-affinity TCRs are recruited from the total repertoire, whereas the strongly binding V-peptide was able to also recruit lower-affinity TCRs.

To test the functionality of these T cell bulks, cytokine responses were measured towards both short peptides pulsed on immortalized HLA-A*0201 positive B cells (FIG. 2d). Both T cell bulks responded to both peptides by secretion of IFNy and GM-CSF, indicating that the T cell repertoire selected via the high affinity binding V-peptide is cross-reactive to the natural S-peptide. Finally, the recognition of naturally presented S-peptides on the surface of the TAP-negative melanoma 518A2 cell line was tested (FIG. 2e). Importantly, V-peptide induced polyclonal T cell cultures exhibited preferred recognition of the TAP-negative tumor line as compared to the wild type (TAP-proficient) counterpart. These data are in line with previous findings that the C-terminal amino acid is an anchor position for binding to HLA-A2*01 molecules and is not directly involved in the TCR interface. It was concluded that the exchange of C-terminus into a valine of the LRPAP1-derived TEIPP antigen results in the isolation of a comparable peptide-specific CD8 T cell repertoire from the total pool of CD8 T cells.

TCR Gene Transfer Confers LRPAP1-Specificity

Figure 3:
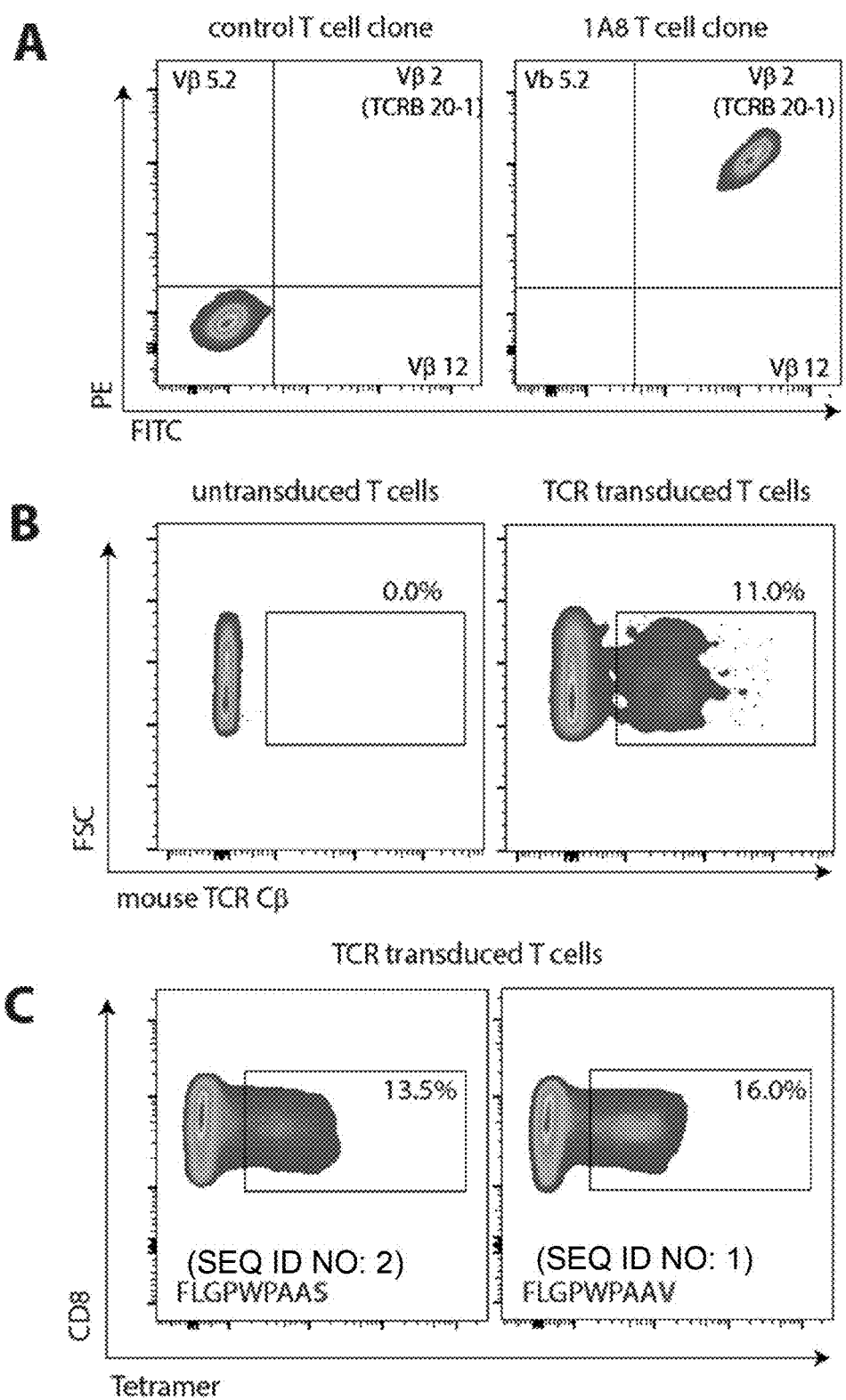
FIG. 3 shows the use of a LRPAP1-specific T cell receptor in a gene transfer experiment to confer LRPAP1-specificity to other CD8 T cells. (A) Flow cytometry staining of a control and the LRPAP1-specific T cell clone 1A8 using three different Vβ antibodies (Vβ5.2, Vβ2 and Vβ12 in respective quadrants) revealing expression of TCR Vβ2 usage by clone 1A8. (B) TCRαβ gene transduction into T cells from a healthy donor. The introduced genes contain the murine TCR-αβ domain which enhances correct pairing of transgenic alpha and beta chains. Expression of this domain is confirmed in TCR-transduced T cells (on the horizontal axis). (C) Staining of TCRαβ transduced CD8 T cells with fluorescently labeled tetramers comprising the short natural peptide sequence (left panel) or the V-substituted peptide (right panel). (D) Functional reactivity of tetramer-enriched TCR-transduced T cells to peptide pulsed EBV-JY cells as measured by indicated cytokine production using ELISA. Means and SD are depicted from one out of three experiments with similar outcome. (D) TCR-transduced T cells were stimulated with either the wild type version of two different melanoma cell lines, or their TAP knock out (TAP KO) variants generated by CRISPR/CAS9 technology. The wild type cell lines pulsed with the short natural peptide showed that the T cells were capable of recognizing the tumor cells. T cells only served as control.
Figure 3:
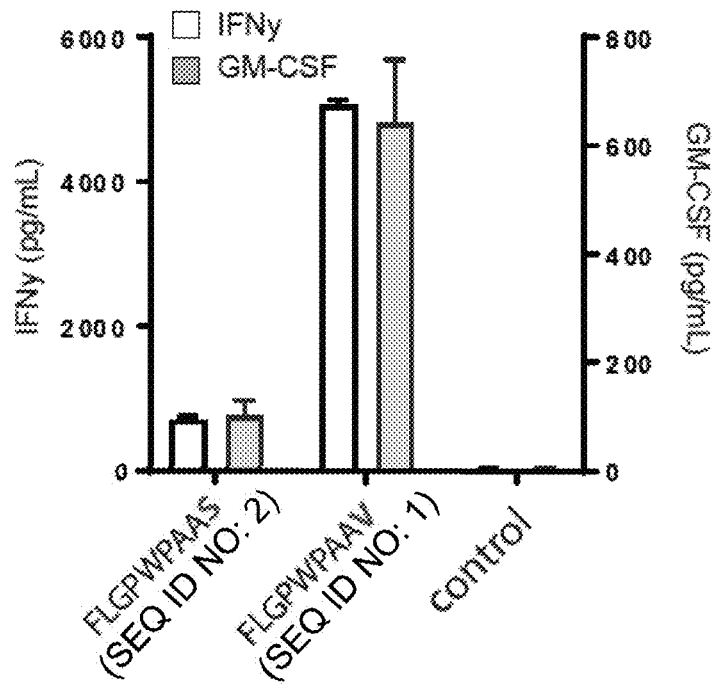
Figure 3:
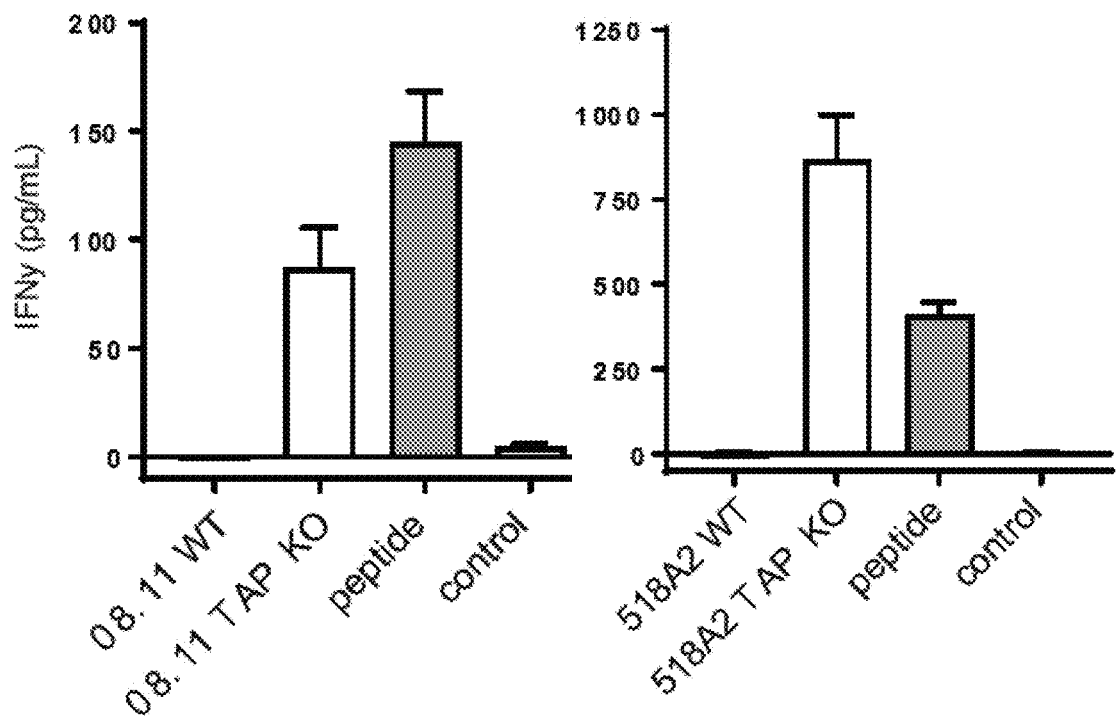

Vaccination with synthetic long peptides aims to elicit T cell reactivity from the natural T cell repertoire. TCR gene transfer from TEIPP-specific CD8 T cells constitutes an alternative immunotherapeutic approach to introduce T cell immunity to TAP-deficient cancers. The inventors examined this with the rearranged TCR from the previously described CD8 T cell clone 1A8 (FIG. 3). DNA sequencing of both TCR-alpha and TCR-beta chains revealed the rearranged sequences and the TCR-Vβ2 usage was confirmed by flow cytometry (table 3 and FIG. 3a). Retroviral constructs of this TCR with mouse C-domains to improve correct pairing of the transduces genes resulted in successful generation of TCR-transduced CD8 T cells as measured by an antibody to mouse TCR-CR domain (FIG. 3b). Tetramer staining confirmed that both TCR chains were expressed and recognized both S-variant and V-variant peptides, indicating that the specificity T cell clone 1A8 was preserved (FIG. 3c). Moreover, T cell reactivity was conferred by TCR gene transfer in that stronger cytokine responses were observed against the V-variant peptide than to the S-variant (FIG. 3d). Finally, TCR transduced T cells selectively recognized TAP-deficient melanomas in a comparable way as the original T cell clone (FIG. 3e)[7]. Together, these proof-of-concept data demonstrated the feasibility of TCR gene transfer as a mode of immunotherapy for TEIPP antigens and suggests that vaccination with the V-SLP may provide in vivo help to prevent T cell contraction.

TABLE 3

TCR sequence of the LRPAP1-specific T cell clone 1A8

|  | TCRa chain | TCRb chain |
| --- | --- | --- |
| V-GENE and allele | TRAV12-1*01F | TRBV20-1*01F |
| J-GENE and allele | TRAJ26*01F | TRBJ2-3*01F |
| (D)-GENE and allele | — | TRBD1*01F |
| CDR3 region Nucleotide sequence | tgtgtggtga tgggctatgg tcagaatttt gtcttt (SEQ ID NO: 28) | tgcagtgcta tggggagaca gagcacagat acgcagtatt tt (SEQ ID NO: 29) |
| CDR3 region Amino acid sequence | CVVMGYGQNFVF (SEQ ID NO: 30) | CSAMGRQSTDTQYF (SEQ ID NO: 31) |
| V(D)J region sequence | cggaaggagg tggagcagga tcctggaccc ttcaatgttc cagagggagc cactgtcgct ttcaactgta cttacagcaa cagtgcttct cagtctttct tctggtacag acaggattgc aggaaagaac ctaagttgct gatgtccgta tactccagtg gtaatgaaga tggaaggttt acagcacagc tcaatagagc cagccagtat atttccctgc tcatcagaga | cggaagatgc tgctgcttct gctgcttctg gggccaggct ccgggcttgg tgctgtcgtc tctcaacatc cgagctgggt tatctgtaag agtggaacct ctgtgaagat cgagtgccgt tccctggact ttcaggccac aactatgttt tggtatcgtc agttcccgaa acagagtctc atgctgatgg caacttccaa tgagggctcc ctccaagctc aaggccacat acgagcaagg cgtcgagaag |

TABLE 3-continued

TCR sequence of the LRPAP1-specific T cell clone 1A8

| TCRa chain | TCRb chain |
|---|---|
| agtgattcag ccacctacct ctgtgtggtg<br>atgggctatg gtcagaattt tgtctttggt<br>cccggaacca gattgtccgt gctgccct<br>(SEQ ID NO: 32) | gacaagtttc tcatcaacca tgcaagcctg<br>accttgtcca ctctgacagt gaccagtgcc<br>catcctgaag acagcagctt ctacatctgc<br>agtgctatgg ggagacagag cacagatacg<br>cagtattttg gcccaggcac ccggctgaca<br>gtgctcgagg acctgaaaaa cgtgttccca<br>(SEQ ID NO: 33) |

In vitro vaccination with V-SLP promotes the expansion of LRPAP$_{21-30}$-specific TEIPP T cells. The validate the concept of V-variant SLP vaccination for the induction of LRPAP1-directed TEIPP T cell responses a so-called in vitro vaccination protocol was used[20,21]. SLP-loaded moDC (loaded with peptides shown in FIG. 1) were co-cultured for two sequential stimulations of tetramer-enriched autologous T cells (FIG. 4a). Already after one round of stimulation a great expansion of LRPAP1-specific T cells was observed compared to control cultures, as measured by tetramer analysis (16.6% versus 1.5%, respectively) (FIG. 4b). This specific expansion was even more pronounced after the second stimulation (38.5% versus 0.2%, respectively) (FIG. 4b), indicating that professional antigen-presenting cells are capable to cross-present the V-SLP and activate TEIPP-specific T cells. These results were remarkable in the light of the inventors' previous finding that all LRPAP1-specific CD8 T cells were still in the naïve state of healthy donors[7] and suggests that they observed real in vitro priming in their co-cultures, and resulting in T cells that recognize the LRPAP1 epitope when extended with the natural flanking amino acids at the N-terminus (see also FIG. 5).

Next, CD8 T cell clones were generated in order to determine their reactivity towards TAP-deficient cancers. Tetramer-positive T cells were sorted by flow cytometry as single cells and expanded in an antigen-unrelated way using the mitogen phytohaemagglutinin (PHA). T cell clones were analyzed for their specificity by tetramer analysis (FIG. 4c). Five new T cell clones showed equal staining for both V-peptide and S-peptide tetramers, comparable to the previously isolated clone 1A8[7]. Importantly, two TAP-deficient melanomas were efficiently recognized by three (2H11, 2B9, and 1A10) of these five SLP-induced CD8 T cell clones, in a manner very similar to the previously established clone 1A8 (FIG. 4d). Collectively, these observations demonstrated that the V-SLP constitutes a functional TEIPP vaccine ready to be exploited for the induction of LRPAP1-specific T cell immunity.

Discussion

The HLA-A*0201 presented peptide-epitope LRPAP$_{21-30}$ (FLGPWPAAS) is encoded by the signal peptide which functions to dock protein translational products to the sec61 translocation channel in the ER membrane[22]. After cleavage mediated by proteases, a part of the signal peptide enters the ER in a TAP-independent fashion. Although not formally demonstrated, the liberation of the LRPAP$_{21-30}$ peptide is most likely not mediated by the proteasome, which is involved in proteolytic cleavage of the majority of HLA class I presented peptides[4]. Indeed, the in silico probability algorithm NetCHop predicted that cleavage after the natural serine at p9 of the LRPAP$_{21-30}$ sequence is not likely (FIG. 1c). It was therefore concluded that this signal peptide is processed in a proteasome- and TAP-independent way.

Use of synthetic long peptide vaccines, however, depends on uptake by host dendritic cells and processing via the classical route, involving proteasomes and the peptide transporter TAP[26]. The inventors have demonstrated that the long natural peptide of LRPAP1 encompassing the minimal peptide-epitope fails to be cross-presented in dendritic cells (FIG. 1). A single amino acid substitution from serine to valine at p9 of the epitope rendered the long peptide sensitive for proteasomal cleavage and, in addition, improved binding affinity to HLA-A*0201. It was hypothesized that this single amino acid exchange may alter the processing pathway of this signal sequence peptide, from SPase- and SPPase-mediated, to proteasome-mediated.

Figure 4:
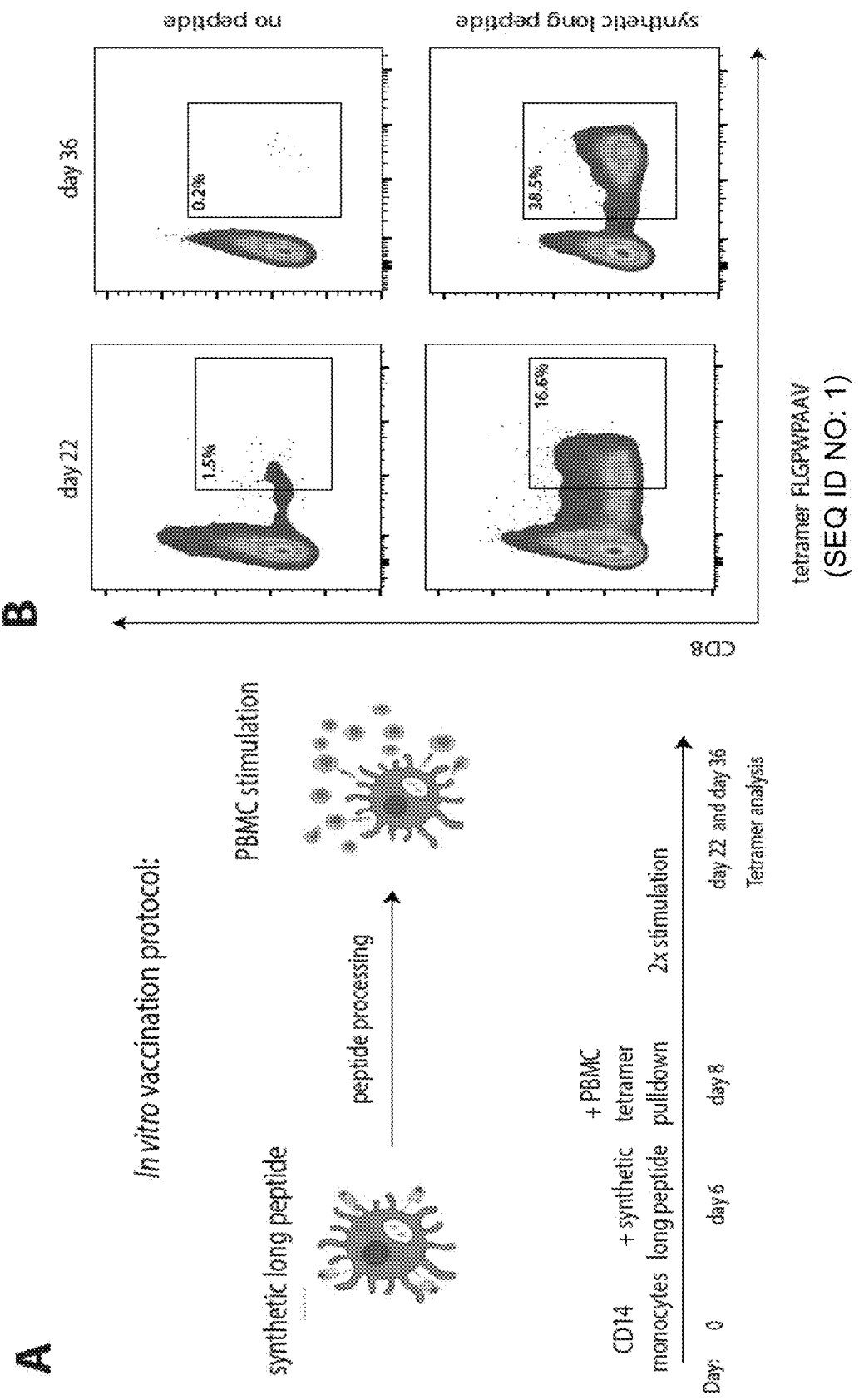
FIG. 4 shows that In vitro vaccination with the V-variant peptide delivered as synthetic long peptides (V-SLPs) results in stimulation of LRPAP1-specific T cells, according to a described protocol[20]. In short, CD14 monocytes isolated from PBMC of healthy donors were differentiated into dendritic cells by culturing with GM-CSF and IL-4 for 6 days. On day 7, moDCs were plated in 96-well and incubated with 20 uM of V-SLP for 20 h. During the last 18 hours the DCs were matured with 20 ng/uL LPS. On day 8, the moDCs were washed and co-cultured with PBMC enriched for LRPAP1-specific T cells by FLGPWPAAS-tetramers. (A) Schematic overview of the in vitro vaccination protocol using two V-variant peptides (C-terminal and N-terminal extended) as synthetic long peptides that require cross-presentation by monocyte-derived dendritic cells for priming of CD8 T cells. (B) In vitro vaccination protocol resulted in T cell bulk cultures containing LRPAP1-specific CD8 T cells as determined with fluorescently-labeled tetramers using flow cytometry. Control co-cultures were incubated without a peptide. (C) LRPAP1-specific T cell clones were generated via single cell FACS sort and their specificity to the wild type (S-variant) and the V-variant peptide was assessed using two fluorescently labeled tetramers comprising the short wild type sequence (horizontal axis) or the V-substituted peptide (vertical axis) by flow cytometry. Clone 1A8 was generated and described in a previous study[7], and used here as a reference clone. (D) LRPAP1-specific T cells clones were examined for recognition of TAP-deficient melanoma cell lines and their wild-type counterparts. Clones 2H11, 2B9 and 1A10 are shown. Means and SD are shown from one out of two experiments with similar outcome. Clone 1A8, shown in (E), served as positive control. (E) LRPAP1-specific T cells clones were examined for recognition of TAP-deficient melanoma cell lines and their wild-type counterparts. Clones 4B11, 1C5, and 1A8 are shown. Means and SD are shown from one out of two experiments with similar outcome. Clone 1A8, served as positive control.
Figure 4:
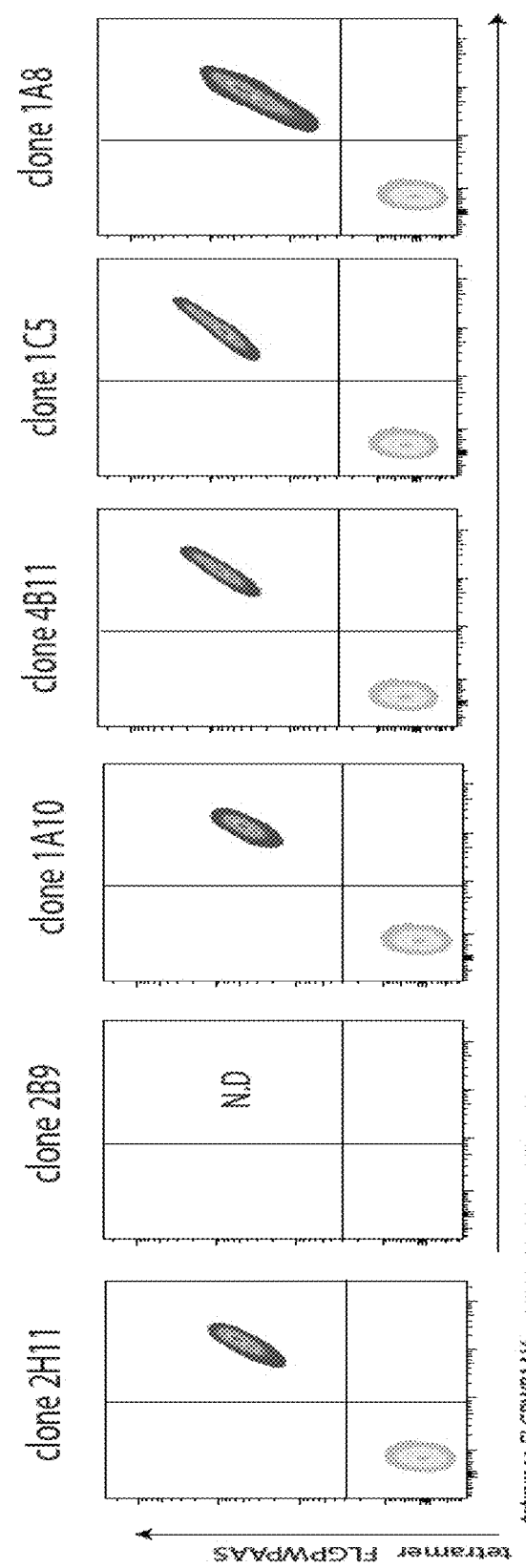
Figure 4:
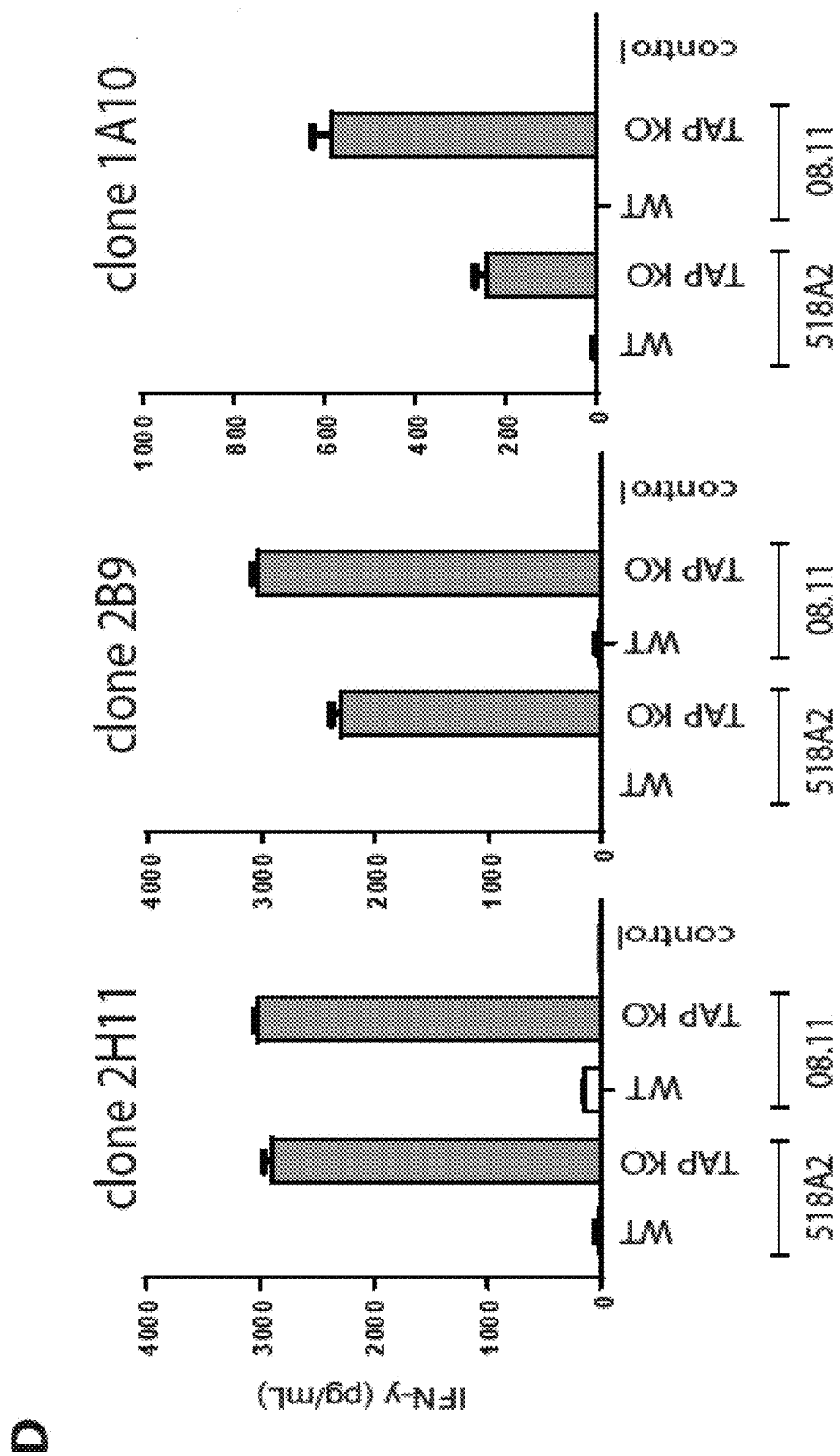
Figure 4:
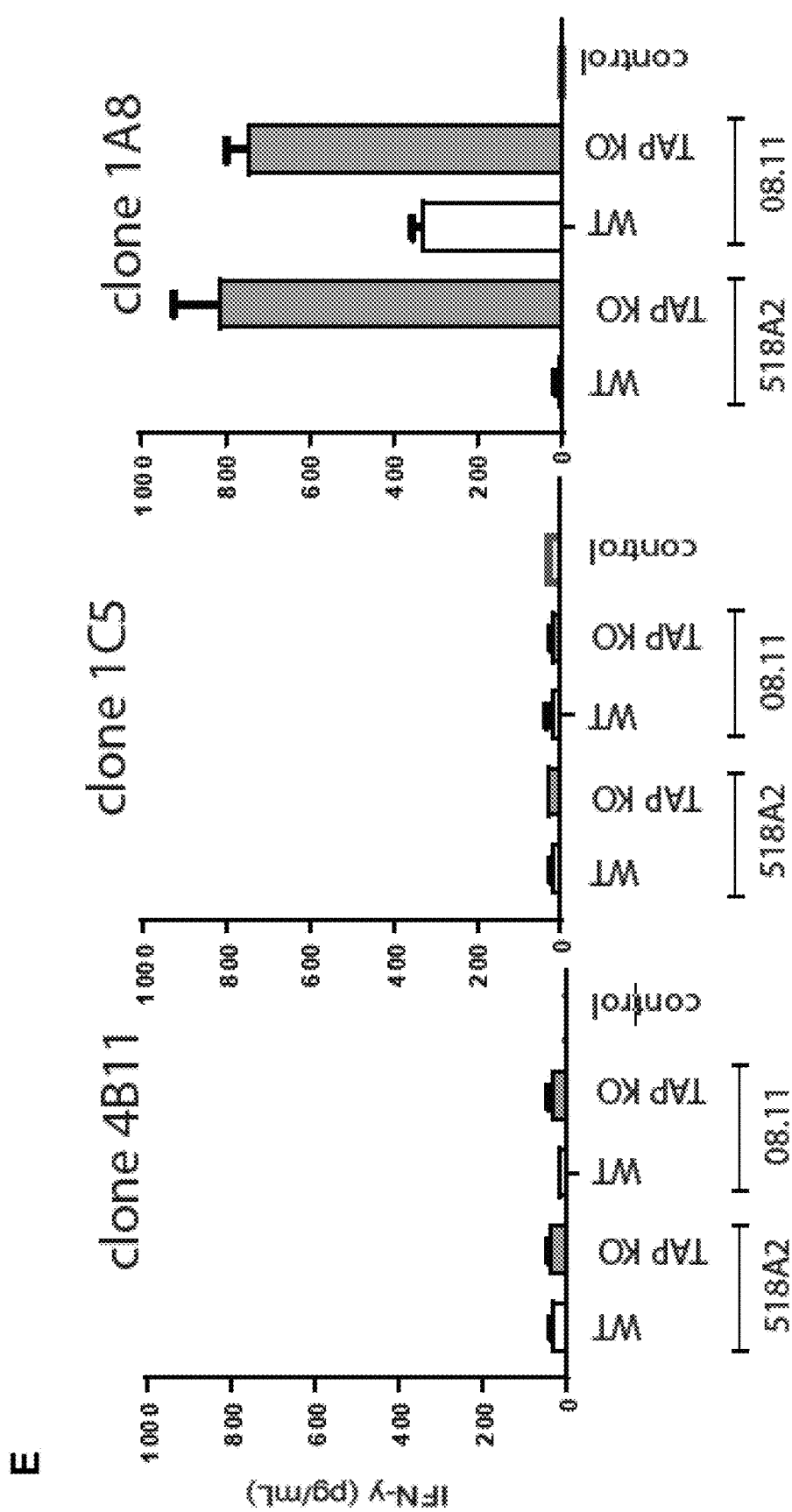
Figure 5:
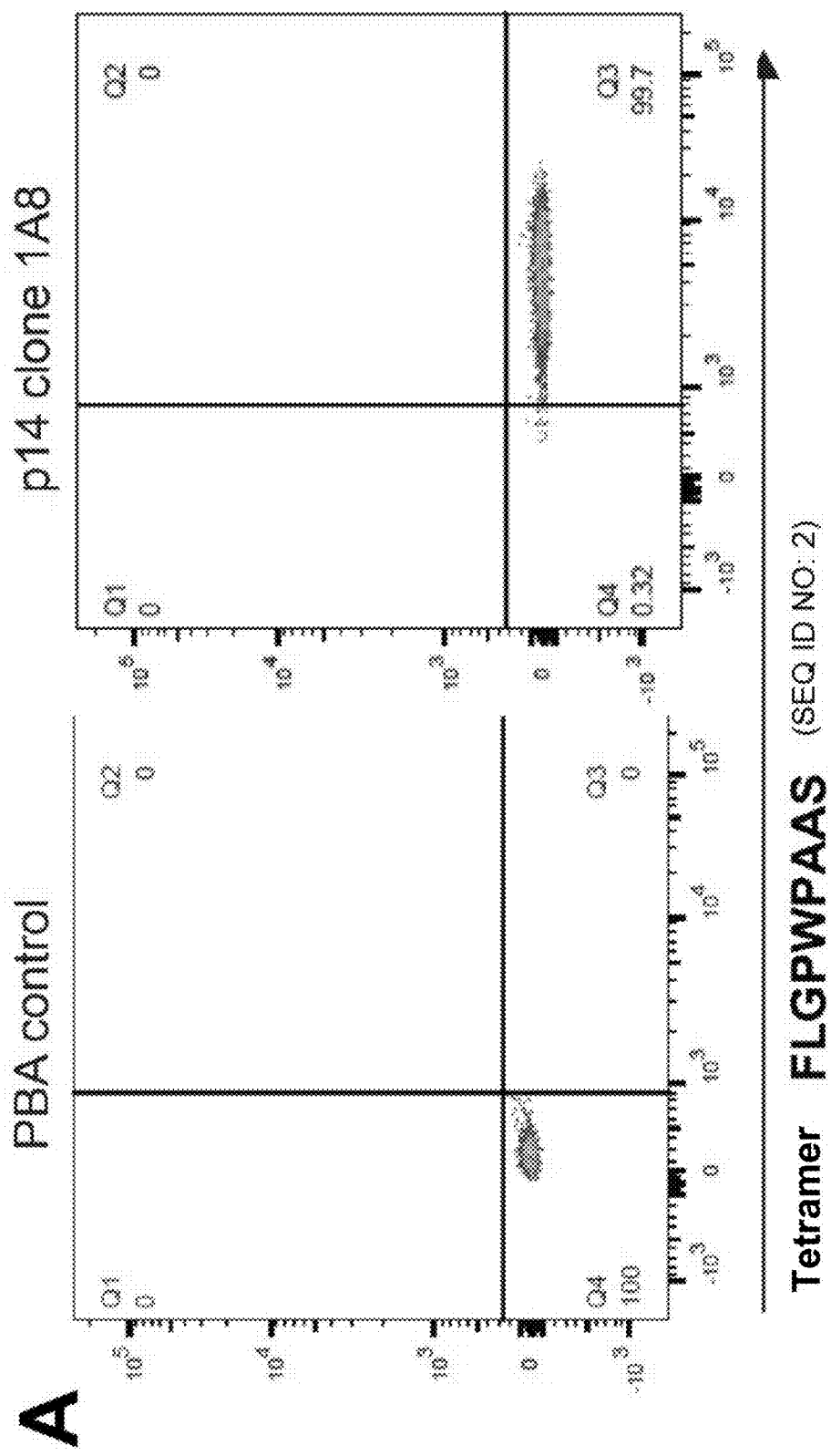
FIG. 5 shows cross-presentation of N-terminal extended length variants of the V-variant peptide (FLGPWPAAV) using the natural flanking amino acids at the N-terminus of the short peptide epitope. (A) The specificity of the established LRPAP1-specific 1A8 T cell clone was verified by flow cytometry analysis using fluorescently labeled HLA-A*0201-FLGPWPAAS tetramers. (B) V-SLP with different lengths were cross-presented by moDC as described in FIG. 4 and tested for recognition by clone 1A8. The natural short epitope FLGPWPAAS was used as a positive control, and was exogenously pulsed on the moDC. Incubation of moDC without any peptide served as negative control. GM-CSF production in the supernatant was measured by ELISA the next day. (C) LRPAP1 (FLGPWPAAS)-specific T cells that were generated from PBMC of lung carcinoma patient x-23 were stained with fluorescently labeled HLA-A*0201-FLGPWPAAS tetramers to show specificity of the T cell bulk. (D) moDC were incubated with different N-terminal extended length variants of the V-variant peptide (FLGPW-PAAV) using the natural flanking amino acids at the N-terminus of the epitope. GM-CSF production by T cell bulk x-23 in the supernatant was measured by ELISA the next day. Two different peptide batches of the different length variants of the V-variant (FLGPWPAAV) were produced by different manufacturers and used in this experiment. All peptide may be no more than 29 amino acids in length. In one example, the isolated peptide may be no more than 28 amino acids in length. In another example, the isolated peptide may be no more than 27 amino acids in length. In another example, the isolated peptide may be no more than 26 amino acids in length. In yet another example, the isolated peptide may be no more than 25 amino acids in length. In another example, isolated peptide may be no more than 24 amino acids in length.
Figure 5:
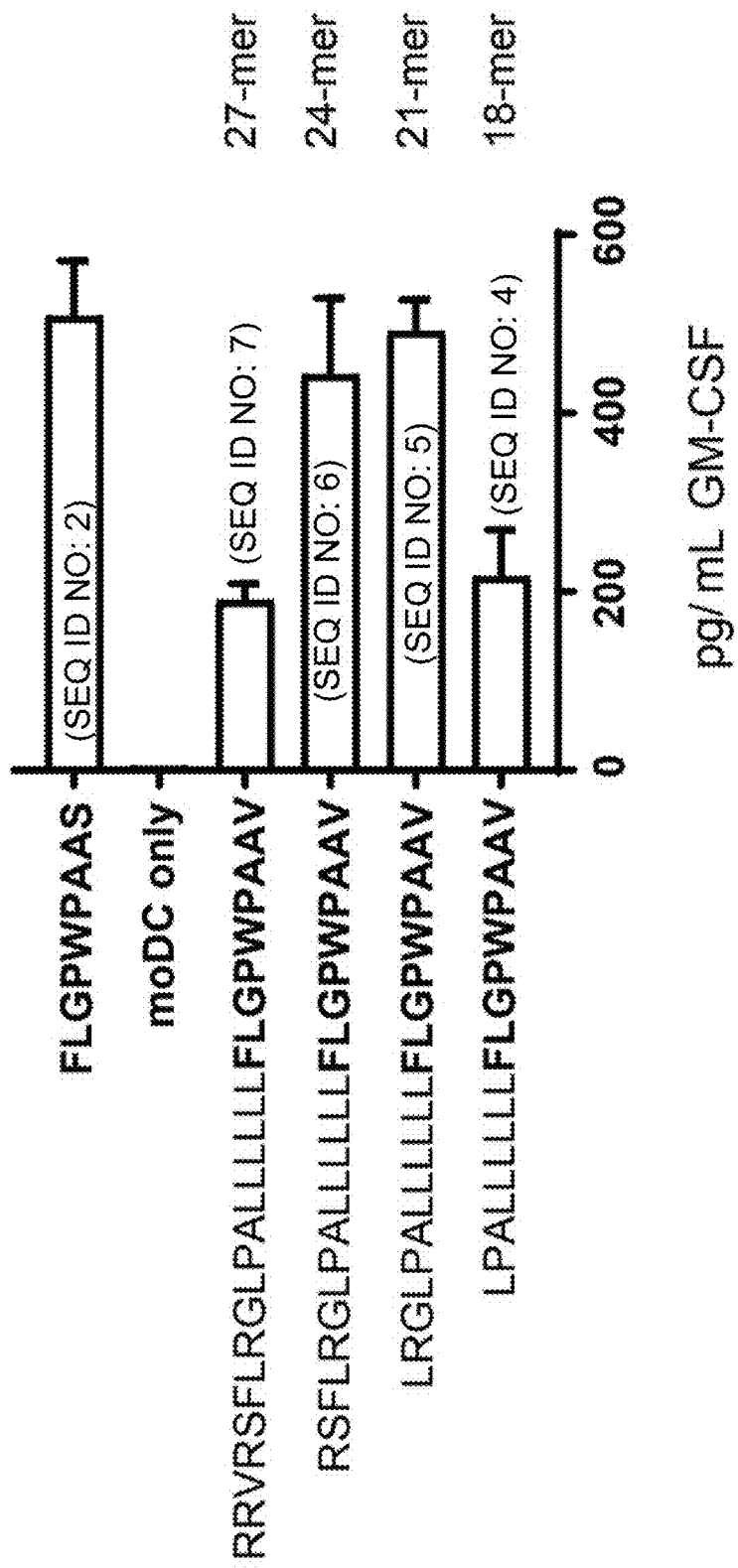
Figure 5:
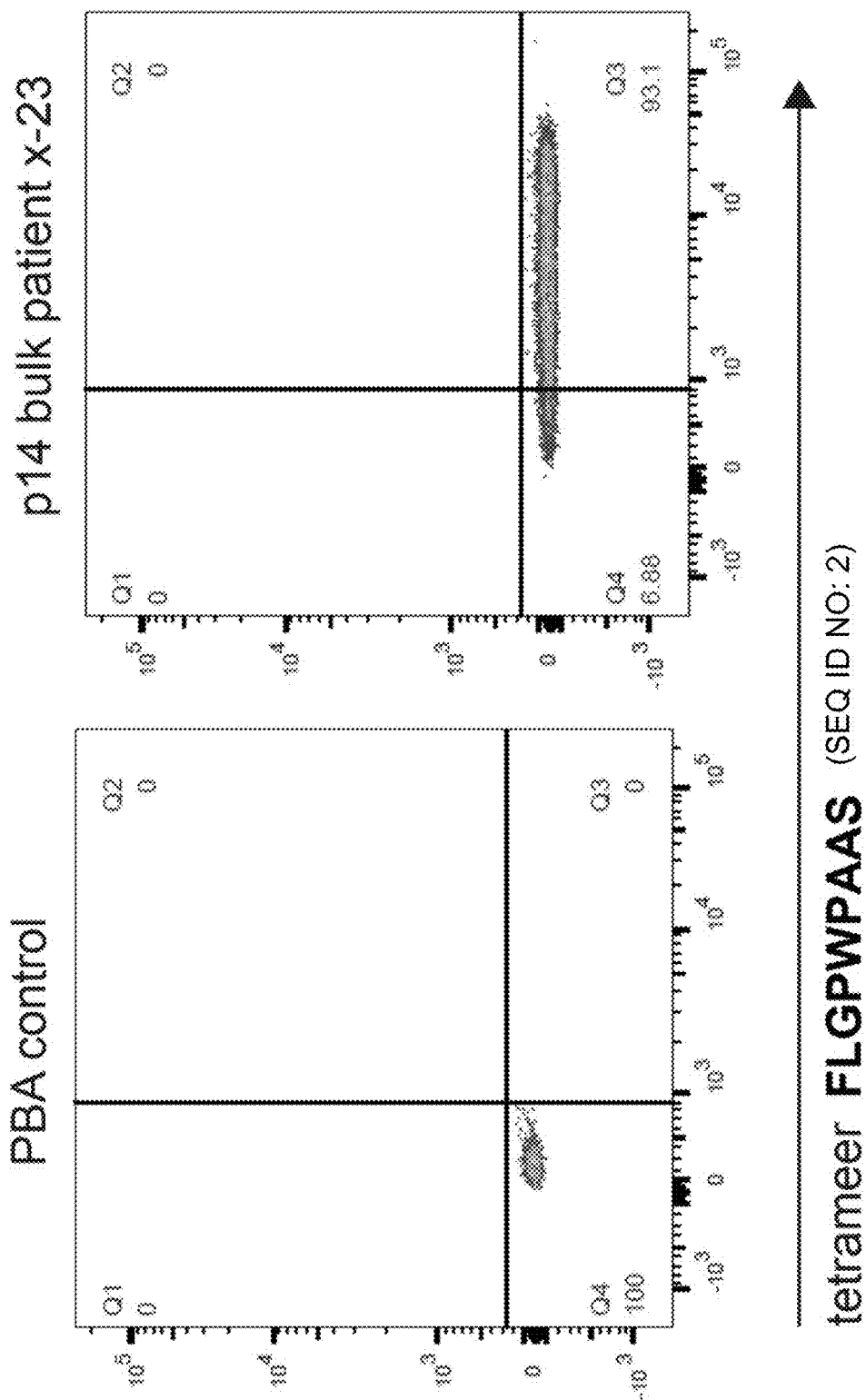
Figure 5:
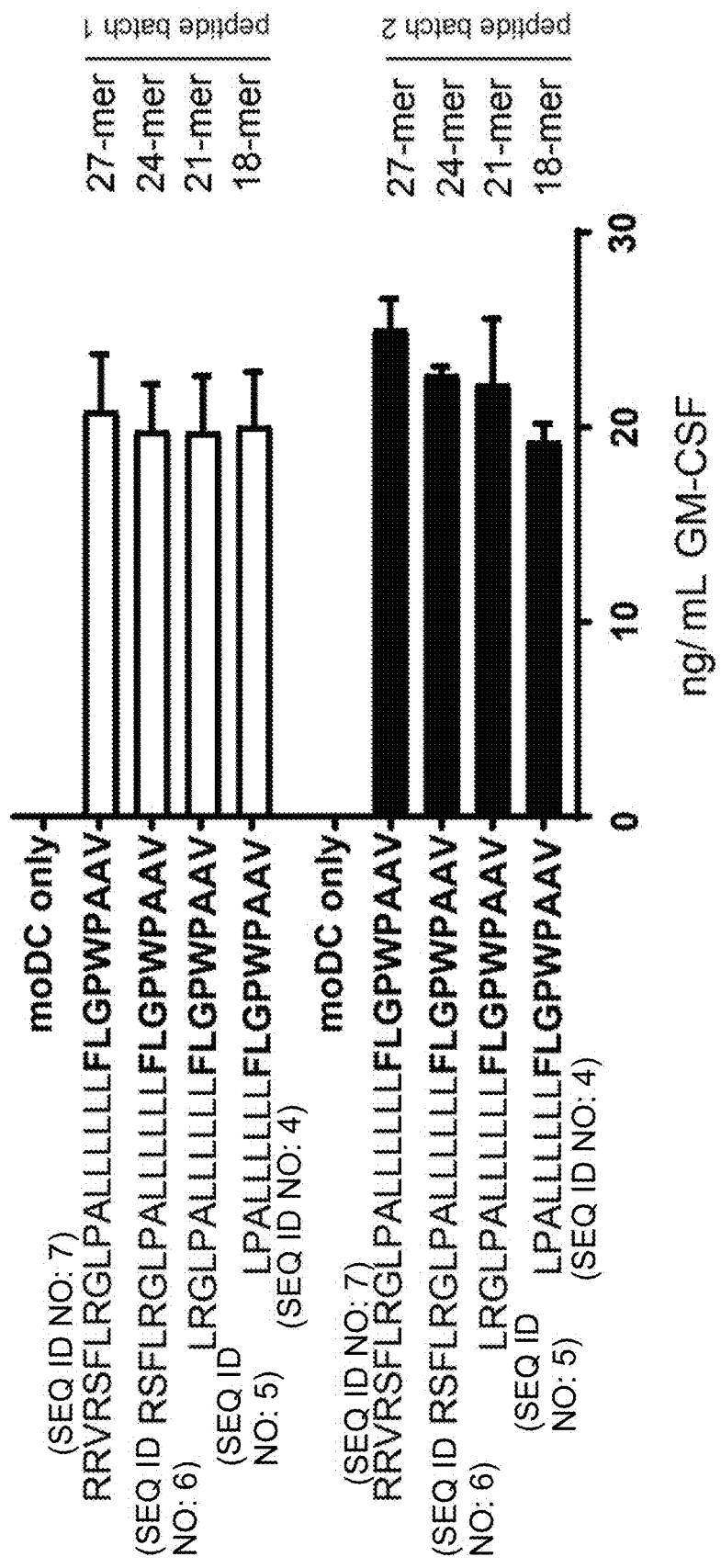
Figure 6:
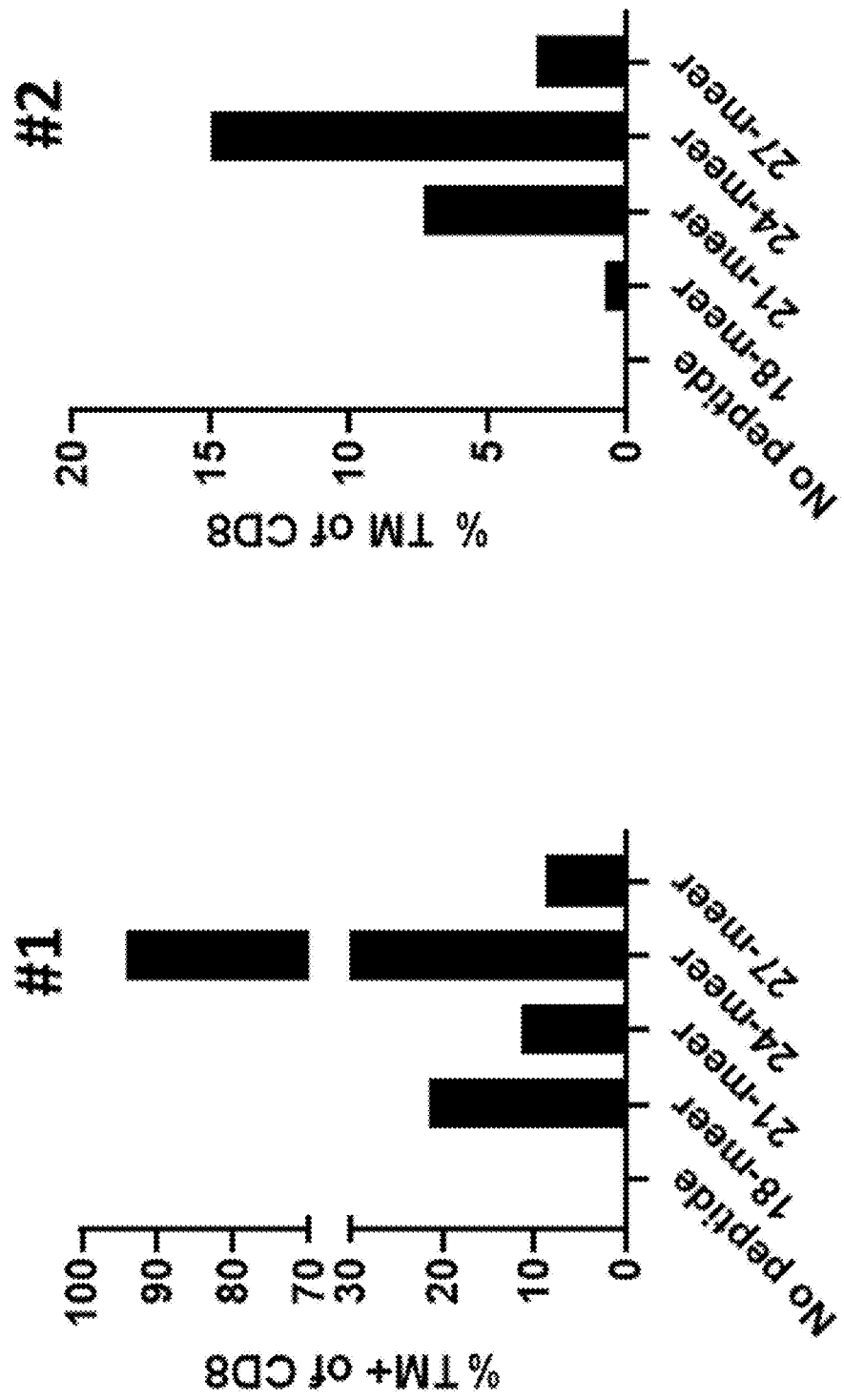
Figure 6:
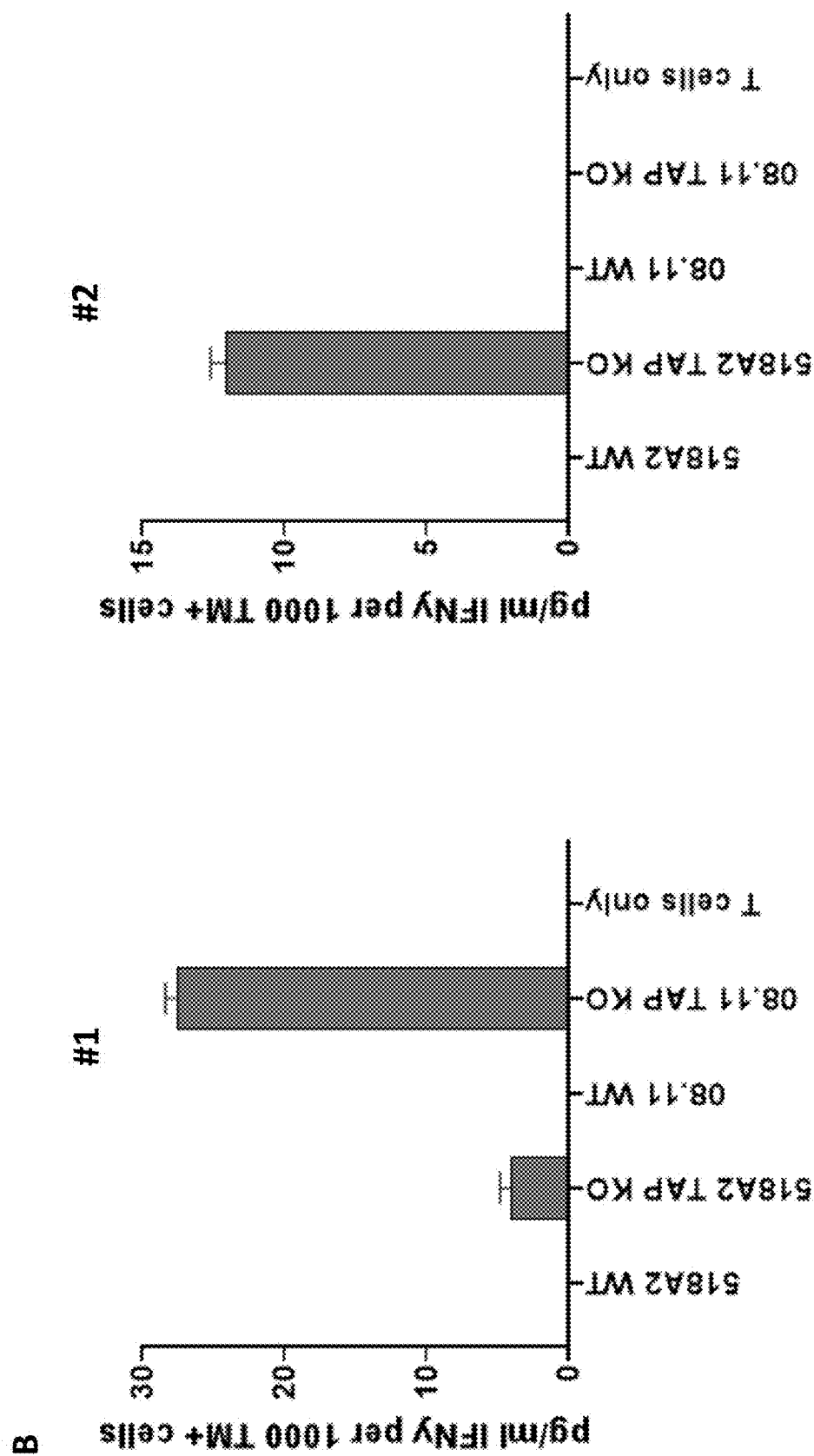

Side-by-side comparison of short S- and V-peptide induced T cell responses with the use of an in vitro vaccination protocol revealed that both repertoires were comparable concerning cross-reactivity and functionality (FIG. 4). Stimulation with the short V-peptide seemed to recruit a CD8 T cell repertoire with lower affinity as witnessed by less intense staining with tetramers (FIG. 2b). However, stimulation with dendritic cells loaded with long peptides, which require intracellular cross-presentation, resulted in polyclonal CD8 T cell bulks and clones with high affinity and strong capacity to recognize the natural S-variant on TAP-deficient melanomas (FIG. 4). These findings suggest that vaccination with the optimized V-SLP would result in the generation of LRPAP1-specific T cells with high affinity TCRs. This advantage of SLP over vaccination with short minimal epitopes is in line with previous investigations in pre-clinical mouse models and suggest that the SLP platform is well suited to recruit a high affinity TCR repertoire[14,17].

The inventors previously showed that LRPAP1-specific T cells all reside in the naïve repertoire of healthy blood donors, indicating that the in vitro vaccination protocol actually primed CD8 T cells and not merely reactivated memory T cells[7]. The differentiation status of LRPAP-1-specific T cells in cancer patients and in particular those harboring TAP-deficient tumor cells needs further analysis, however, data from a mouse tumor model revealed that TEIPP-directed CD8 T cells are still naïve in these situations[6,27]. The inventors found that TAP-deficient tumors failed to prime TEIPP T cells and also host dendritic cells were unable to pick up TEIPP antigens and cross-prime them. Consequently, TEIPP immunity might need to be installed by active immunizations, like suggested here via SLP vaccines, or by TCR gene transfer into host T cells. Thus, the optimized long peptide of the signal peptide of LRPAP1 containing one amino acid exchange constitute an ideal vaccine candidate to induce TEIPP immunity in cancer patients.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

```
SEQUENCES
(SEQ ID NO: 1)
FLGPWPAAV (SEQ ID NO: 2 - HLA-A*0201 presented peptide-
epitope LRPAP21-30)
FLGPWPAAS.

(SEQ ID NO: 3)
FLGPWPAAVHGGKYSREKNQ (SEQ ID NO: 4)
LPALLLLLLFLGPWPAAV (SEQ ID NO: 5)
LRGLPALLLLLLFLGPWPAAV (SEQ ID NO: 6)
RSFLRGLPALLLLLLFLGPWPAAV (SEQ ID NO: 7)
RRVRSFLRGLPALLLLLLFLGPWPAAV (SEQ ID NO: 8)
RGLPALLLLLLFLGPWPAAV

SEQ ID NO: 27:
MAPRRVRSFLRGLPALLLLLLFLGPWPAASHGGKYSREKNQPKPSPKRES

GEEFRMEKLNQLWEKAQRLHLPPVRLAELHADLKIQERDELAWKKLKLDG

LDEDGEKEARLIRNLNVILAKYGLDGKKDARQVTSNSLSGTQEDGLDDPR

LEKLWHKAKTSGKFSGEELDKLWREFLHHKEKVHEYNVLLETLSRTEEIH

ENVISPSDLSDIKGSVLHSRHTELKEKLRSINQGLDRLRRVSHQGYSTEA

EFEEPRVIDLWDLAQSANLTDKELEAFREELKHFEAKIEKHNHYQKQLEI

AHEKLRHAESVGDGERVSRSREKHALLEGRTKELGYTVKKHLQDLSGRIS

RARHNEL
```

See also Tables 2 and 3.

REFERENCES

1 Seliger, B., Maeurer, M. J. & Ferrone, S. Antigen-processing machinery breakdown and tumor growth. *Immunol Today* 21, 455-464 (2000).

2 Korkolopoulou, P., Kaklamanis, L., Pezzella, F., Harris, A. L. & Gatter, K. C. Loss of antigen-presenting molecules (MHC class I and TAP-1) in lung cancer. *Br J Cancer* 73, 148-153 (1996).

3 Pandha, H., Rigg, A., John, J. & Lemoine, N. Loss of expression of antigen-presenting molecules in human pancreatic cancer and pancreatic cancer cell lines. *Clin Exp Immunol* 148, 127-135, doi:10.1111/j.1365-2249.2006.03289.x (2007).

4 Cresswell, P., Ackerman, A. L., Giodini, A., Peaper, D. R. & Wearsch, P. A. Mechanisms of MHC class 1-restricted antigen processing and cross-presentation. *Immunol Rev* 207, 145-157, doi:10.1111/j.0105-2896.2005.00316.x (2005).

5 van Hall, T. et al. Selective cytotoxic T-lymphocyte targeting of tumor immune escape variants. *Nat Med* 12, 417-424, doi:10.1038/nm1381 (2006).

6 Doorduijn, E. M. et al. TAP-independent self-peptides enhance T cell recognition of immune-escaped tumors. *J Clin Invest* 126, 784-794, doi:10.1172/JCI83671 (2016).

7 Marijt, K. A. et al. Identification of non-mutated neoantigens presented by TAP-deficient tumors. *J Exp Med* 215, 2325-2337, doi:10.1084/jem.20180577 (2018).

8 van der Burg, S. H., Arens, R., Ossendorp, F., van Hall, T. & Melief, C. J. Vaccines for established cancer: overcoming the challenges posed by immune evasion. *Nat Rev Cancer* 16, 219-233, doi:10.1038/nrc.2016.16 (2016).

9 Kenter, G. G. et al. Vaccination against HPV-16 oncoproteins for vulvar intraepithelial neoplasia. *N Engl J Med* 361, 1838-1847, doi:10.1056/NEJMoa0810097 (2009).

10 Hilf, N. et al. Actively personalized vaccination trial for newly diagnosed glioblastoma. *Nature* 565, 240-245, doi:10.1038/s41586-018-0810-y (2019).

11 Massarelli, E. et al. Combining Immune Checkpoint Blockade and Tumor-Specific Vaccine for Patients With Incurable Human Papillomavirus 16-Related Cancer: A Phase 2 Clinical Trial. *JAMA Oncol* 5, 67-73, doi:10.1001/jamaoncol.2018.4051 (2019).

12 Ott, P. A. et al. An immunogenic personal neoantigen vaccine for patients with melanoma. *Nature* 547, 217-221, doi:10.1038/nature22991 (2017).

13 Toes, R. E., Offringa, R., Blom, R. J., Melief, C. J. & Kast, W. M. Peptide vaccination can lead to enhanced tumor growth through specific T-cell tolerance induction. *Proc Natl Acad Sci USA* 93, 7855-7860 (1996).

14 Bijker, M. S. et al. CD8+ CTL priming by exact peptide epitopes in incomplete Freund's adjuvant induces a vanishing CTL response, whereas long peptides induce sustained CTL reactivity. *J Immunol* 179, 5033-5040 (2007).

15 Rosalia, R. A. et al. Dendritic cells process synthetic long peptides better than whole protein, improving antigen presentation and T-cell activation. *Eur J Immunol* 43, 2554-2565, doi:10.1002/eji.201343324 (2013).

16 van der Burg S H, Visseren M J, Brandt R M, Kast W M, Melief C J. *J Immunol.* 1996 May 1; 156(9):3308-14, Immunogenicity of peptides bound to MHC class I molecules depends on the MHC-peptide complex stability.

17 Bijker, M. S. et al. Superior induction of anti-tumor CTL immunity by extended peptide vaccines involves prolonged, DC-focused antigen presentation. *Eur J Immunol* 38, 1033-1042, doi:10.1002/eji.200737995 (2008).

18 van der Burg S H, Ras E, Drijfhout J W, Benckhuijsen W E, Bremers A J, Melief C J, Kast V M. Hum Immunol. 1995 December; 44(4):189-98. doi: 10.1016/0198-8859(95)00105-0. An HLA class I peptide-binding assay based on competition for binding to class I molecules on intact human B cells. Identification of conserved HIV-1 polymerase peptides binding to HLA-A*0301.

19 Martoglio, B. & Dobberstein, B. Signal sequences: more than just greasy peptides. *Trends Cell Biol* 8, 410-415 (1998).

20 Zom G G, Welters M J, Loof N M, Goedemans R, Lougheed S, Valentijn R R, Zandvliet M L, Meeuwenoord N J, Melief C J, de Gruijl T D, Van der Marel G A, Filippov D V, Ossendorp F, Van der Burg S H. TLR2 ligand-synthetic long peptide conjugates effectively stimulate tumor-draining lymph node T cells of cervical cancer patients. Oncotarget. 2016 Oct. 11; 7(41): 67087-67100. doi: 10.18632/oncotarget.11512.

21 Wullner, D. et al. Considerations for optimization and validation of an in vitro PBMC derived T cell assay for immunogenicity prediction of biotherapeutics. *Clin Immunol* 137, 5-14, doi:10.1016/j.clim.2010.06.018 (2010).

22 Park, E. & Rapoport, T. A. Mechanisms of Sec61/SecY-mediated protein translocation across membranes. *Annu Rev Biophys* 41, 21-40, doi:10.1146/annurev-biophys-050511-102312 (2012).

23 Weinzierl, A. O. et al. Features of TAP-independent MHC class I ligands revealed by quantitative mass spectrometry. *Eur J Immunol* 38, 1503-1510, doi: 10.1002/eji.200838136 (2008).

24 Anderson, K. S., Alexander, J., Wei, M. & Cresswell, P. Intracellular transport of class I MHC molecules in antigen processing mutant cell lines. *J Immunol* 151, 3407-3419 (1993).

25 Wei, M. L. & Cresswell, P. HLA-A2 molecules in an antigen-processing mutant cell contain signal sequence-derived peptides. *Nature* 356, 443-446, doi: 10.1038/356443a0 (1992).

26 Guermonprez, P., Valladeau, J., Zitvogel, L., Thery, C. & Amigorena, S. Antigen presentation and T cell stimulation by dendritic cells. *Annu Rev Immunol* 20, 621-667, doi:10.1146/annurev.immunol.20.100301.064828 (2002).

27 Doorduijn, E. M. et al. T cells specific for a TAP-independent self-peptide remain naive in tumor-bearing mice and are fully exploitable for therapy. *Oncoimmunology* 7, e1382793, doi:10.1080/2162402X.2017.1382793 (2018).

28 Linnemann, C. et al. High-throughput identification of antigen-specific TCRs by TCR gene capture. *Nat Med* 19, 1534-1541, doi:10.1038/nm.3359 (2013).

29 Masuko, K., Wakita, D., Togashi, Y., Kita, T., Kitamura, H. and Nishimura, T. (2015). Artificially synthesized helper/killer-hybrid epitope long peptide (H/K-HELP): Preparation and immunological analysis of vaccine efficacy. Immunology Letters, 163(1), pp. 102-112.

30 Varypataki, E., van der Maaden, K., Bouwstra, J., Ossendorp, F. and Jiskoot, W. (2014). Cationic Liposomes Loaded with a Synthetic Long Peptide and Poly(I:C): a Defined Adjuvanted Vaccine for Induction of Antigen-Specific T Cell Cytotoxicity. The AAPS Journal, 17(1), pp. 216-226.

31 Chen, X., Li, D., Zhong, X., Chen, B., Duan, Z. and Wen, J. (2016). Induction of multiple cytotoxic T lymphocyte responses in mice by a multiepitope DNA vaccine against dengue virus serotype 1. Microbiology and Immunology, 60(12), pp. 835-845.

32 Beyranvand Nejad, E., van der Sluis, T., van Duikeren, S., Yagita, H., Janssen, G., van Veelen, P., Melief, C., van der Burg, S. and Arens, R. (2016). Tumor Eradication by Cisplatin Is Sustained by CD80/86-Mediated Costimulation of CD8+ T Cells. Cancer Research, 76(20), pp. 6017-6029.

33 Doorduijn E M, Sluijter M, Marijt K A, Querido B J, van der Burg S H, van Hall T. Oncoimmunology. T cells specific for a TAP-independent self-peptide remain naïve in tumor-bearing mice and are fully exploitable for therapy. 2017 Nov. 20; 7(3)

34 Ossendorp, F., Mengedé E., Camps, M., Filius, R. and Melief, C. (1998). Specific T Helper Cell Requirement for Optimal Induction of Cytotoxic T Lymphocytes against Major Histocompatibility Complex Class II Negative Tumors. The Journal of Experimental Medicine, 187(5), pp. 693-702.

35 Rahimian, S., Fransen, M., Kleinovink, J., Christensen, J., Amidi, M., Hennink, W. and Ossendorp, F. (2015). Polymeric nanoparticles for co-delivery of synthetic long peptide antigen and poly IC as therapeutic cancer vaccine formulation. Journal of Controlled Release, 203, pp. 16-22.

36 Ressing M E, de Jong J H, Brandt R M, Drijfhout J W, Benckhuijsen W E, Schreuder G M, Offringa R, Kast W M, Melief C J; Differential binding of viral peptides to HLA-A2 alleles. Implications for human papillomavirus type 16 E7 peptide-based vaccination against cervical carcinoma Eur J Immunol. 1999 April; 29(4): 1292-303.

37 Zom G G, Khan S, Britten C M, Sommandas V, Camps M G, Loof N M, Budden C F, Meeuwenoord N J, Filippov D V, van der Marel G A, Overkleeft H S, Melief C J, Ossendorp F. Efficient induction of antitumor immunity by synthetic toll-like receptor ligand-peptide conjugates. Cancer Immunol Res. 2014 August; 2(8):756-64. doi: 10.1158/2326-6066.CIR-13-0223. Epub 2014 Apr. 21.

38 Zom G G, Willems M M J H P, Khan S, van der Sluis T C, Kleinovink J W, Camps M G M, van der Marel G A, Filippov D V, Melief C J M, Ossendorp F. Novel TLR2-binding adjuvant induces enhanced T cell responses and tumor eradication. J Immunother Cancer. 2018 Dec. 12; 6(1):146. doi: 10.1186/s40425-018-0455-2.

The invention claimed is:

1. An isolated peptide, wherein the isolated peptide:
   (a) consists of the amino acid sequence FLGPWPAAV (SEQ ID NO: 1); or
   (b) comprises the amino acid sequence FLGPWPAAV (SEQ ID NO: 1) and wherein the isolated peptide comprises or consists of an amino acid sequence of any one of SEQ ID NOs: 3 to 8 and has no more than 35 amino acids.

2. The peptide of claim 1, wherein
   the peptide consists of from 10 to 35 amino acids.

3. The peptide of claim 1, wherein the peptide is conjugated to a toll-like receptor (TLR) ligand.

4. A cell loaded with a peptide according to claim 1.

5. The cell of claim 4, wherein the cell is an antigen-presenting cell.

6. The cell of claim 5, wherein the antigen-presenting cell is selected from a macrophage, a dendritic cell, a monocyte, a B-cell or a synthetic form of an antigen presenting cell.

7. A pharmaceutical composition comprising an isolated peptide according to claim 1, and a pharmaceutically acceptable excipient, adjuvant, diluent and/or carrier.

8. The pharmaceutical composition of claim 7, wherein the composition is formulated as a vaccine.

9. A pharmaceutical composition according to claim 7 for use as a medicament.

10. The pharmaceutical composition for use according to claim 9, in the prevention or treatment of a cancer or a viral infection associated with impaired HLA class I antigen presentation in a human subject.

11. The pharmaceutical composition for use according to claim 10, wherein the cancer is a cancer with impaired peptide processing machinery.

12. A pharmaceutical composition according to claim 7 for use in treating or preventing a cancer or viral infection associated with impaired HLA class I antigen presentation in a human subject, wherein the subject has been identified as having a cancer or viral infection associated with impaired HLA class I antigen presentation by the presence of a peptide in a sample isolated from the subject, wherein the peptide is FLGPWPAAS (SEQ ID NO: 2).

* * * * *